US011388725B2

(12) United States Patent

Park et al.

(10) Patent No.: US 11,388,725 B2

(45) Date of Patent: Jul. 12, 2022

(54) METHOD AND DEVICE FOR TRANSMITTING PPDU ON BASIS OF FDR IN WIRELESS LAN SYSTEM

(71) Applicant: LG ELECTRONICS INC., Seoul (KR)

(72) Inventors: Eunsung Park, Seoul (KR); Jinmin Kim, Seoul (KR); Kiseon Ryu, Seoul (KR); Dongguk Lim, Seoul (KR); Jinyoung Chun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 16/970,947

(22) PCT Filed: Feb. 25, 2019

(86) PCT No.: PCT/KR2019/002273

§ 371 (c)(1),
(2) Date: Aug. 18, 2020

(87) PCT Pub. No.: WO2019/164362

PCT Pub. Date: Aug. 29, 2019

(65) Prior Publication Data

US 2020/0396743 A1 Dec. 17, 2020

Related U.S. Application Data

(60) Provisional application No. 62/634,204, filed on Feb. 23, 2018.

(30) Foreign Application Priority Data

Mar. 21, 2018 (KR) ........................ 10-2018-0032924

(51) Int. Cl.
*H04W 76/11* (2018.01)
*H04W 8/24* (2009.01)
(Continued)

(52) U.S. Cl.
CPC ....... *H04W 72/0493* (2013.01); *H04L 1/1614* (2013.01); *H04L 5/14* (2013.01);
(Continued)

(58) Field of Classification Search
CPC ...... H04L 5/1438; H04L 69/22; H04W 8/245; H04W 72/0493; H04W 72/1205;
(Continued)

(56) References Cited

U.S. PATENT DOCUMENTS 9,450,743 B1 * 9/2016 Chu ...................... H04L 5/1438
2016/0277160 A1 9/2016 Lim et al.
(Continued)

OTHER PUBLICATIONS

PCT International Application No. PCT/KR2019/002273, International Search Report dated Jun. 28, 2019, 2 pages.

*Primary Examiner* — Harun Chowdhury

(74) *Attorney, Agent, or Firm* — Lee Hong Degerman Kang Waimey

(57) ABSTRACT

Disclosed is a method and a device for transmitting and receiving a PPDU based on FDR in a wireless LAN system. More specifically, an AP generates FDR indication information on that the AP is capable of performing the FDR and transmits a DL PPDU including the FDR indication information to a first STA and a second STA. The AP receives a first UL PPDU from the first STA and a second UL PPDU form the second STA. A DL PPDU, a first UL PPDU, and a second UL PPDU are transmitted and received based on the FDR.

20 Claims, 68 Drawing Sheets

(51) Int. Cl.

| | |
|---|---|
| ***H04W 72/04*** | (2009.01) |
| ***H04L 1/16*** | (2006.01) |
| ***H04L 5/14*** | (2006.01) |
| *H04W 84/12* | (2009.01) |

(52) U.S. Cl.
CPC ............ *H04W 8/245* (2013.01); *H04W 76/11* (2018.02); *H04W 84/12* (2013.01)

(58) Field of Classification Search
CPC ........... H04W 74/006; H04W 74/0833; H04W 76/11; H04W 84/12
USPC ......................................... 370/252, 280, 329
See application file for complete search history.

(56) References Cited

U.S. PATENT DOCUMENTS

| | | | | |
|---|---|---|---|---|
| 2017/0055284 | A1 | 2/2017 | Min et al. | |
| 2017/0094664 | A1 | 3/2017 | Lee et al. | |
| 2017/0195107 | A1 | 7/2017 | Liu | |
| 2018/0184409 | A1* | 6/2018 | Min .................. | H04W 72/1205 |
| 2019/0007977 | A1* | 1/2019 | Asterjadhi ........ | H04W 74/0833 |

* cited by examiner

Self-interference is millions to billions(60-90dB) stronger than received signal

| L-STF | L-LTF | L-SIG | RL-SIG | FDR-SIG-A | FDR-SIG-B | FDR-SIG-C | FDR-STF | FDR-LTF | Data for STA 1 |
| | | | | | | | | | Data for STA 2 |

| L-STF | L-LTF | L-SIG | RL-SIG | FDR-SIG-A | FDR-STF | FDR-LTF | Data for STA 3 |

| L-STF | L-LTF | L-SIG | RL-SIG | FDR-SIG-A | FDR-STF | FDR-LTF | Data for STA 4 |

| L-STF | L-LTF | L-SIG | RL-SIG | FDR-SIG-A | FDR-STF | FDR-LTF | Data for STA 3 |
| L-STF | L-LTF | L-SIG | RL-SIG | FDR-SIG-A | FDR-STF | FDR-LTF | Data for STA 4 |

| FDR-STF | FDR-LTF | FDR-SIG-A | Data for STA 3 |

| FDR-STF | FDR-LTF | FDR-SIG-A | Data for STA 4 |

| FDR-STF | FDR-LTF | FDR-SIG-A | Data for STA 3 |
| FDR-STF | FDR-LTF | FDR-SIG-A | Data for STA 4 |

| L-STF | L-LTF | L-SIG | RL-SIG | FDR-SIG-A | FDR-STF | FDR-LTF | Data for STA 3 |
| L-STF | L-LTF | L-SIG | RL-SIG | FDR-SIG-A | FDR-STF | FDR-LTF | Data for STA 4 |

| L-STF | L-LTF | L-SIG | RL-SIG | FDR-SIG-A | FDR-SIG-B | FDR-SIG-C | FDR-STF | FDR-LTF | Data for STA 1 / Data for STA 5 / Data for STA 2 |

| L-STF | L-LTF | L-SIG | RL-SIG | FDR-SIG-A | FDR-SIG-B | FDR-STF | FDR-LTF | Data for STA 1 |
| | | | | | | | | Data for STA 5 / Data for STA 2 |

| L-STF | L-LTF | L-SIG | RL-SIG | FDR-SIG-A | FDR-SIG-B | FDR-SIG-C | FDR-STF | FDR-LTF | Data for STA 5 / Data for STA 1 |

METHOD AND DEVICE FOR TRANSMITTING PPDU ON BASIS OF FDR IN WIRELESS LAN SYSTEM

CROSS-REFERENCE TO RELATED APPLICATIONS

This application is the National Stage filing under 35 U.S.C. 371 of International Application No. PCT/KR2019/002273, filed on Feb. 25, 2019, which claims the benefit of U.S. Provisional Application No. 62/634,204, filed on Feb. 23, 2018, and also claims the benefit of earlier filing date and right of priority to Korean Application No. 10-2018-0032924, filed on Mar. 21, 2018, the contents of which are all hereby incorporated by reference herein in their entirety.

TECHNICAL FIELD

The present disclosure relates to a technique for performing FDR in a WLAN system and more specifically, a method and a device for transmitting a PPDU using an FDR scheme in a WLAN system.

BACKGROUND ART

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

DISCLOSURE

Technical Problem

The present disclosure proposes a method and a device transmitting a PPDU based on Full-Duplex Radio (FDR) in a WLAN system.

Technical Solution

One embodiment of the present disclosure proposes a method for transmitting and receiving a PPDU based on Full-Duplex Radio (FDR).

When it is assumed that self-interference, which is a big obstacle to performing FDR, may be removed successfully from the PHY layer, the present embodiment proposes a PPDU based on the FDR operation.

The present embodiment may be performed in a network environment in which the next-generation WLAN system is supported. The next-generation WLAN system is a WLAN system that improves the 802.11ax system and may satisfy backward compatibility with the 802.11ax system.

To clarify the terms, HE MU PPDU, HE TB PPDU, HE SU PPDU, HE-SIG-A field, HE-SIG-B field, HE-STF field, and HE-LTF field may all correspond to the PPDUs and the fields defined in the 802.11ax system. FDR MU PPDU, FDR TB PPDU, FDR-SIG-A field (first signal field), FDR-SIG-B field (second signal field), FDR-STF field, and FDR-LTF field may correspond to the PPDUs and the fields defined for performing FDR in the next-generation WLAN system. FDR-SIG-C field (third signal field) may be a signal field newly defined for performing FDR in the next-generation WLAN system. However, it should be noted that PPDUs and fields defined for performing FDR may be generated directly by using the HE PPDUs and the HE fields to satisfy backward compatibility with the 802.11ax system. The trigger frame is a (MAC) frame defined in the 802.11ax system, for which a field may be added or an existing field may be modified to perform FDR.

The present embodiment may be performed in a transmitter, and the transmitter may correspond to an AP. A receiver according to the present embodiment may correspond to a (non-AP STA) STA having an FDR capability. Also, the present embodiment may include both a symmetric FDR operation and an asymmetric FDR operation.

First, an access point (AP) generates FDR indication information on that the FDR may be performed.

The AP transmits a downlink (DL) PPDU including the FDR indication information to a first station (STA) and a second STA. The DL PPDU may be generated by using a High Efficiency Multi-User PPDU (HE MU PPDU). In other words, the DL PPDU may be an FDR MU PPDU generated by reusing the HE MU PPDU.

The AP receives a first uplink (UL) PPDU from the first STA and receives a second UL PPDU from the second STA. The first UL PPDU and the second UL PPDU may be generated by using a High Efficiency Trigger-Based PPDU (HE TB PPDU). In other words, the first UL PPDU and the second UL PPDU may be FDR TB PPDUs generated by reusing the HE TB PPDU. At this time, the DL PPDU, the first UL PPDU, and the second UL PPDU are transmitted and received based on the FDR.

In relation to DL primary transmission, the DL PPDU may include a legacy signal field, a first signal field, a second signal field, and a DL data field. The legacy signal field may be associated with the Legacy-Signal (L-SIG) field or the Repeated Legacy-Signal (RL-SIG) field included in the HE MU PPDU. The first signal field may be associated with the HE-SIG-A field included in the HE MU PPDU. Since the first signal field is defined for performing an FDR operation, the first signal field may be referred to as an FDR-SIG-A field. The second signal field may be associated with the HE-SIG-B field included in the HE MU PPDU. Since the second signal field is defined to perform an FDR operation, the second signal field may be referred to as an FDR-SIG-B field. The DL data field may be associated with the data received by an STA through a Resource Unit (RU) configured during MU DL transmission.

The second signal field includes allocation information on a first RU to which the DL data field is allocated. The allocation information on the first RU may be an RU Allocation field 1120.

When the DL PPDU further includes a third signal field, the third signal field includes allocation information on a second RU to which the first UL PPDU and the second UL PPDU are allocated, information on the identifier of an STA to transmit the first UL PPDU and the second UL PPDU, and information on the transmission time of the first UL PPDU and the second UL PPDU. This case describes an embodiment in which the DL PPDU reuses a field of the HE MU PPDU and generates a PPDU by additionally inserting a third signal field. Since the third signal field is newly defined to perform the FDR operation, the third signal field may be referred to as an FDR-SIG-C field.

At this time, the second RU may be an RU excluding the first RU from the whole band. In other words, the present embodiment proposes a method in which a DL PPDU is transmitted through a specific RU and a UL PPDU is received through another RU other than the specific RU. Also, the present embodiment proposes a method in which two STAs divide the different RUs in half and transmit the respective UL PPDUs to perform FDR with the DL PPDU.

More specifically, the DL data field may be transmitted through the first RU. The first UL PPDU and the second UL PPDU may be received through the second RU based on the third signal field. At this time, the first UL PPDU is received from the first STA through half of the second RU. The second UL PPDU is received from the second STA through the other half of the second RU. The minimum size of the half of the second RU and the other half of the second RU may be 26 RUs. Therefore, the minimum size of the second RU may be 52 RUs.

The identifier of an STA to transmit the first UL PPDU and the second UL PPDU may include identifiers of the first and second STAs. The DL PPDU may be transmitted before the first UL PPDU and the second UL PPDU (DL primary transmission and UL secondary transmission). The DL PPDU, the first UL PPDU, and the second UL PPDU may be transmitted and received simultaneously after the transmission time of the first UL PPDU and the second UL PPDU. Also, the transmission time points of the first UL PPDU and the second UL PPDU may be the same with each other.

The information on the identifier of an STA to transmit the first UL PPDU and the second UL PPDU may be set by an 11-bit STA Identifier (ID), a 9-bit Partial Association ID (PAID), or a 12-bit Association ID (AID). In other words, a specific STA for transmitting the first UL PPDU and the second UL PPDU may be indicated by using one of the three methods.

The allocation information on the second RU may be set by a bitmap, each bit of which corresponds to 26 RUs. In other words, 26 RUs are set as the minimum unit; when each of 26 RUs transmits a first or second UL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

The information on the transmission time of the first UL PPDU and the second UL PPDU may include the duration spanning from the third signal field to the time at which the first UL PPDU and the second UL PPDU are transmitted or the duration spanning from the legacy signal field to the time at which the first UL PPDU and the second UL PPDU are transmitted. In particular, the transmission time points of the first UL PPDU and the second UL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

When the DL PPDU does not include the third signal field, the second signal field may further include allocation information on the second RU to which the first UL PPDU and the second UL PPDU are allocated, the identifier of an STA to transmit the first UL PPDU and the second UL PPDU, and transmission time of the first UL PPDU and the second UL PPDU. In this case, the PPDU is generated by reusing only the fields of the HE MU PPDU without the third signal field's being additionally inserted to the DL PPDU. Accordingly, the information related to transmission of the first UL PPDU and the second UL PPDU may be included in the second signal field.

The allocation information on the second RU may be included in a common field of the second signal field. The common field of the second signal field may further include indicator information on whether the first or the second UL PPDU is transmitted through an RU allocated based on the allocation information on the first RU. In other words, the indicator information related to the first or the second UL PPDU transmission may be additionally included in the common field of the second signal field.

The FDR indication information may be included in the legacy signal field, the first signal field, or the second signal field.

In relation to UL secondary transmission, the first UL PPDU and the second UL PPDU may include only a High Efficiency-Short Training Field (HE-STF), a High Efficiency-Long Training Field (HE-LTF), and a UL data field belonging to the HE TB PPDU. In other words, the first or the second UL PPDU may be configured to reuse the HE TB PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR.

Also, when the second RU is 20 MHz or 40 MHz, the first UL PPDU and the second UL PPDU may be generated by using a High Efficiency Single User PPDU (HE SU PPDU). Since the total bandwidth is used for UL transmission, transmission may be performed by using the HE SU PPDU. For example, when the second RU is 40 MHz, the first UL PPDU may be transmitted through a primary 20 MHz band, and the second UL PPDU may be transmitted through a secondary 20 MHz band.

The first UL PPDU and the second UL PPDU may include only the HE-STF, the HE-LTF, and the UL data field belonging to the HE SU PPDU. In other words, the first UL PPDU and the second UL PPDU may be configured to reuse the HE SU PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR. Also, the first UL PPDU and the second UL PPDU may be completely separated from each other (completely divided into half of the second RU and the other half of the second RU), thereby reducing the interference effect due to MU FDR transmission.

Advantageous Effects

The present disclosure proposes a method for transmitting and receiving a PPDU based on FDR in a WLAN system.

According to an embodiment of the present disclosure, a PPDU consisting of fields newly defined based on FDR is generated, which may remove self-interference due to FDR operation and reduce overhead, thereby achieving a high processing rate.

MODE FOR DISCLOSURE

Figure 1:
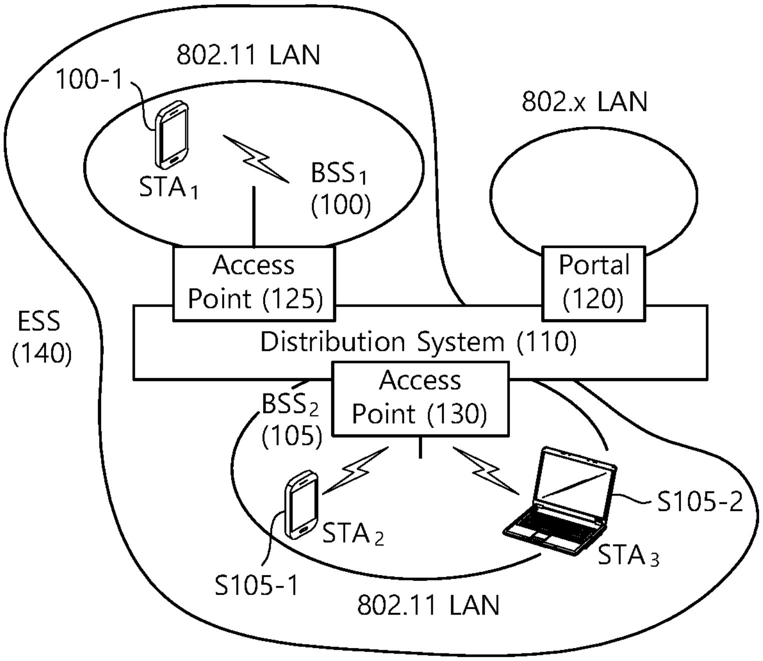
FIG. 1 is a conceptual view illustrating the structure of a wireless local area network (WLAN).
Figure 1:
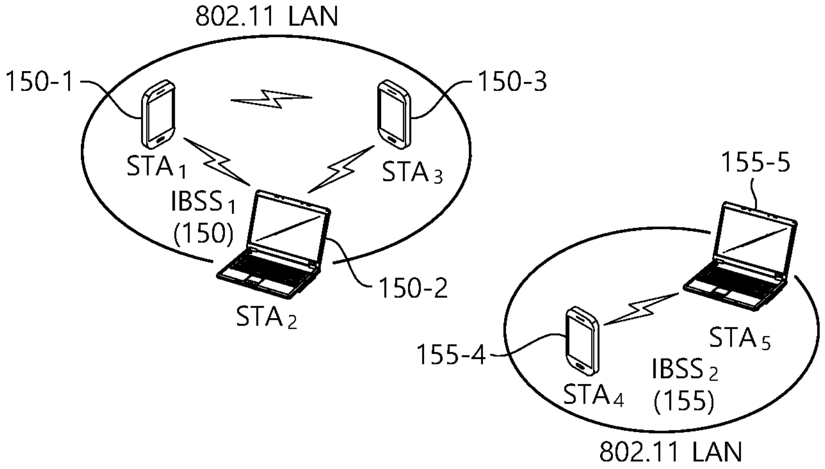

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network set by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBS S.

Referring to the lower part of FIG. 1, the IBSS is a BSS that operates in an Ad-Hoc mode. Since the IBSS does not include the access point (AP), a centerized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

Figure 2:
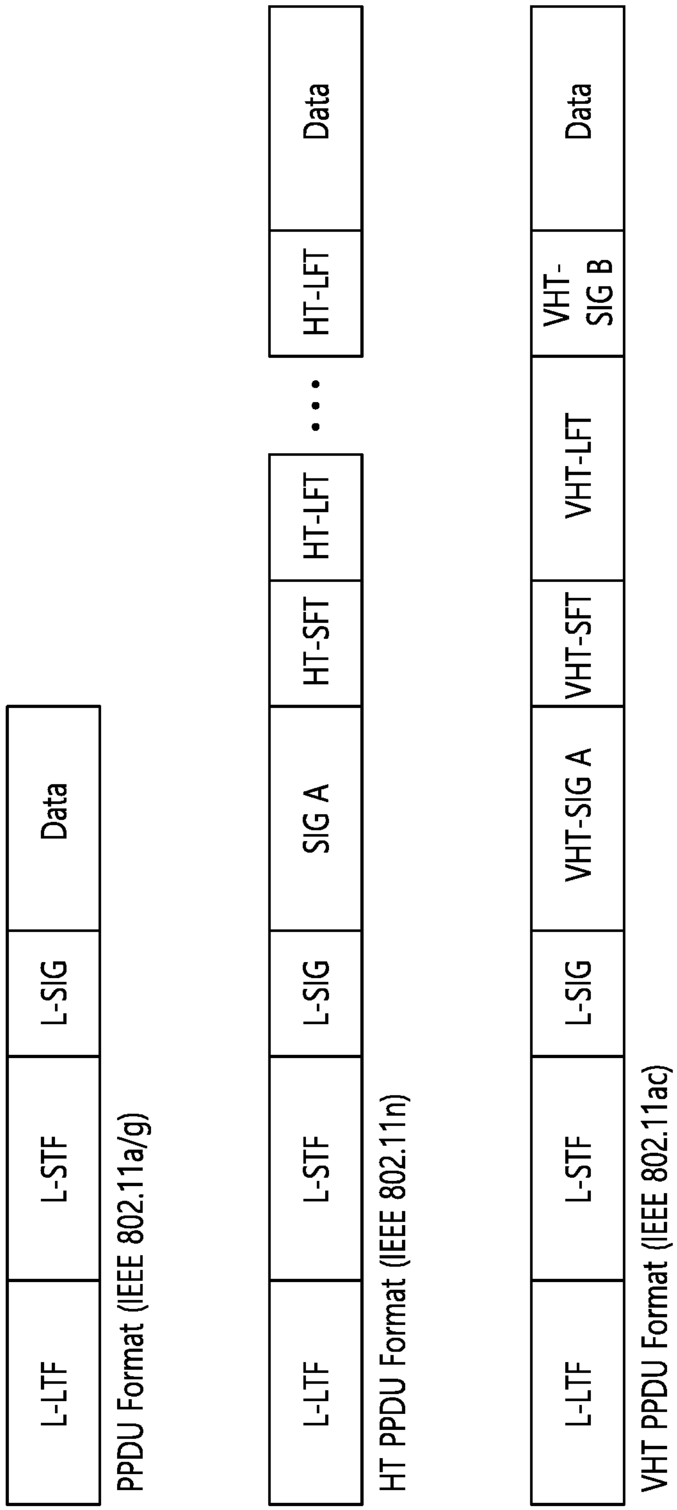
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
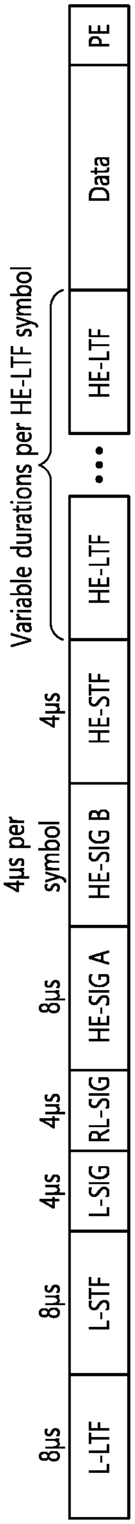
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
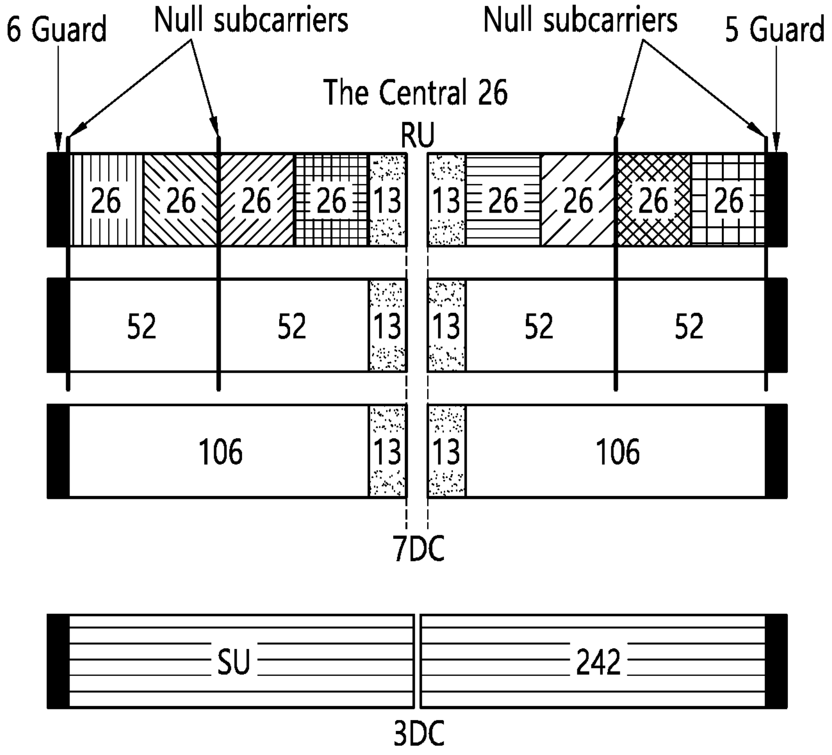
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
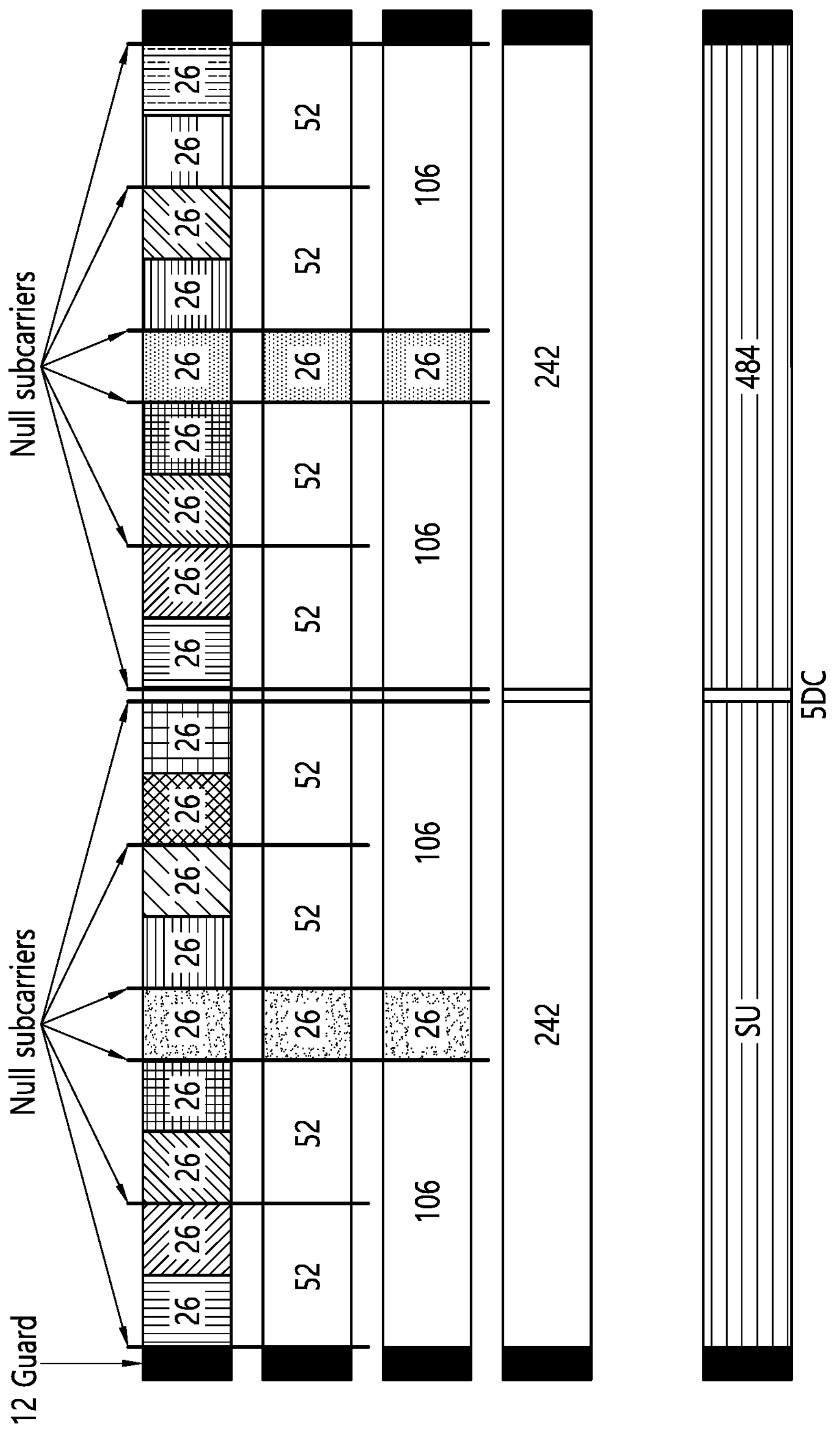
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
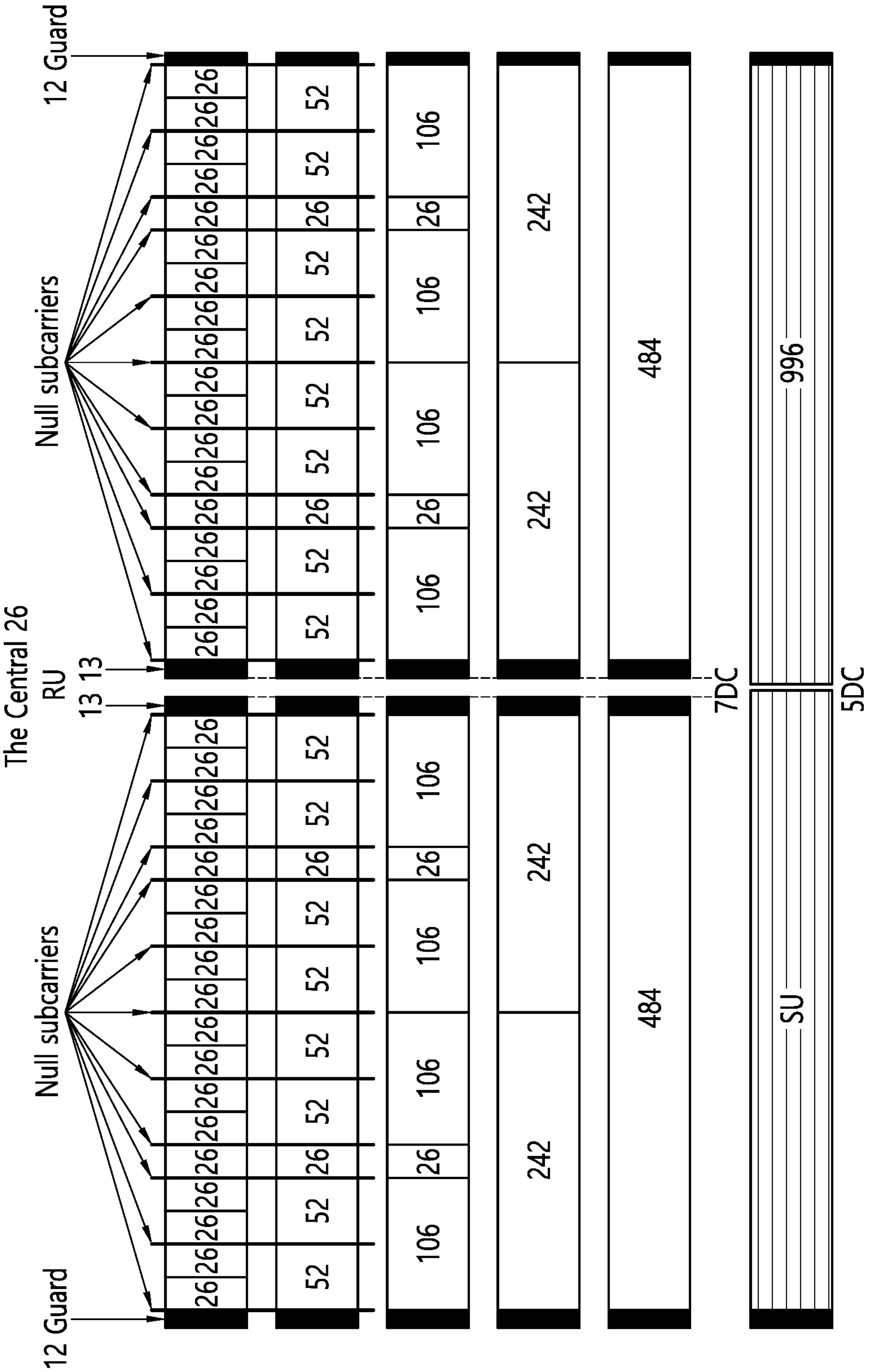
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
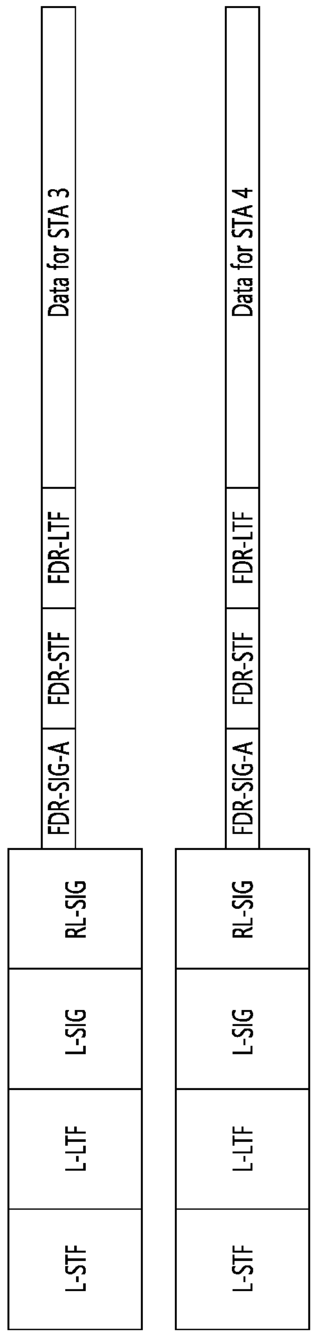
FIG. 26 illustrates another example of an OFDMA-based FDR UL PPDU.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
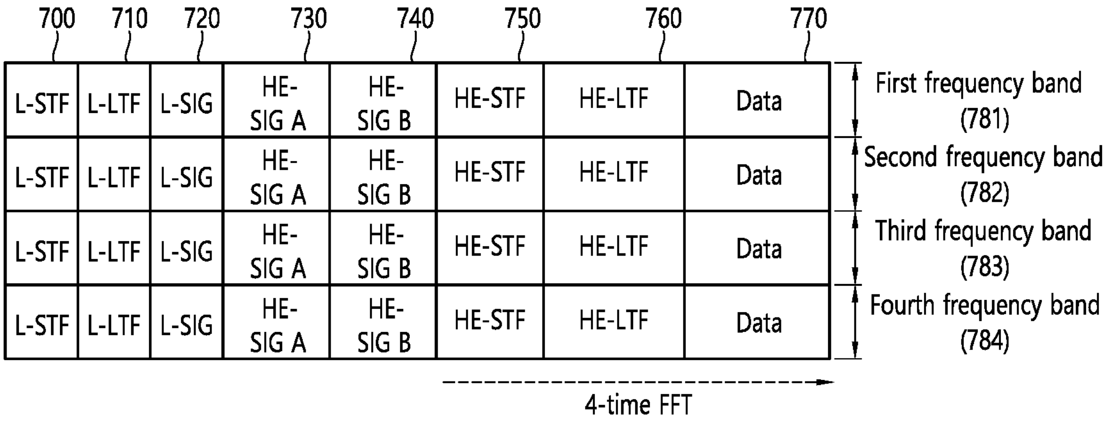
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), |

TABLE 1-continued

| Two Parts of HE-SIG-A | Bit | Field | Number of bits | Description |
| --- | --- | --- | --- | --- |
| | | | | Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK__FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 arc reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS__COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL__REUSE). Set to SRP__DISALLOW to prohibit SRP-based spatial reuse during this PPDU. Set to SRP__AND__NON__SRG__OBSS__PD__PROHIBITED to prohibit both SRP-based spatial reuse and non-SRG OBSS PD-based spatial reuse during this PPDU. For the interpretation of other values see 27.11.6 (SPATIAL__REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if(#Ed) both the DCM and STBC fields are set to 1. a 4x HE-LTF and 3.2 μs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 |

TABLE 1-continued

| Two Parts of HE-SIG-A | Bit | Field | Number of bits | Description |
|---|---|---|---|---|
| | | | | indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURAT1ON is less than 512, then B0 is set to 0 and B1-B6 is set to floor(TXOP_DURATION/8)(#16277).<br>Otherwise, B0 is set to 1 and B1-B6 is set to floor ((TXOP_DURATION-512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beam-formed(#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL.<br>Set to the value indicated by the TXVECTOR parameter UPLINK_FLAG. (#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz subchannels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0;<br>Set to 15 to indicate that the number of OFDM symbols in the HE-SIG-B field is greater than or equal to 16 if the Longer than 16 HE SIG-B OFDM Symbols Support subfield of the HE Capabilities element transmitted by all the recipient STAs are 1 and if the HE-SIG-B data rate is less than MCS 4 without |

TABLE 2-continued

| Two Parts of HE-SIG-A | Bit | Field | Number of bits | Description |
|---|---|---|---|---|
| | | | | DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present. Set to 1 if the Common field in HE-SIG-B is not present. (#16139) |
| | B23-B24 | GI + LTF Size | 2 | Indicates the GI duration and HE-LTF size:<br>Set to 0 to indicate a 4x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate a 4x HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION-512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. (#15661) |

TABLE 2-continued

| Two Parts of HE-SIG-A | Bit | Field | Number of bits | Description |
|---|---|---|---|---|
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz sub-band of the 160 MHz operating band.<br>Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz:<br>This Spatial Reuse field applies to the second 20 MHz subband.<br>If(#Ed) the STA operating channel width is 20 MHz, then this field is set to the same value as Spatial Reuse 1 field.<br>If(#Ed) the STA operating channel width is 40 MHz in the 2.4 GHz band, this field is set to the same value as Spatial Reuse 1 field.<br>If the Bandwidth field indicates 160/80 + 80 MHz the this Spatial Reuse field applies to the second 40 MHz subband of the 160 MHz operating band.<br>Set to the value of the SPATIAL_REUSE(2) parameter of the TX VECTOR, which contains a value from Table 28-22 (Spatial Reuse field encoding for an HE TB PPDU) for an HE TB PPDU (see 27.11.6 (SPATIAL_REUSE)). |

TABLE 3-continued

| Two Parts of HE-SIG-A | Bit | Field | Number of bits | Description |
|---|---|---|---|---|
| | | | | Set to SRP__DISALLOW to prohibit SRP-based spatial reuse during this PPDU. Set to SRP__AND__NON__SRG__OBSS__PD__PROIHBITED to prohibit both SRP-based spatial reuse and non-SRG OBSS PD-based spatial reuse during this PPDU. For the interpretation of other values see 27.11.6 (SPATIAL__REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If(#Ed) the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If(#Ed) the STA operating channel width is 80 + 80 MHz, this field is set to the same value as Spatial Reuse 1 field.<br>Set to the value of the SPATIAL__REUSE(3) parameter of the TXVECTOR, which contains a value from Table 28-22 (Spatial Reuse field encoding for an HE TB PPDU) for an HE TB PPDU (see 27.11.6 (SPATIAL__REUSE)).<br>Set to SRP__DISALLOW to prohibit SRP-based spatial reuse during this PPDU. Set to SRP__AND__NON__SRG__OBSS__PD__PROHIBITED to prohibit both SRP-based spatial reuse and non-SRG OBSS PD-based spatial reuse during this PPDU. For the interpretation of other values see 27.11.6 (SPATIAL__REUSE) and 27.9 (Spatial reuse operation). |
| | B19-B22 | Spatial Reuse 4 | 4 | Indicates whether or not spatial reuse is allowed in a subband of the PPDU during tire transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If(#Ed) the STA operating channel width is 20 MHz, then this field is set to the same value as Spatial Reuse 1 field.<br>If(#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If(#Ed) the STA operating channel width is 80 + 80 MHz, then this field is set to same value as Spatial Reuse 2 field.<br>Set to the value of the SPATIAL__REUSE(4) parameter of the TXVECTOR, which contains a value from Table 28-22 (Spatial Reuse field encoding for an HE TB PPDU) for an HE TB PPDU (see 27.11.6 (SPATIAL__REUSE)).<br>Set to SRP__DISALLOW to prohibit SRP-based spatial reuse during this PPDU. Set to SRP__AND__NON__SRG__OBSS__PD__PROHIBITED to prohibit both SRP-based spatial reuse and non-SRG OBSS PD-based spatial reuse during this PPDU. For the interpretation of other values see 27.11.6 ( SPATIAL__REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |

TABLE 3-continued

| Two Parts of HE-SIG-A | Bit | Field | Number of bits | Description |
|---|---|---|---|---|
| HE-STG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION - 512)/128)(#16277).<br>where(#16061)<br>B0 indicates the TXOP length granularity. Set to 0 for 8 μs: otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
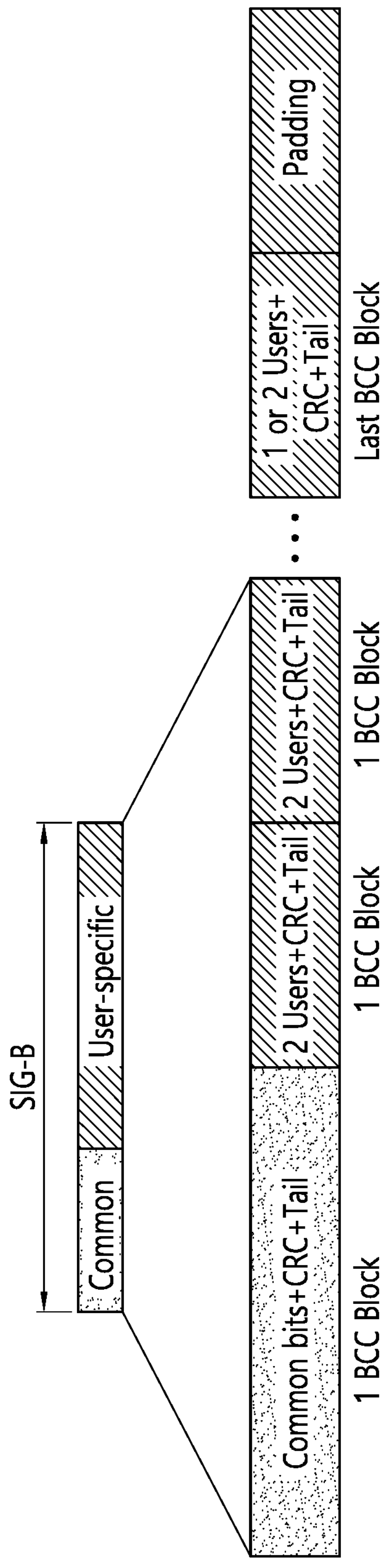
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 us and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present specification, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
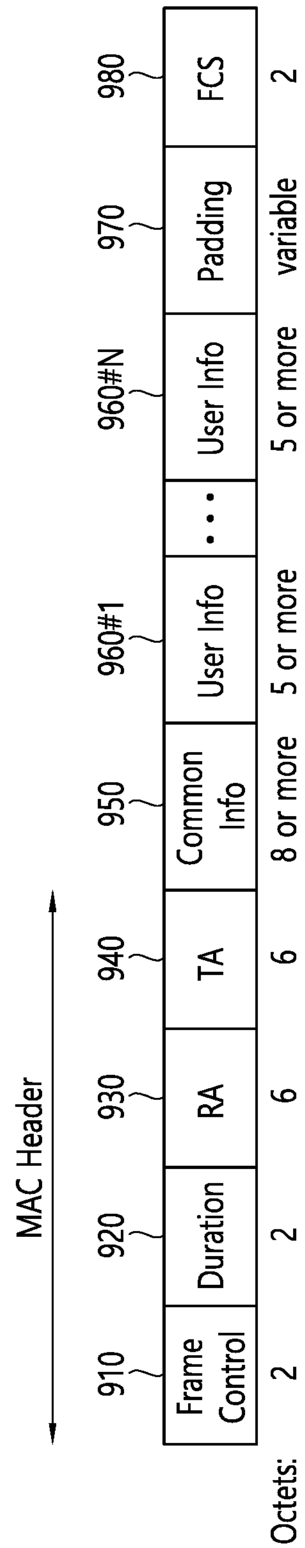
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Also, the RA field 930 includes address information of a receiving STA of the corresponding trigger frame and may be omitted if necessary. The TA field 940 includes address information of an STA triggering the corresponding trigger frame (for example, an AP), and the common information field 950 includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field 970 and a frame check sequence field 980.

It is preferable that each of the per user information fields (960 #1 to 960 #N) shown in FIG. 9 includes a plurality of subfields.

Figure 10:
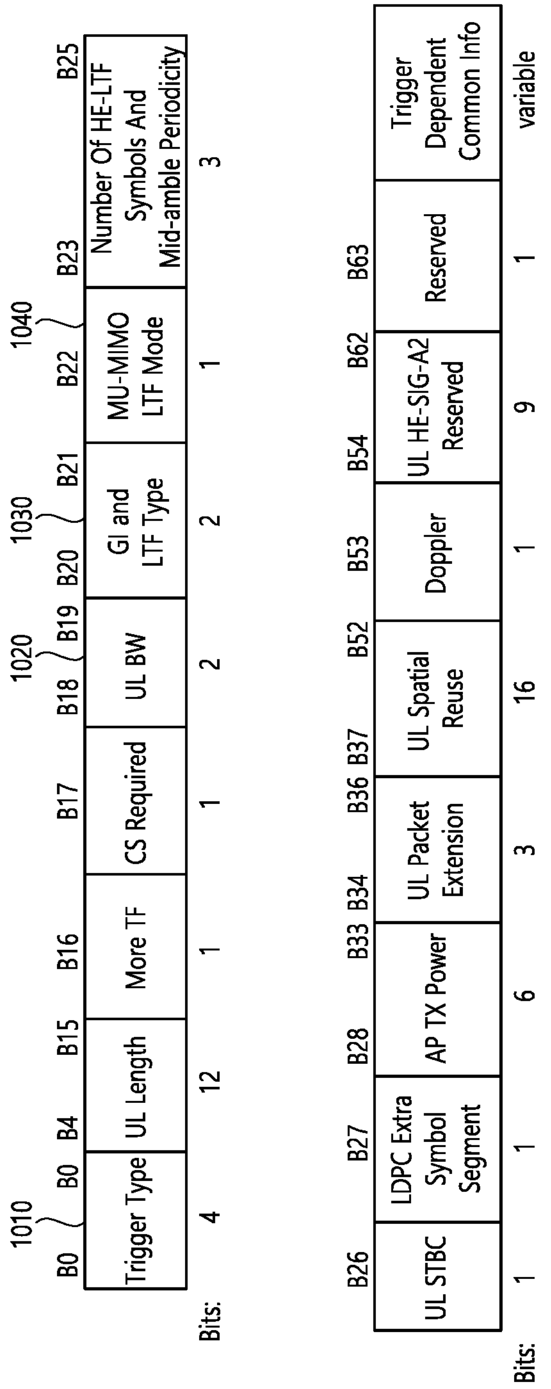
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

The trigger type field 1010 of FIG. 10 may indicate a trigger frame variant and encoding of the trigger frame variant. The trigger type field 1010 may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field 1020 of FIG. 10 indicates bandwidth in the HE-SIG-A field of an HE Trigger Based (TB) PPDU. The UL BW field 1020 may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields 1030 of FIG. 10 indicate the GI and HE-LTF type of the HE TB PPDU response. The GI and LTF type field 1030 may be defined as follows.

TABLE 6

| GI And LTF field value | Description |
|---|---|
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields 1030 have a value of 2 or 3, the MU-MIMO LTF mode field 1040 of FIG. 10 indicates the LTF mode of a UL MU-MIMO HE TB PPDU response. At this time, the MU-MIMO LTF mode field 1040 may be defined as follows.

If the trigger frame allocates an RU that occupies the whole HE TB PPDU bandwidth and the RU is allocated to one or more STAs, the MU-MIMO LTF mode field 1040 indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field 1040 indicates the HE single stream pilot HE-LTF mode. The MU-MIMO LTF mode field 1040 may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
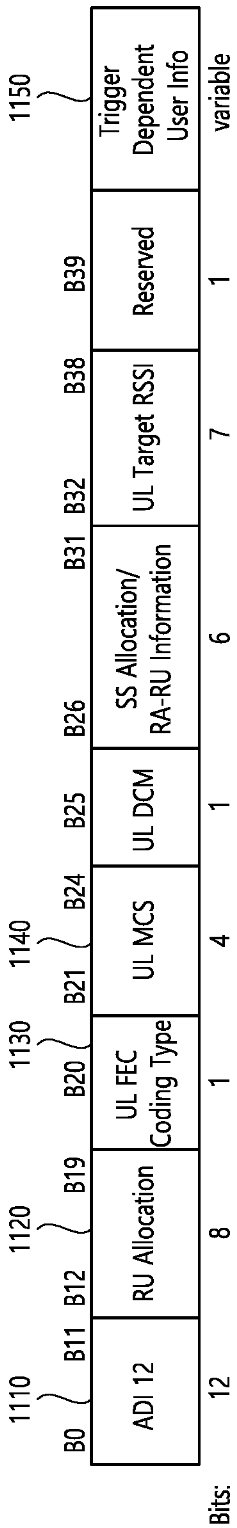
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field 1120 may be included. In other words, when a receiving STA identified by the User Identifier field 1110 transmits a UL PPDU in response to the trigger frame of FIG. 9, the corresponding UL PPDU is transmitted through an RU indicated by the RU Allocation field 1120. In this case, it is preferable that the RU indicated by the RU Allocation field 1120 corresponds to the RUs shown in FIGS. 4, 5, and 6. A specific structure of the RU Allocation field 1120 will be described later.

The subfield of FIG. 11 may include a (UL FEC) coding type field 1130. The coding type field 1130 may indicate the coding type of an uplink PPDU transmitted in response to the trigger frame of FIG. 9. For example, when BCC coding is applied to the uplink PPDU, the coding type field 1130 may be set to '1', and when LDPC coding is applied, the coding type field 1130 may be set to '0'.

Additionally, the sub-field of FIG. 11 may include a UL MCS field 1140. The MCS field 1140 may indicate a MCS scheme being applied to the uplink PPDU that is transmitted in response to the trigger frame of FIG. 9.

Also, the subfield of FIG. 11 may include a Trigger Dependent User Info field 1150. When the Trigger Type field 1010 of FIG. 10 indicates a basic trigger variant, the Trigger Dependent User Info field 1150 may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| $00010y_2y_1y_0$ | 52 | | 52 | | — | 106 | | | | 8 |
| $00011y_2y_1y_0$ | 106 | | | | — | 52 | | 52 | | 8 |
| $00100y_2y_1y_0$ | 26 | 26 | 26 | 26 | 26 | 106 | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $00101y_2y_1y_0$ | 26 | 26 | 52 | | 26 | 106 | | | | 8 |
| $00110y_2y_1y_0$ | 52 | | 26 | 26 | 26 | 106 | | | | 8 |
| $00111y_2y_1y_0$ | 52 | | 52 | | 26 | 106 | | | | 8 |
| $01000y_2y_1y_0$ | 106 | | | | 26 | 26 | 26 | 26 | 26 | 8 |
| $01001y_2y_1y_0$ | 106 | | | | 26 | 26 | 26 | 52 | | 8 |
| $01010y_2y_1y_0$ | 106 | | | | 26 | 52 | | 26 | 26 | 8 |
| $01011y_2y_1y_0$ | 106 | | | | 26 | 52 | | 52 | | 8 |
| $0110y_1y_0z_1z_0$ | 106 | | | | — | 106 | | | | 16 |
| 01110000 | 52 | | 52 | | — | 52 | | 52 | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| $011101x_1x_0$ | Reserved | | | | | | | | | 4 |
| $01111y_2y_1y_0$ | Reserved | | | | | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $10y_2y_1y_0z_2z_1z_0$ | | 106 | | | 26 | | 106 | | | 64 |
| $11000y_2y_1y_0$ | | | | | 242 | | | | | 8 |
| $11001y_2y_1y_0$ | | | | | 484 | | | | | 8 |
| $11010y_2y_1y_0$ | | | | | 996 | | | | | 8 |
| $11011y_2y_1y_0$ | | | | | Reserved | | | | | 8 |
| $111x_4x_3x_2x_1x_0$ | | | | | Reserved | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
#1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
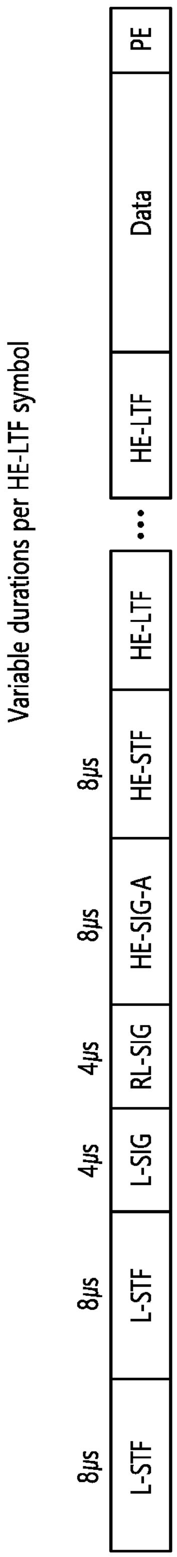
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit an HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Basic Concept of STR

In what follows, Simultaneous Transmit and Receive (STR) will be described.

Figure 13:
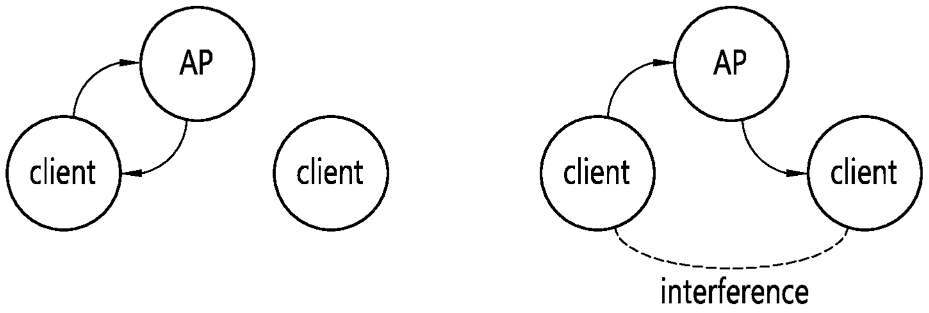
FIG. 13 illustrates types of STRs.

FIG. 13 illustrates types of STRs.

In-band STR is a technique that allows simultaneous transmission and reception in the same frequency band and also called Full-Duplex Radio (FDR). As shown in FIG. 13, in-band STR may be performed such that an AP and an STA form a pair to perform transmission and reception simultaneously with each other (see the left-side of the figure), or STAs perform only transmission or reception while the AP performs transmission and reception simultaneously (see the right-side of the figure). In the latter case (the right-side of FIG. 13), interference may occur between clients, and thus an additional interference cancellation technique may be needed.

Figure 14:
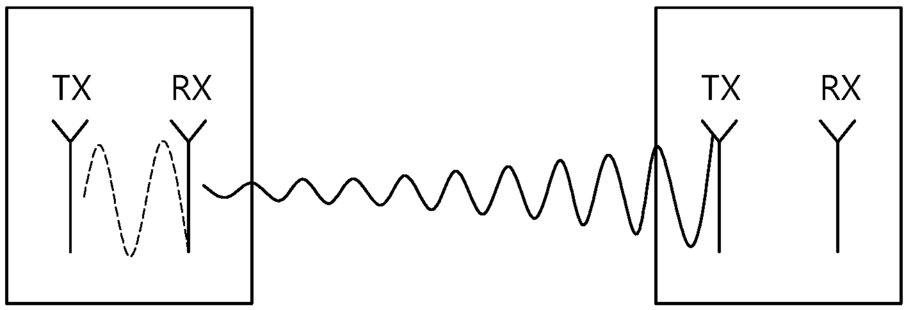
FIG. 14 illustrates an example in which a device performing STR generates self-interference.

FIG. 14 illustrates an example in which a device performing STR generates self-interference.

Referring to FIG. 14, when a wireless device performs STR, since an TX and RX antennas are adjacent to each other inside the wireless device, a transmission signal of the wireless device may interfere with a signal being received by the wireless device. Therefore, self-interference cancellation is required, for which various methods as shown in the following references may be applied.

TABLE 11

| Reference | Band | Bandwidth | # Antenna | # RF | Cancellation Antenna | Cancellation Analog | Cancellation Digital | Total |
|---|---|---|---|---|---|---|---|---|
| MSR [8] | 530 MHz | | 2 | 2 | 25~30 dB | 30 dB | | 55~60 dB |
| Rice [9] | 2.4 GHz | 625 KHz | 2 | 3 | 39~45 dB | 31~33 dB | | 78~80 dB |
| Stanford [10] | 2.4 GHz | 5 MHz 802.15.4 | 3 | 2 | 30 dB | 20 dB | 10 dB | 60 dB |
| Stanford [4] | 2.4 GHz | 10 MHz 802.11n | 2 | 2 | | 45 dB | 28 dB | 73 dB |
| Stanford [7] | 2.4 GHz | 80 MHz 802.11ax | 1 | 2 | | 60 dB | 50 dB | 110 dB |
| NEC [11] | 5 GHz | 10 MHz WiMAX | 4 | 2 | 10(polar) + 45 dB | | 20 dB | 75 dB |
| Princeton [12] | 2.4 GHz | 625 KHz | 2M + 2N | M + N | 37 dB | | | |
| NYU [13] | 914 MHz | 26 MHz | 1 | 2 | 40~45 dB | 14 dB | | 59 dB |

Assumption: In general, DL refers to transmission from an AP to an STA, and UL refers to transmission from an STA to an AP. However, since the present disclosure assumes DL/UL for the convenience of description, an AP may be interpreted as an AP, a Mesh, a Relay, or an STA; likewise, an STA may be interpreted as an AP, a Mesh, a Relay, or an STA. Also, since fields such as STF and LTF are not relevant to the description of the present disclosure, they are omitted.

The present disclosure proposes a method for applying STR in a WiFi system by an AP by initiating STR. Methods for initiating STR by an AP may be divided largely into two types. To initiate STR, an AP may include signal information for a UL frame within a DL frame (method 1-1) when the DL frame is transmitted or use a separate trigger frame (method 1-2).

1-1. Method of Including Signal Information for a UL Frame within a DL Frame

Figure 15:
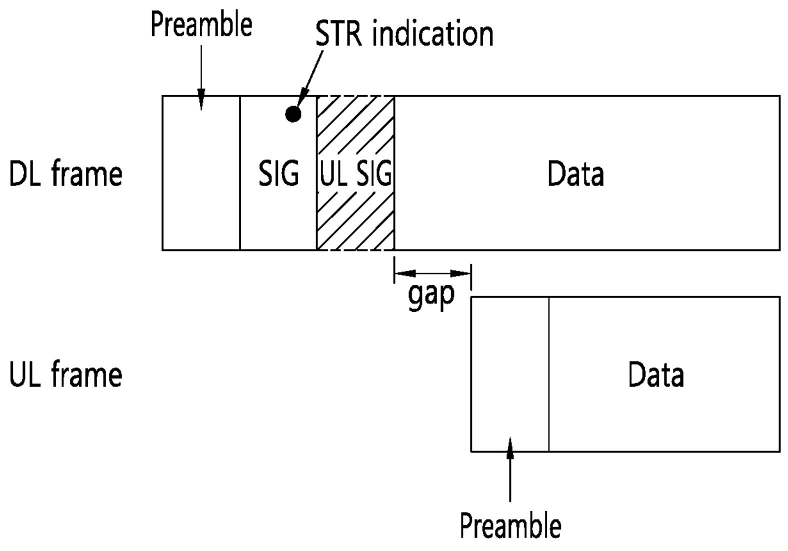
FIG. 15 illustrates an example of a DL/UL frame structure and transmission timing in the STR.

FIG. 15 illustrates an example of a DL/UL frame structure and transmission timing in the STR.

Regarding the first method, as shown in FIG. 15, to initiate STR, an AP may transmit a DL frame by including signal information for a UL frame within the DL frame. In this case, an STA has to transmit its UL frame after reading the information. At this time, since it takes time to generate a UL frame after the STA reads and decodes the signal information, the STA may transmit the UL frame only after a time period of 'gap' from the time the signal information is received. (The time period of 'gap' may be SIFS or DIFS, for example.)

The signal information for the UL frame (the UL SIG portion in FIG. 15) may be generated by newly adding a SIG field for the UL frame or by adding only the contents for UL frame allocation to the existing SIG field. However, an indication that the signal information has been included has to be placed before the UL SIG. If this is called STR indication, this indication may be added as a reserved bit of the existing SIG field or added as anew frame type. Or the indication may be defined as a new PHY structure. The UL SIG included in the SIG field should contain at least the ID of an STA to which a UL frame is transmitted. Or if a SIG field including the STA ID, such as the HE-SIG-B, is already included, the indication may be omitted. (if all the STAs receiving data of the DL frame transmit a UL frame through STR) in addition to the indication, information included in the existing SIG such as a TXOP value for UL transmission, RU allocation (if MU OFDMA is applied), frame length, MCS, or coding type may all be included. However, if TXOP, RU allocation, or frame length is to be matched to the DL frame, these values may be omitted; if MCS, coding type, and the like are subject to the determination made by an STA for transmission of the UL frame, these values may also be omitted. If all of the values may be omitted, an AP may trigger STR by using only the STR indication. If all of the values are needed, as an example of using the existing frame format, UL SIG information may be provided by inserting the HE-SIG-B after STR indication is handled by using a reserved bit (for example, B14) of the HE-SIG-A of the DL frame transmitted to the HE SU PPDU and the HE ER SU PPDU. In other words, in this case, the HE-SIG-B is transmitted to inform of configuration of the UL frame rather than the DL frame. As another example, to support STR by a DL frame transmitted to the HE MU PPDU, a reserved bit (for example, B7) of the HE-SIG-A field may be used for STR indication, and the HE-SIG field for the UL frame may be transmitted additionally after transmission of the HE-SIG-B for the DL frame. The UL SIG field may be similar to the HE-SIG-B but may not include any of the values that may be omitted.

Figure 16:
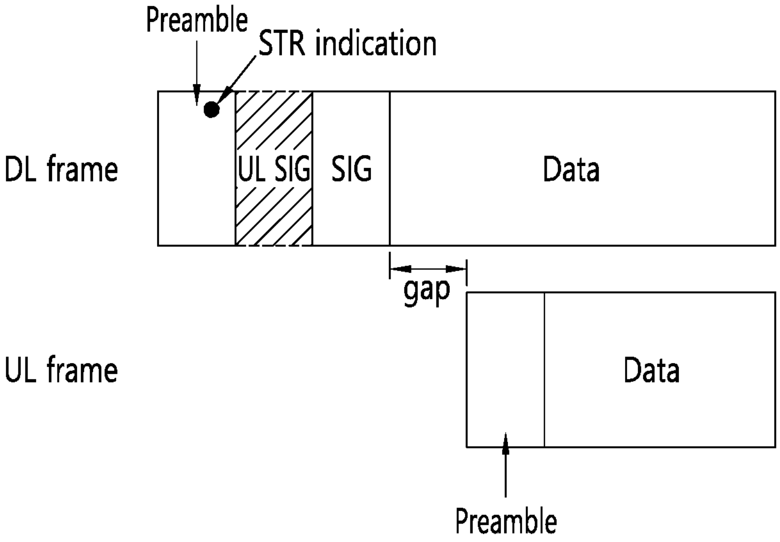
FIG. 16 illustrates another example of a DL/UL frame structure and transmission timing in the STR.

FIG. 16 illustrates another example of a DL/UL frame structure and transmission timing in the STR.

As another example, as shown in FIG. 16, for fast transmission of a UL frame, STR indication may be transmitted through a reserved bit of the L-SIG. In this case, the UL SIG field may be transmitted before the DL SIG field, and transmission of the UL frame may be initiated after a time period of 'gap' from the time the UL SIG field is received. At this time, since STAs have to check whether they are allocated to the STR, STA ID values have to be included in the UL SIG field. In addition, BSS ID (BSS color), RU allocation for configuration of the UL frame, BW, TXOP duration, UL PPDU length, MCS, and coding type may be included in the UL SIG field.

Now, a structure of the UL frame will be described.

Figure 17:
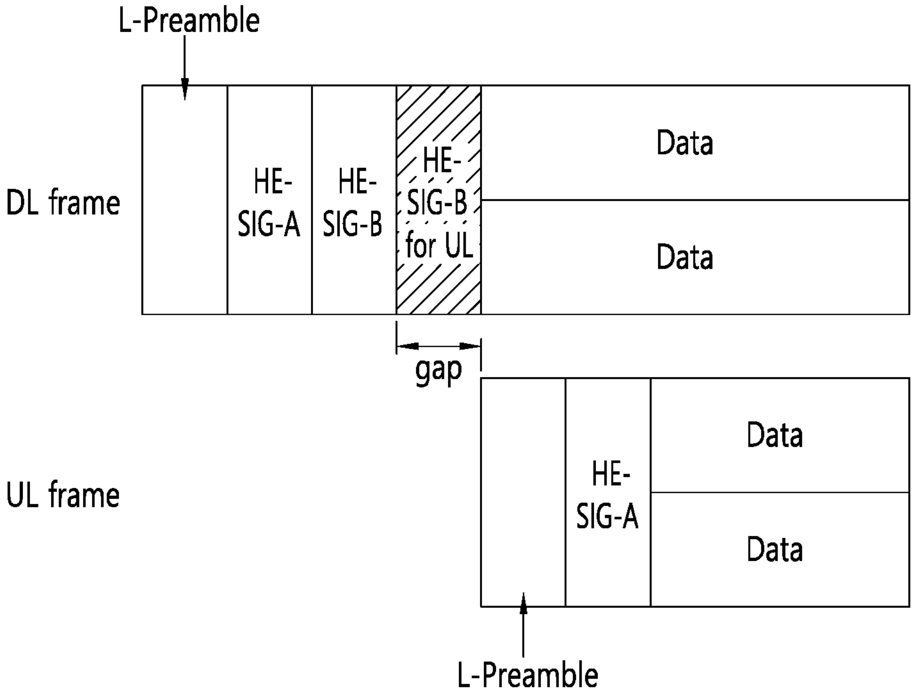
FIGS. 17 to 19 illustrate one example of a DL/UL frame structure and transmission timing for transmitting a UL frame in the STR.
Figure 18:
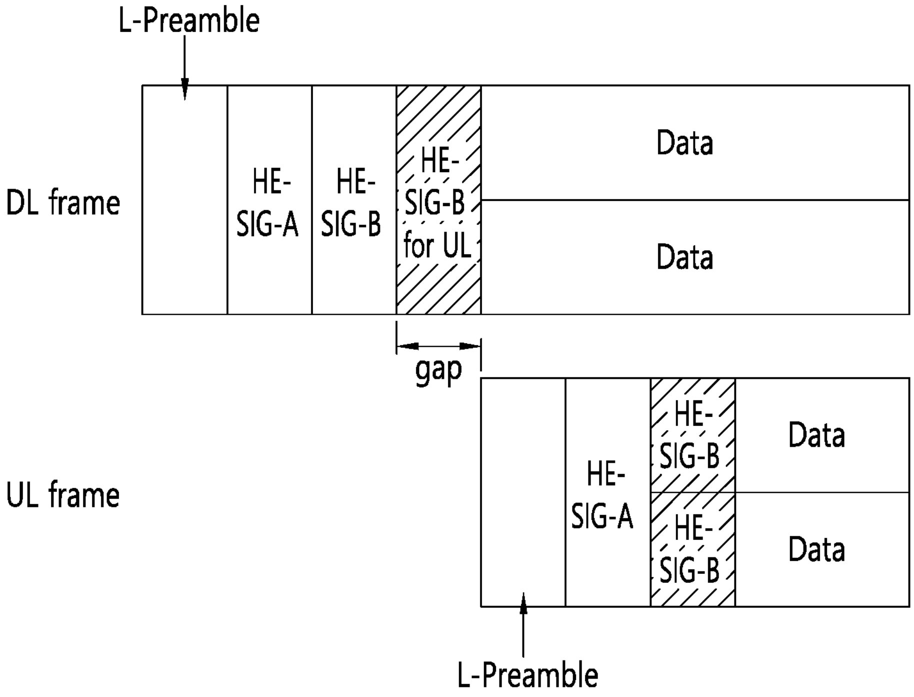
Figure 19:
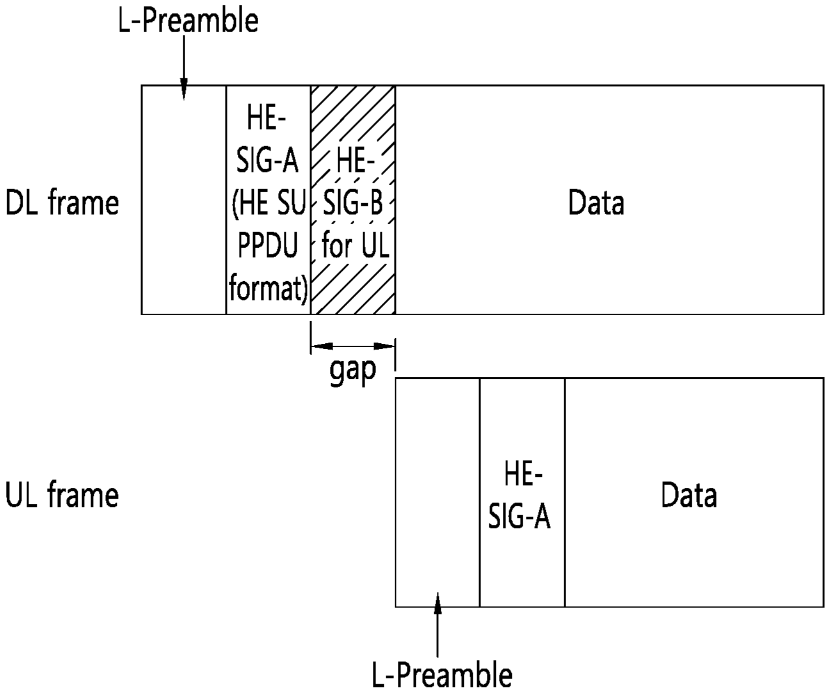

FIGS. 17 to 19 illustrate one example of a DL/UL frame structure and transmission timing for transmitting a UL frame in the STR.

A UL frame transmitted in the STR may include an L-preamble and a common SIG (HE-SIG-A in the case of 11ax format) for protection, decoding, and transmission time. At this time, the common SIG may include TXOP duration and UL frame length. At this time, the TXOP duration value may be obtained by subtracting a value measured from the L-preamble of a DL frame to the L-preamble of the UL frame from the TXOP duration included in a DL frame. Other specific UL SIG information may vary depending on the resolution of the UL SIG of the DL frame.

In other words, if the DL frame specifies even the MCS and the coding type of the UL frame, no particular UL SIG information is necessary; for example, since DL transmission becomes similar to the UL MU procedure of the 11 ax (when an AP determines all of the structure of the UL frame), additional SIG information is not required. Therefore, in this case, the TB PPDU structure of the 11 ax may be used. Or if DL frame informs of only the ID of an STA to transmit the UL frame and RU allocation information (if a separate UL SIG or the same data as DL data are used to omit the other specific UL SIG information), since MCS, coding type, and so on should be informed to each STA before transmission of UL frame data, additional SIG information has to be transmitted before data transmission. If MU OFDMA transmission is performed while the 11ax frame structure is being used, since a SIG structure in which transmission is performed according to RU allocation is not supported, it becomes a newly defined SIG structure. Or if the transmission is based on an SU structure rather than an MU structure, transmission may be handled by using the HE SU PPDU and the HE ER SU PPDU format (refer to the examples of FIGS. 17 to 19). Or even when a new STR UL frame structure is defined, a SIG structure is required, in which transmission is performed according to RU allocation after common SIG transmission. As described above, a newly defined SIG structure (the HE-SIG-B for UL of FIGS. 17 to 19) may include information such as MCS and coding type for data transmission for each STA.

1-2. Method of Using a Trigger Frame

Figure 20:
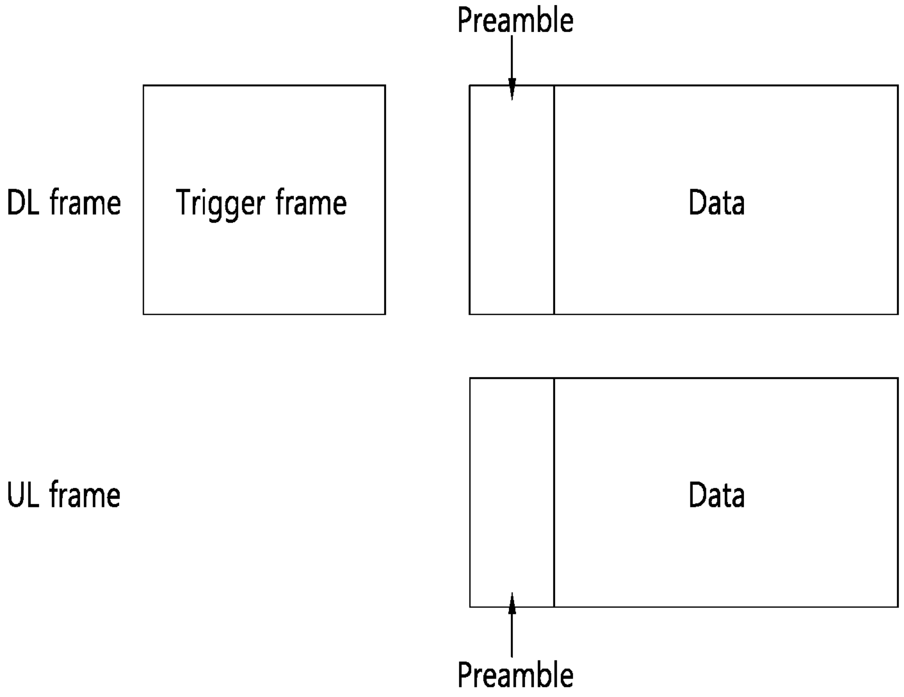
FIG. 20 illustrates one example of using a trigger frame to transmit a UL frame in the STR.

FIG. 20 illustrates one example of using a trigger frame to transmit a UL frame in the STR.

As a second method, as shown in FIG. 20, an AP may use a trigger frame separately for STR. At this time, unlike the UL MU procedure that uses a trigger frame of the existing 11ax, not only a UL frame but also a DL frame are transmitted after the trigger frame. (Or after the L-preamble of a DL frame is received or after up to the SIG information is received, the UL frame may be transmitted after a time period of 'gap') Therefore, in order to use the existing trigger frame, STR indication should be included. For example, STR may be added to the trigger frame type 1010. Or a Basic Trigger variant may be used for the trigger frame type, and a reserved bit (B5) of the Trigger Dependent User Info Field 1150 may be used for STR indication. When STR is applied to the MU OFDMA structure, it may be advantageous for interference cancellation and hidden node problems if RU allocations for DL and UL frames applied to one STR are the same and the frames end at the same timing. Therefore, in that case, SIG information such as an STA ID, RU allocation, TXOP duration, or frame length may be omitted when a DL frame following the trigger frame is transmitted.

For both cases above, the following rules may be applied.

(1) DL transmission and UL transmission may be synchronized to end at the same time to avoid a hidden node problem. Afterwards, if necessary, UL/DL Ack/BA frame may also be transmitted through STR.

(2) If MU OFDMA is used for STR, UL transmission may be performed by using RUs such as DL RUs allocated to each STA or by using part of the RUs. If part of the RUs are used, part of subcarriers at both ends of RUs to which a DL frame is allocated may be nulled for interference mitigation from packets of other STAs, after which a UL frame may be transmitted.

When the STR is applied as shown in FIGS. 15 to 20, an STA receiving a DL frame and an STA transmitting a UL frame may be different. In this case, STA ID and RU allocation information have to be included in each of the DL SIG and the UL SIG included in the DL STR frame. The remaining information may be configured as described above.

2. Proposed Embodiments

The present disclosure proposes a structure of an OFDMA-based FDR PPDU in the WLAN system (802.11).

The present disclosure proposes a method and a PPDU structure enabling UL or DL transmission by allocating a specific STA to an empty resource unit (RU) during DL or UL transmission using the 802.11 OFDMA structure (as shown in FIGS. 4 to 6). Various FDRs as shown below may be taken into consideration, and the present disclosure is based on a situation where DL transmission is performed first and a situation where UL transmission is performed first. In the FDR, first transmission is defined as primary transmission, and transmission performed later is defined as secondary transmission. The present disclosure assumes that in the case of secondary transmission, only one STA is allocated to a PPDU.

Also, the present disclosure may define an FDR PPDU based on a PPDU defined in the 802.11ax. In the embodiments as described below, an HE MU PPDU may correspond to the PPDU shown in FIG. 3, a trigger frame may correspond to the PPDU shown in FIG. 9, and an HE TB PPDU may correspond to the PPDU shown in FIG. 12. Also, the HE MU PPDU, HE SU PPDU, trigger frame, and fields (or subfield) included in the HE TB PPDU may also correspond to the fields (or subfields) of FIGS. 3 and 7 to 12.

Figure 21:
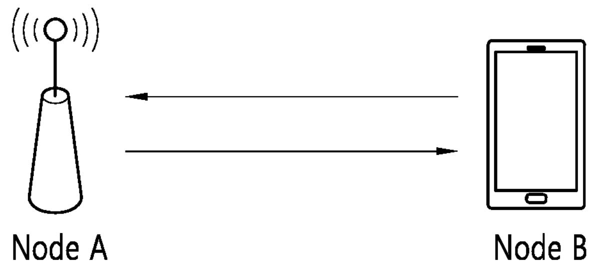
FIG. 21 illustrates an example of a symmetric FDR operation.
Figure 22:
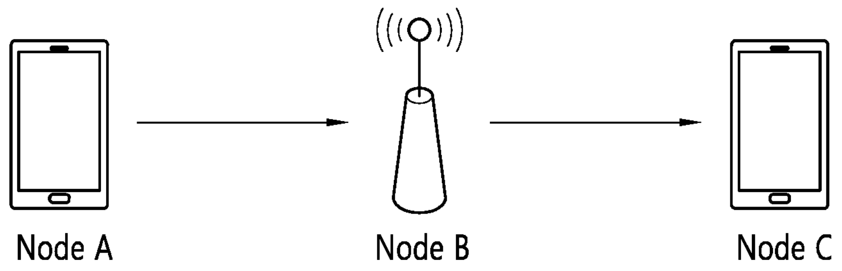
FIG. 22 illustrates an example of an asymmetric FDR operation.

FIG. 21 illustrates an example of a symmetric FDR operation. FIG. 22 illustrates an example of an asymmetric FDR operation.

Recently, Full-Duplex Radio (FDR), that is, a technique that enables a single transmitter and receiver to transmit and receive simultaneously, is actively researched. When FDR is employed, theoretical doubling of performance may be achieved in the MAC layer compared with the case when FDR is not employed, namely, a half-duplex scheme. However, one of major obstacles to implementing FDR is self-interference, that is, a signal transmitted by a specific STA is received back by the STA, interfering with the original signal to be received. Many studies have shown that cancellation performance more than 100 dB may be achieved at the current signal phase. If self-interference cancellation is successful in the PHY layer, a MAC protocol based on FDR operation is also required. FDR MAC is divided largely into two types: symmetric FDR and asymmetric FDR. FIGS. 8 and 9 illustrate examples of operations of the symmetric and the asymmetric FDR.

In the case of symmetric FDR, each transmission and reception occurs between two terminals. In other words, symmetric FDR is easier to implement than asymmetric FDR, but symmetric FDR exhibits a disadvantage that there should be data to be transmitted between exactly two terminals, which makes it difficult to be useful in real environments. On the other hand, in the case of asymmetric FDR, since two transmissions occur in pairs of different terminals, asymmetric FDR operation may occur with relatively more opportunities than the symmetric FDR; however, since transmission from node A to node B in FIG. 22 may cause inter-node interference to reception of node C, a terminal to perform FDR should be carefully selected.

2-1. DL Primary Transmission

Figure 23:
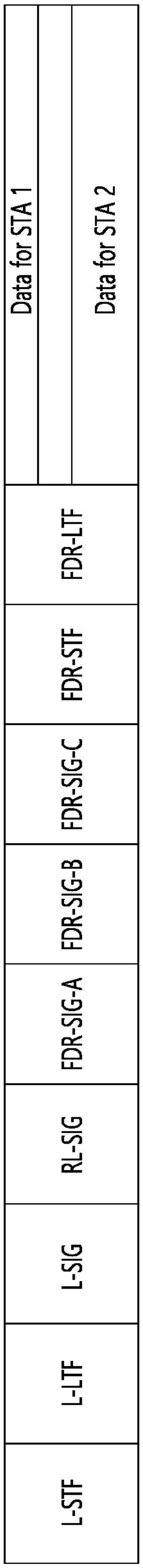
FIG. 23 illustrates an example of an OFDMA-based FDR MU PPDU.

FIG. 23 illustrates an example of an OFDMA-based FDR MU PPDU. For compatibility with the existing ax, the HE MU PPDU may be reused without modification; FDR-SIG-C has been inserted additionally; FDR-SIG-A and FDR-SIG-B may be the same as the existing HE-SIG-A and HE-SIG-B; and FDR-STF and FDR-LTF may be the same as HE-STF and HE-LTF. FDR-STF and FDR-LTF may be located after FDR-SIG-C as shown in FIG. 23 but may be located after FDR-SIG-B. Also, in anew format, FDR-STF and FDR-LTF may be located after RL-SIG or FDR-SIG-A; and RL-SIG may be omitted. However, in this case, additional packet classification is needed. FDR indication has to be performed before FDR-SIG-C and may be included in the L-SIG (RL-SIG) or FDR-SIG-A or FDR-SIG-B. In L-SIG or RL-SIG, a reserved 1 bit (B4) between Rate field and Length field may be used. When FDR indication is inserted to the FDR-SIG-A, B7 reserved field of HE-SIG-A2 may be used. When FDR indication is inserted to the FDR-SIG-B, a new 1-bit FDR indication field may be defined in the common field of HE-SIG-B. MCS of the FDR-SIG-C may be the same as that of the FDR-SIG-B.

In the example of FIG. 23, bandwidth may be 20/40/80/160 MHz. For the convenience of description, it is assumed that there are three RUs, but the band plan of the existing 11ax may be employed without modification. A first RU is allocated to STA1, a third RU is allocated to STA2, and a second RU is not allocated to any STA. In this case, according to an embodiment of the present disclosure, a specific STA is given an opportunity to transmit UL data by using the second RU. In other words, the second RU is split into several RUs, and one STA is allocated to each split RU. Information such as an ID of a specific STA to perform UL transmission, RU location, and transmission time may be sent to the FDR-SIG-C; MCS information or information to be used for UL transmission such as Nsts, DCM, and coding (for example, information included in the user specific field of HE-SIG-B of the HE MU PPDU) may be sent additionally so that the information may be used during transmission. STA ID may use a 11 bit STA ID as in the HE-SIG-B user specific field or a 9 bit partial AID (PAID) as used in the 11ax. Or a 12-bit AID may be used for the STA ID. The RU location may be informed in the form of a bitmap by considering that the RU location is divided by 26 RU units. For example, if a 20 MHz FDR MU PPDU is considered, since there are 9 26 RUs in total for bandwidth of 20 MHz, 9 bits may be used; if a first 52 RU is allocated for UL transmission, 1s are allocated only to the first 2 bits among the 9 bits and 0s are allocated to the remaining bits. In the case of 40 MHz, 18 bits are required, 37 bits are required for 80 MHz, and 74 bits are required for 160 MHz.

Therefore, when transmission are allocated to multi-STAs, as many bits as the number of bits multiplied by the number of STAs are needed. In this case, the common field and the user specific field of HE-SIG-B may be used without modification to indicate an RU and an ID of an STA to be used for UL transmission, by which overhead may be reduced. This operation may be effective for UL MU transmission. Information on transmission time may be carried in the FDR-SIG-C by adopting the Rate field and the Length field scheme of L-SIG without modification. Or the 7 bit TXOP field of HE-SIG-A may be defined in the FDR-SIG-C to be used for the transmission time. Or the transmission time may be represented in symbol units by using specific bits. For example, if 2 bits are used, a total of four cases may be represented, and a specific number of symbols is written to a value corresponding to each bit (for example, 4/8/12/16 symbols) so that transmission may be started after the corresponding number of symbols. The length (or number of symbols) until the transmission time may be the length from the point right after the FDR-SIG-C of the FDR MU PPDU to the time point of transmission or the length from the point right after the L-SIG of the FDR MU PPDU to the time point of transmission. Considering a case where STAs are allocated to another RU, it may be appropriate that the information on transmission time is included in the user specific field. In the user specific field, essential information (information contained in the user specific field of HE-SIG-B such as NSTS and MCS) to be used for UL transmission may be included without modification. In other words, FDR-SIG-C may use the original form of the FDR-SIG-B or may be configured in a form in which information on transmission time is included additionally.

Figure 24:
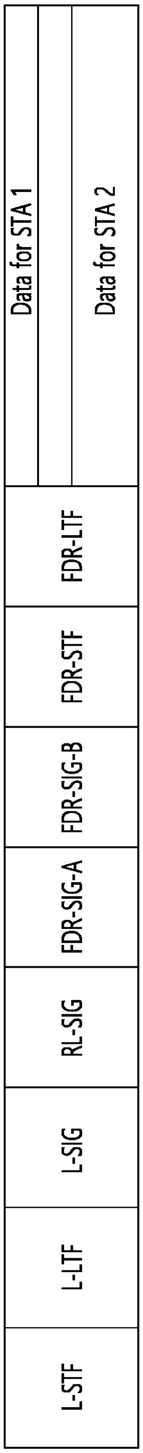
FIG. 24 illustrates another example of an OFDMA-based FDR MU PPDU.

Alternatively, as shown in FIG. 24, the information on transmission time may be transmitted by including related information in the FDR-SIG-B without using the FDR-SIG-C. FIG. 24 illustrates another example of an OFDMA-based FDR MU PPDU.

In the case of FIG. 24, information on an RU to be allocated for UL transmission, an STA ID to be allocated, and a transmission time point should be additionally included in the FDR-SIG-B. In this case, information on the RU allocation may be prevented from being included repeatedly in the FDR-SIG-C, and thereby overhead may be reduced. FDR indication may be included in the L-SIG (RL-SIG) or FDR-SIG-A or FDR-SIG-B in the same way as the case where FDR-SIG-C is used. An indication about an RU to be allocated for UL transmission may inform of whether each RU uses UL transmission by adding a UL indication subfield to the common field. For example, if the RU allocation subfield is 00000001, first seven 26 RUs and the last one 52 RU are used for DL transmission at 20 MHz. If a UL indication subfield of 1 bit is added to each of 8 RUs and is set to 1, the corresponding RU is used for UL transmission, and an ID of an STA to be allocated for UL transmission and information on transmission time have to be included additionally in the user specific field. Also, essential information to be used for UL transmission (information contained in the user specific field of the HE-SIG-B such as NSTS and MCS) may be included without modification therein. An RU to be used for UL transmission may be divided into smaller RUs to be used after MU allocation; in this case, information on RUs allocated among the split RUs should be carried in the user specific field, for which a bitmap in units of 26 RUs may be used. For example, if 52 RUs are used for UL transmission, divided in units of 26 RUs, and allocated to STA1 and STA2, a 2-bit RU allocation subfield may be included in the user specific field to indicate STA1 as 10 and STA2 as 01.

Figure 25:
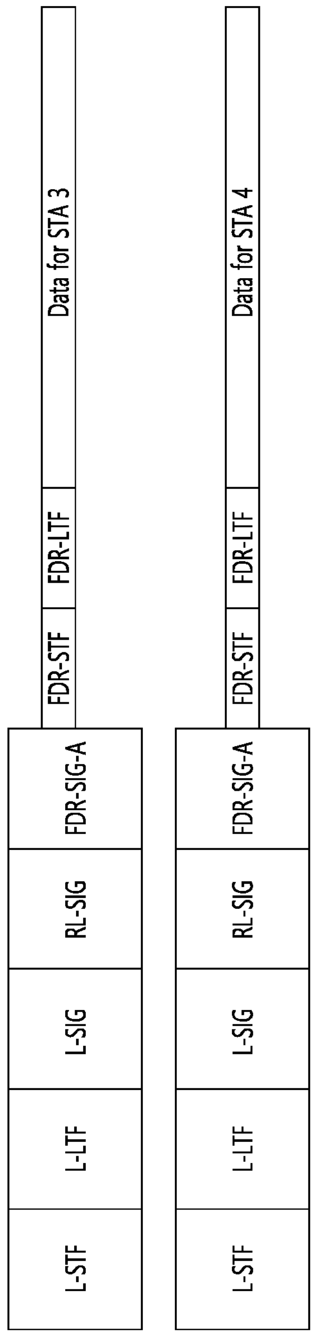
FIG. 25 illustrates an example of an OFDMA-based FDR UL PPDU.

FIG. 25 illustrates an example of an OFDMA-based FDR UL PPDU.

FIG. 25 shows a structure of an FDR UL PPDU and may use the existing HE TB PPDU format without modification. In other words, FDR-SIG-A, FDR-STF, and FDR-LTF may correspond to the HE-SIG-A, HE-STF, and HE-LTF of the HE TB PPDU. FIG. 25 shows an example where the second RU is divided into two RUs and allocated to STA3 and STA4; considering OFDMA of an actual 11ax system, the second RU may be divided in units of at least 26 RUs.

FIG. 26 illustrates another example of an OFDMA-based FDR UL PPDU. FIG. 26 illustrates a PPDU that may reduce interference by allocating the FDR-SIG-A of FIG. 25 to be equal to the size of an RU split from the second RU. In this case, contents of the FDR-SIG-A may be the same as the contents of the HE-SIG-A of the HE SU PPDU.

Figure 27:
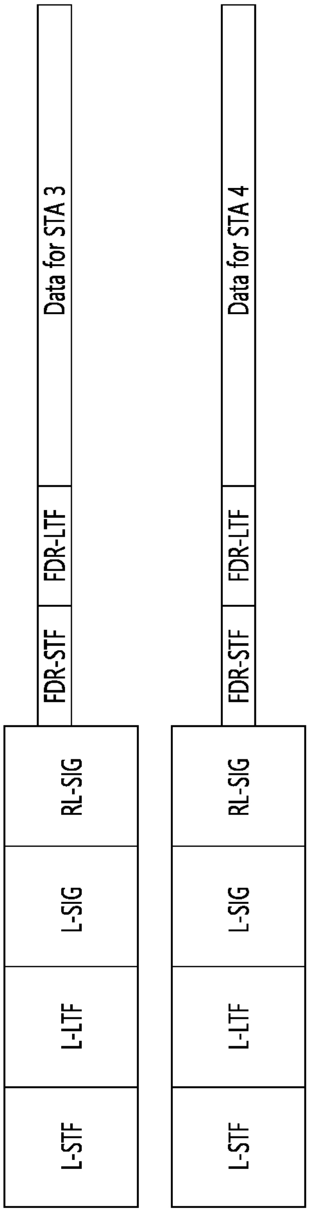
FIG. 27 illustrates yet another example of an OFDMA-based FDR UL PPDU.

FIG. 27 illustrates yet another example of an OFDMA-based FDR UL PPDU. FIG. 27 shows a PPDU format that contains essential information to be used for transmission in the FDR-SIG-B or the FDR-SIG-C of the FDR MU PPDU (DL PPDU) described above and indicates that the FDR-SIG-A of FIG. 25 may be omitted if transmission is performed based on the essential information without modification.

Figure 28:
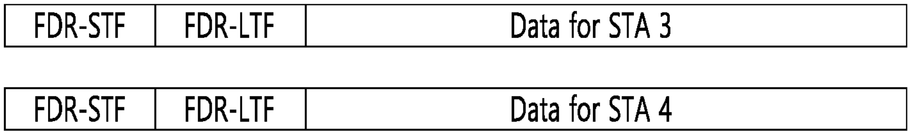
FIG. 28 illustrates still another example of an OFDMA-based FDR UL PPDU.

FIG. 28 illustrates still another example of an OFDMA-based FDR UL PPDU.

In this case, FDR-SIG-B or FDR-SIG-C may necessarily require the user specific field. In this case, L-preamble of the FDR UL PPDU may also be removed. In other words, the FDR UL PPDU may consist of only FDR-STF, FDR-LTF, and data. In this case, timing and frequency recovery have to be corrected by using FDR-STF, FDR-LTF, and pilot; and the FDR UL PPDU may be transmitted after some amount of correction. However, this case exhibits a disadvantage that a large amount of information has to be carried in the FDR-SIG-B or the FDR-SIG-C.

Figure 29:
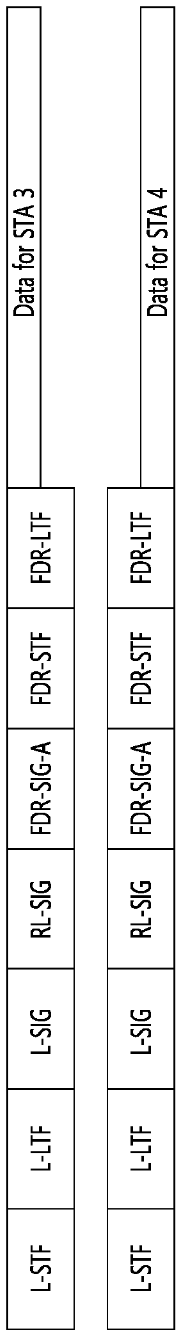
FIG. 29 illustrates yet still another example of an OFDMA-based FDR UL PPDU.
Figure 30:
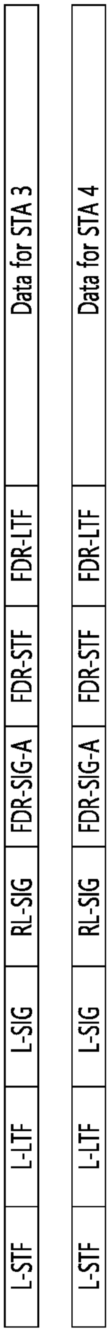
FIG. 30 illustrates still yet another example of an OFDMA-based FDR UL PPDU.

FIGS. 29 and 30 illustrate yet still another example of an OFDMA-based FDR UL PPDU.

As shown in FIG. 29, L-preamble and FDR-SIG-A may be used to form anew structure and transmitted by being allocated as much as the size of the second RU or as shown in FIG. 30, may be allocated according to the size of a split RU. In this way, interference to STA1 and STA2 receiving the transmission from an FDR MU PPDU may be reduced. However, since L-preamble is no longer the same as an existing L-preamble (this is so because the L-preamble is not transmitted over the whole band), the existing role may not be performed properly. Also, if the size of the FDR-STF is set to the size of the second RU rather than the size of a split RU, a problem may occur on the AGC, and if the size of the FDR-LTF is also set to the size of the second RU, an error may occur in channel estimation.

Figure 31:
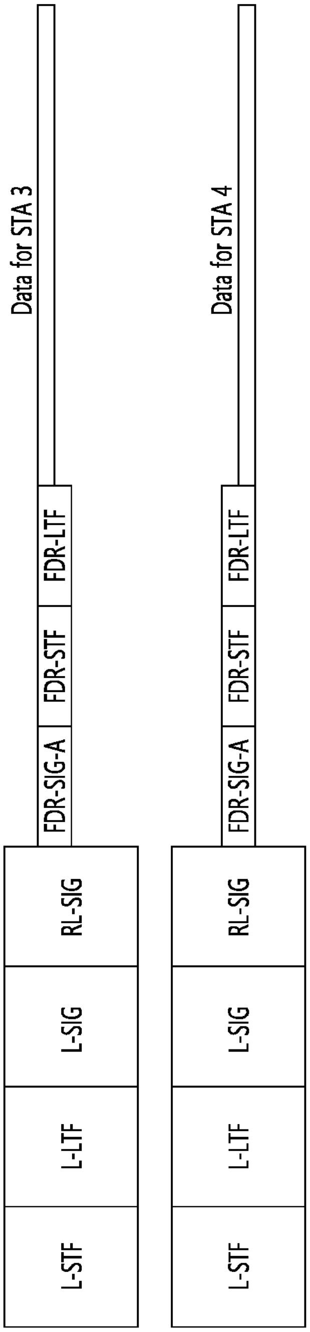
FIG. 31 illustrates further yet another example of an OFDMA-based FDR UL PPDU.
Figure 32:
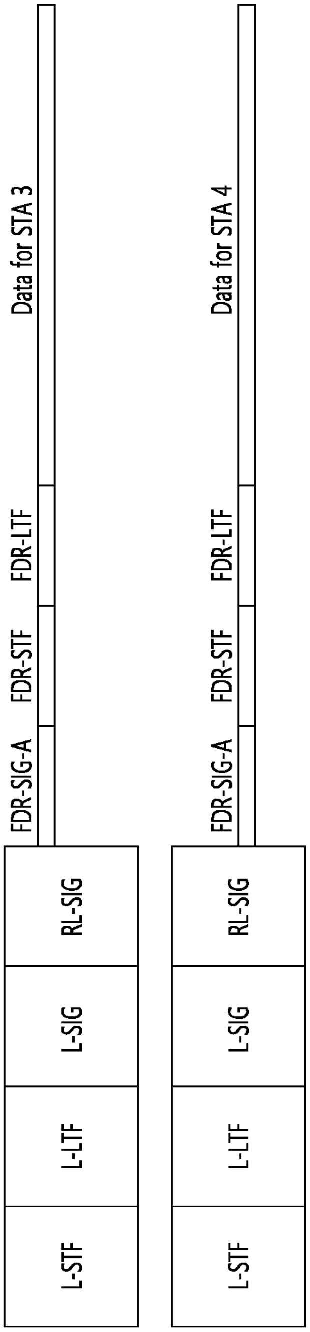
FIG. 32 illustrates further still another example of an OFDMA-based FDR UL PPDU.
Figure 33:
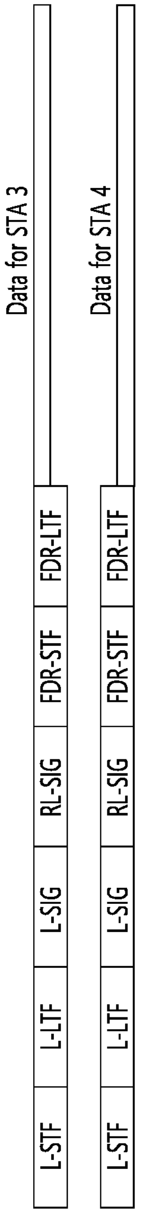
FIGS. 33 to 36 illustrate further yet still another example of an OFDMA-based FDR UL PPDU.
Figure 34:
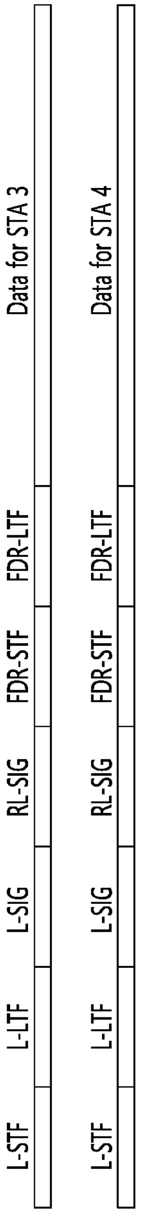
Figure 35:
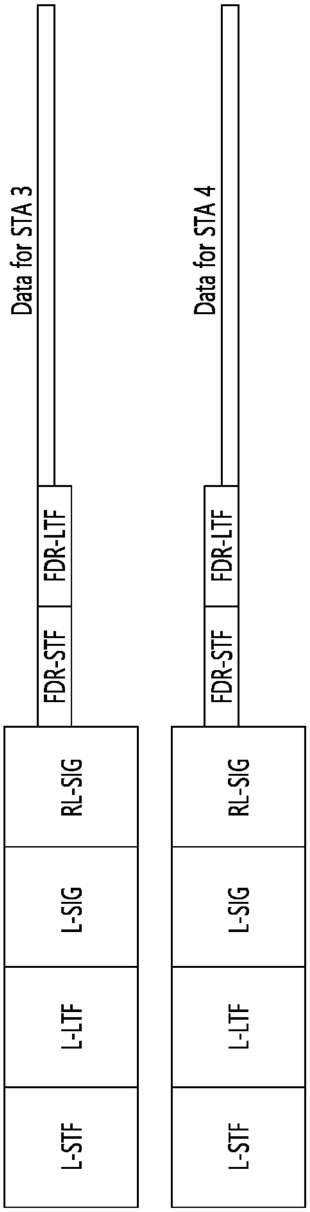
Figure 36:
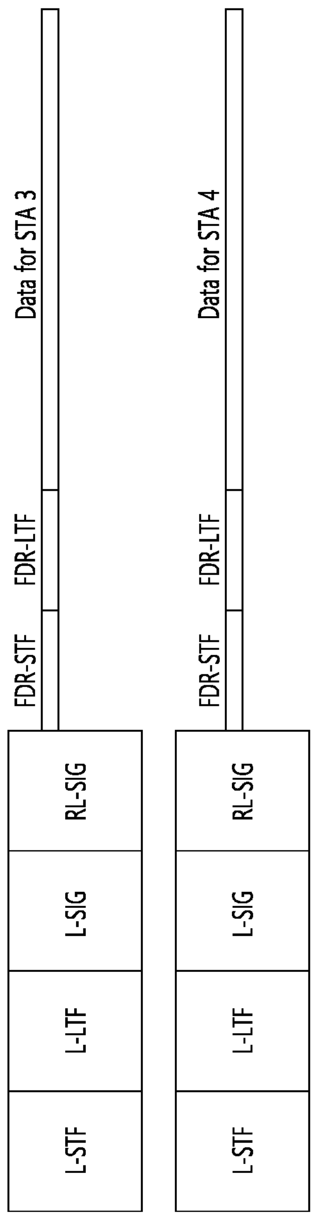

FIGS. 31 and 32 illustrate further yet another example of an OFDMA-based FDR UL PPDU.

As shown in FIG. 31, an FDR UL PPDU may be transmitted by allocating the L-preamble to have its original size but allocating rest of the fields to have the size of the second RU. Or as shown in FIG. 32, an FDR UL PPDU may be transmitted by allocating the L-preamble to have its original size but allocating rest of the fields to have the size of an RU split from the second RU.

FIGS. 33 to 36 illustrate further yet still another example of an OFDMA-based FDR UL PPDU.

FIGS. 33 to 36 show PPDU formats that contain essential information to be used for transmission in the FDR-SIG-B or the FDR-SIG-C of the FDR MU PPDU described above and indicate that the FDR-SIG-A may be omitted if transmission is performed based on the essential information without modification.

Figure 37:
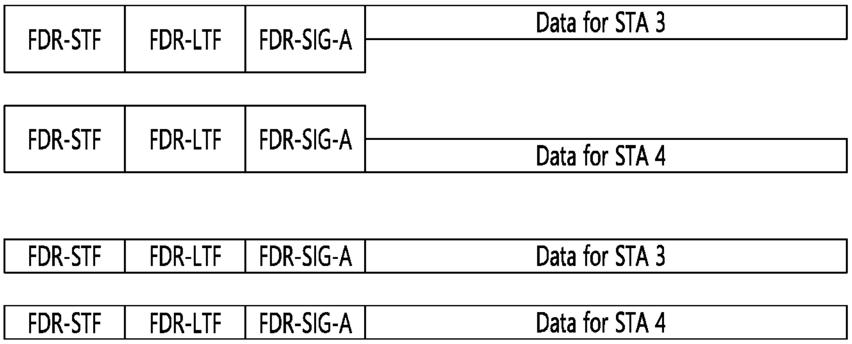
FIG. 37 illustrates further still yet another example of an OFDMA-based FDR UL PPDU.

FIG. 37 illustrates further still yet another example of an OFDMA-based FDR UL PPDU.

Referring to FIG. 37, if FDR-SIG-B or FDR-SIG-C of the FDR MU PPDU includes only the information on UL STA ID, RU location, and transmission time but does not include other information to be used for UL transmission in a new structure, the other information has to be included at the time of UL transmission, which may necessitate FDR-SIG-A. In this case, L-preamble may be removed; FDR-SIG-A may be located after FDR-LTF and allocated according to the size of the second RU allocated or according to the size of an RU split from the second RU. In this case, timing and frequency recovery have to be corrected by using FDR-STF, FDR-LTF, and pilot; and the FDR UL PPDU may be transmitted after some amount of correction. In this case, interference on DL STAs may be reduced, and overhead of FDR-SIG-B or FDR-SIG-C of DL may also be reduced.

Figure 38:
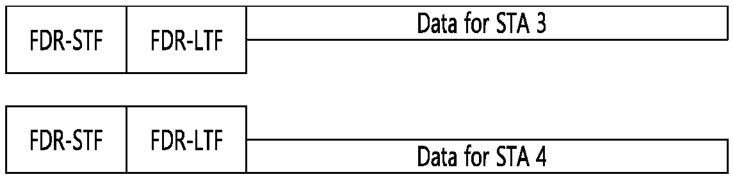
FIG. 38 illustrates yet further another example of an OFDMA-based FDR UL PPDU.

FIG. 38 illustrates yet further another example of an OFDMA-based FDR UL PPDU.

As shown in FIG. 38, the FDR-SIG-A may be additionally removed from the PPDU shown in the upper part of FIG. 37, and information essential for transmission may be included in the user specific field of the FDR-SIG-B or FDR-SIG-C.

Figure 39:
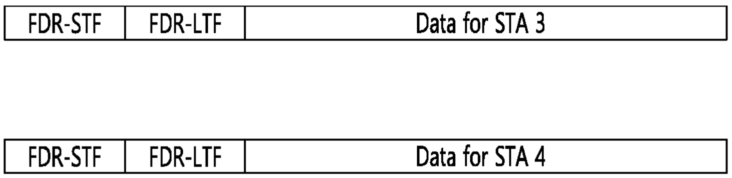
FIG. 39 illustrates still further another example of an OFDMA-based FDR UL PPDU.

FIG. 39 illustrates still further another example of an OFDMA-based FDR UL PPDU.

As shown in FIG. 39, the FDR-SIG-A may be additionally removed from the PPDU shown in the lower part of FIG. 37, and information essential for transmission may be included in the user specific field of the FDR-SIG-B or FDR-SIG-C.

Transmission of an FDR UL PPDU may be started right at the transmission time defined in the information of the FDR-SIG-B or FDR-SIGC, or the transmission may be started after a predetermined time period for the convenience of implementing transmission and reception. The predetermined time period may be SIFS or DIFS. Transmission of the FDR UL PPDU may be designed not to exceed a duration informed by using the Rate field and the Length field of the L-SIG of the FDR MU PPDU. Or the Rate field and length field of the L-SIG of the FDR MU PPDU may be set by considering even the length of the FDR UL PPDU.

Figure 40:
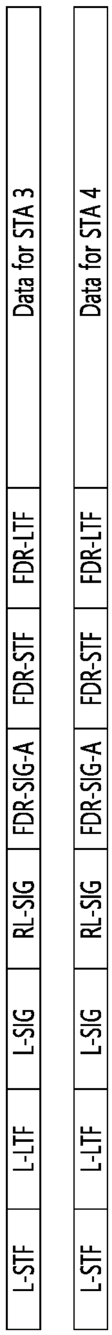
FIG. 40 illustrates yet still further another example of an OFDMA-based FDR UL PPDU.

FIG. 40 illustrates yet still further another example of an OFDMA-based FDR UL PPDU.

If an empty RU is a multiple of 20 MHz and is used for UL transmission by being allocated to one STA for each bandwidth of 20 MHz, the UL transmission may be performed by using an FDR SU PPDU that reuses the HE SU PPDU, where FIG. 40 shows a structure of an FDR SU PPDU. FIG. 40 shows an example where the second RU spans bandwidth of 40 MHz, and each of STA3 and STA4 is allocated bandwidth of 20 MHz.

Figure 41:
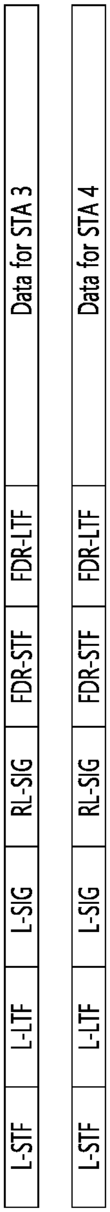
FIG. 41 illustrates still yet further another example of an OFDMA-based FDR UL PPDU.

FIG. 41 illustrates still yet further another example of an OFDMA-based FDR UL PPDU.

FIG. 41 shows a PPDU format that contains essential information to be used for transmission in the FDR-SIG-B or the FDR-SIG-C of the FDR MU PPDU and indicates that the FDR-SIG-A may be omitted if transmission is performed based on the essential information without modification.

Figure 42:
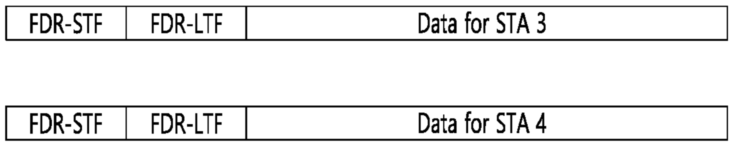
FIG. 42 illustrates even yet another example of an OFDMA-based FDR UL PPDU.

FIG. 42 illustrates even yet another example of an OFDMA-based FDR UL PPDU.

Referring to FIG. 42, L-preamble may also be removed from the PPDU of FIG. 41. In other words, the FDR MU PPDU may consist of only FDR-STF, FDR-LTF, and data. In this case, timing and frequency recovery have to be corrected by using FDR-STF, FDR-LTF, and pilot; and the FDR UL PPDU may be transmitted after some amount of correction.

Figure 43:
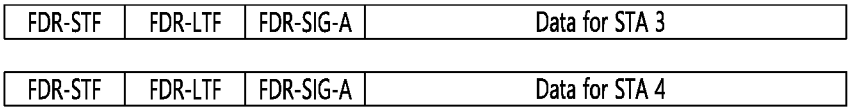
FIG. 43 illustrates even still another example of an OFDMA-based FDR UL PPDU.

FIG. 43 illustrates even still another example of an OFDMA-based FDR UL PPDU.

Also, if FDR-SIG-B or FDR-SIG-C of the FDR MU PPDU includes only the information on UL STA ID, RU location, and transmission time but does not include other information to be used for UL transmission, the other information has to be included at the time of UL transmission, which may necessitate FDR-SIG-A. In this case, L-preamble may be removed, and FDR-SIG-A may be located after FDR-LTF. In this case, timing and frequency recovery have to be corrected by using FDR-STF, FDR-LTF, and pilot; and the FDR UL PPDU may be transmitted after some amount of correction. The PPDU format of FIG. 43 is also capable of reducing overhead of FDR-SIG-B or FDR-SIG-C of DL.

Transmission of an FDR SU PPDU may be started right at the transmission time defined in the information of the FDR-SIG-B or FDR-SIGC, or the transmission may be started after a predetermined time period for the convenience of implementing transmission and reception. The predetermined time period may be SIFS or DIFS. Transmission of the FDR SU PPDU may be designed not to exceed a duration informed by using the Rate field and the Length field of the L-SIG of the FDR MU PPDU. Or the Rate field and length field of the L-SIG of the FDR MU PPDU may be set by considering even the length of the FDR SU PPDU.

Figure 44:
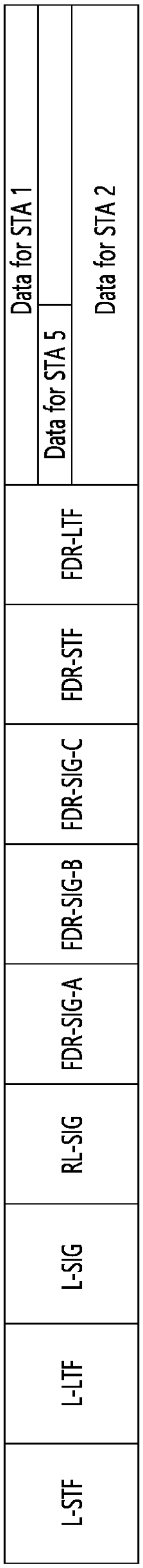
FIGS. 44 and 45 illustrate yet another example of an OFDMA-based FDR MU PPDU.
Figure 45:
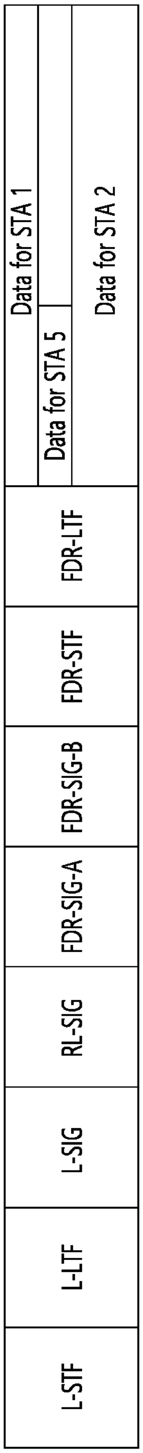

FIGS. 44 and 45 illustrate yet another example of an OFDMA-based FDR MU PPDU.

In addition to the embodiment described above, there may be a case where data to be transmitted run out in the middle of DL transmission in a specific RU of the FDR MU PPDU as illustrated in FIGS. 44 and 45, and in this case, too, transmission of the FDR UL PPDU or the FDR SU PPDU is possible for the various cases proposed in FIGS. 25 to 35. In other words, transmission of the FDR UL PPDU may be performed by allocating STA3 to an empty RU next to the data field of STA5 transmitting the FDR MU PPDU through DL as described in FIGS. 44 and 45.

Figure 46:
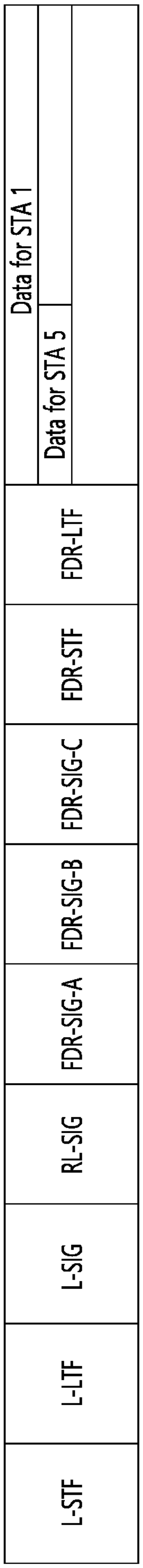
FIG. 46 illustrates still another example of an OFDMA-based FDR MU PPDU.
Figure 47:
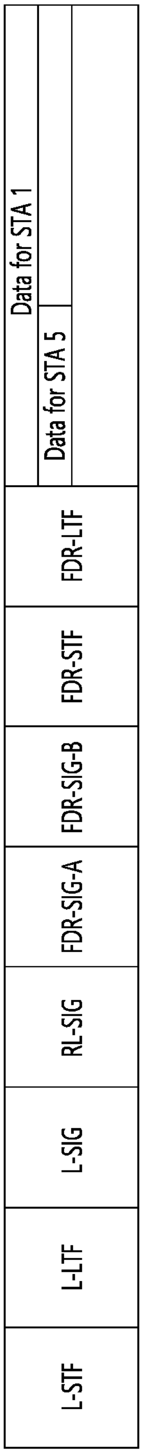
FIG. 47 illustrates yet still another example of an OFDMA-based FDR MU PPDU.

FIGS. 46 and 47 illustrate still another example of an OFDMA-based FDR MU PPDU.

Also, transmission of the FDR UL PPDU may be performed by allocating STA3 and STA4 to an empty RU next to the data field of STA5 transmitting the FDR MU PPDU through DL as described in FIGS. 46 and 47; and furthermore, FDR UL PPDU or FDR SU PPDU may be transmitted by allocating another STA (it is assumed to be STA6) to the third RU next to the FDR-LTF.

In addition, when no data is transmitted from the beginning to a specific RU in the FDR MU PPDU (the third RU in FIGS. 46 and 47), FDR-STF and FDR-LTF of the corresponding RU may be transmitted after being emptied, for which case, an STA allocated to that RU and performing secondary UL transmission may start transmission at the time of FDR-STR transmission of the FDR MU PPDU. Or transmission may be performed after a time period of SIFS or DIFS from the FDR-STF transmission time.

The UL MIMO transmission described above may also be considered. In other words, it is possible to perform UL MU MIMO transmission without splitting the second RU but allocating it over several STAs. In the PPDU described above, the UL MU MIMO transmission is made possible when all the fields are the same (except for the case where the PPDU is reduced to the size of a split RU) and the RU size of the data field is changed to be equal to the size of the second RU.

The FDR MU PPDU proposed in the embodiment above may be referred to as a primary FDR MU PPDU, and the FDR UL PPDU and the FDR SU PPDU may be referred to as a secondary FDR UL PPDU and a secondary FDR SU PPDU. In other words, FIGS. 23 to 47 illustrate a PPDU used for FDR operation that performs DL transmission prior to UL transmission.

2-2 UL Primary Transmission

An FDR TB PPDU may be transmitted first (UL primary transmission) through a procedure such as one used for the existing HE TB PPDU, after which an FDR SU PPDU or an FDR MU PPDU may be transmitted (DL secondary transmission) by using an empty RU.

Figure 48:
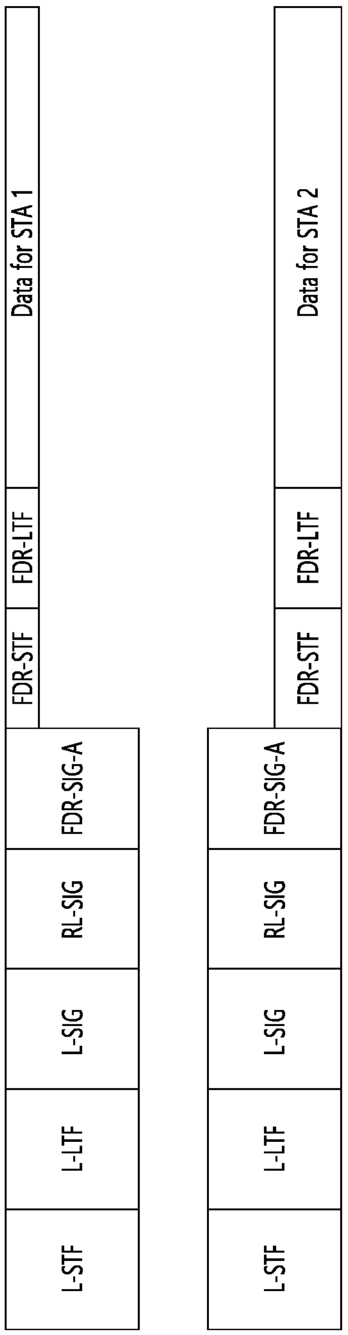
FIG. 48 illustrates an example of an OFDMA-based FDR TB PPDU.

FIG. 48 illustrates an example of an OFDMA-based FDR TB PPDU.

For transmission of an FDR TB PPDU, an AP may transmit a trigger frame (before UL primary transmission), and as described above related to the existing method, an FDR indication may be included in the trigger frame for transmission of an FDR SU PPDU or an FDR MU PPDU by using an empty RU after transmission of the FDR TB PPDU. In addition, for FDR indication, B63 reserved field of the common info field may be used. Alternatively, the FDR indication may be inserted to the FDR TB PPDU to prepare other STAs to receive a DL PPDU from the AP. FIG. 48 shows a structure of an FDR TB PPDU, indicating that STA1 and STA2 are allocated for transmission to the first RU and the third RU, respectively, while the second RU is empty. In FIG. 48, the bandwidth of each PPDU may be 20/40/80 MHz. For the convenience of description, three RUs are assumed, but the tone plane of an actual 11ax may be applied.

Since the FDR TB PPDU may reuse the HE TB PPDU without modification, the FDR-SIG-A, FDR-STF, and FDR-LTF may be the same as the existing HE-SIG-A, HE-STF, and HE-LTF. In addition, FDR indication may be included, and in the L-SIG or RL-SIG, a reserved 1 bit (B4) between the Rate field and the Length field may be used, or when the FDR indication is included in the FDR-SIG-A, B23 of the HE-SIG-A1 or one bit of B7 to 15 in the Reserved field of HE-SIG-A2 may be selected and used for the FDR indication.

Figure 49:
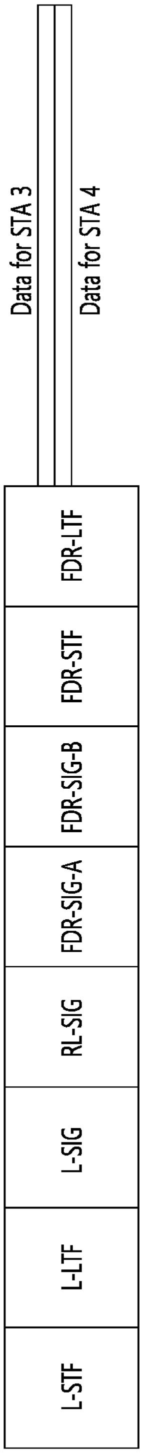
FIG. 49 illustrates an example of an OFDMA-based FDR MU PPDU.

FIG. 49 illustrates an example of an OFDMA-based FDR MU PPDU.

FIG. 49 illustrates a structure of an FDR MU PPDU for transmitting data to several STAs by splitting a second RU that is empty when an FDR TB PPDU is transmitted into a plurality of smaller RUs and allocating the split RUs to the several STAs, where the transmission may be started after FDR-SIG-A of the HE TB PPDU. For example, FIG. 49 illustrates a structure of an FDR MU PPDU where data are transmitted by splitting the second RU into two RUs and allocating the split RUs to STA3 and STA4.

The FDR MU PPDU may reuse the HE MU PPDU without modification, namely, FDR-SIG-A, FDR-SIG-B, FDR-STF, and FDR-LTF may be the same as the HE-SIG-A, HE-SIG-B, HE-STF, and HE-LTF.

Figure 50:
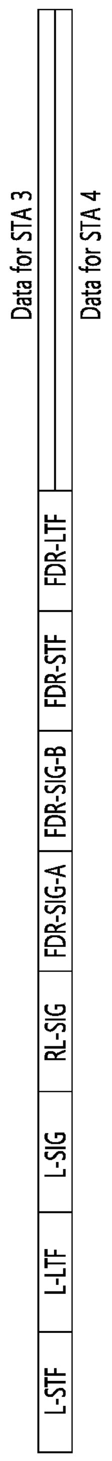
FIG. 50 illustrates another example of an OFDMA-based FDR MU PPDU.

FIG. 50 illustrates another example of an OFDMA-based FDR MU PPDU.

As shown in FIG. 50, L-preamble, FDR-SIG-A, FDR-SIG-B, FDR-STF, and FDR-LTF may be used to form a new structure of FDR MU PPDU, which may be transmitted by being allocated as much as the size of the second RU.

Figure 51:
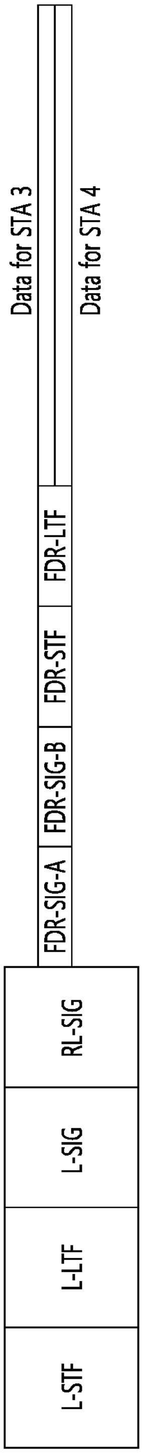
FIG. 51 illustrates yet another example of an OFDMA-based FDR MU PPDU.

FIG. 51 illustrates yet another example of an OFDMA-based FDR MU PPDU.

However, in the case of FIG. 50, since the L-preamble may not perform the existing role properly (as the L-preamble is not allocated as much as the entire band), as shown in FIG. 51, the FDR MU PPDU may be transmitted by allocating the L-preamble to have the existing size but allocating rest of the fields to occupy as much as the size of an RU.

Figure 52:
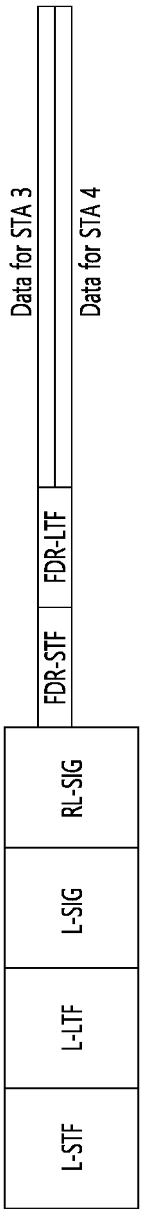
FIGS. 52 and 53 illustrate still another example of an OFDMA-based FDR MU PPDU.
Figure 53:
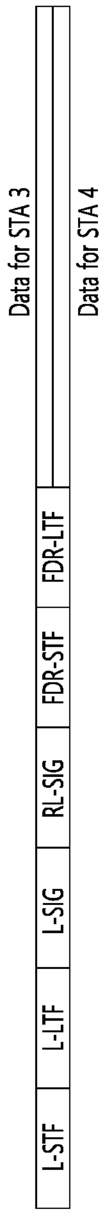

FIGS. 52 and 53 illustrate still another example of an OFDMA-based FDR MU PPDU.

In the cases of FIGS. 52 and 53, indication for an allocated RU is additionally needed. By including the indication in a trigger frame, location of an RU to be allocated for DL transmission and transmission time may be indicated in advance. A configuration for the indication may use the method proposed in 2-1 above. In this case, FDR-SIG-B may be omitted from FIGS. 52 and 53, and if essential information for DL transmission is included in the trigger frame, FDR-SIG-A may also be omitted.

Figure 54:
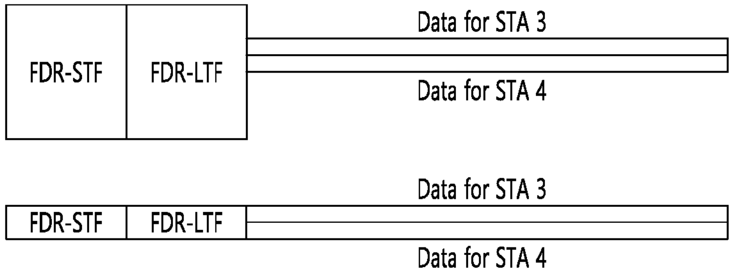
FIG. 54 illustrates yet still another example of an OFDMA-based FDR MU PPDU.

FIG. 54 illustrates yet still another example of an OFDMA-based FDR MU PPDU.

Referring to FIG. 54, if FDR-SIG-A and FDR-SIG-B are omitted, L-preamble may also be omitted, where, in this case, an STA receiving DL transmission has to perform timing and frequency recovery by using FDR-STF, FDR-LTF, and pilot. Therefore, at the time of DL transmission, it is necessary to perform the DL transmission after an AP corrects the fields to some degree. Alternatively, a correction value used for receiving a trigger frame may be used for reception of the FDR MU PPDU.

Figure 55:
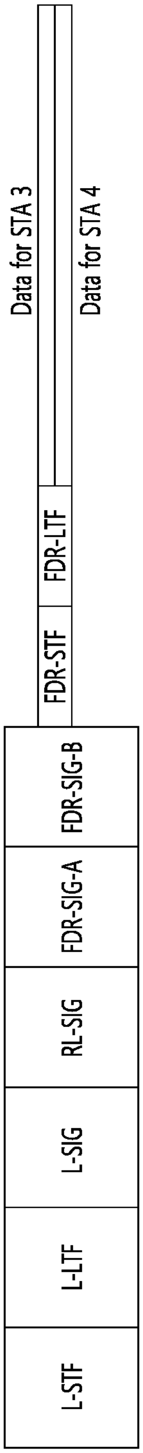
FIG. 55 illustrates still yet another example of an OFDMA-based FDR MU PPDU.

FIG. 55 illustrates still yet another example of an OFDMA-based FDR MU PPDU.

Referring to FIG. 55, in addition to the original structure, fields up to FDR-SIG-B are allocated to have the existing size, and rest of the fields starting from FDR-STF may be allocated according to the size of the second RU. This structure may be used when there is no additional information in the trigger frame and requires a process for finding an RU to which the FDR MU PPDU is allocated by decoding up to the FDR-SIG-B.

Figure 56:
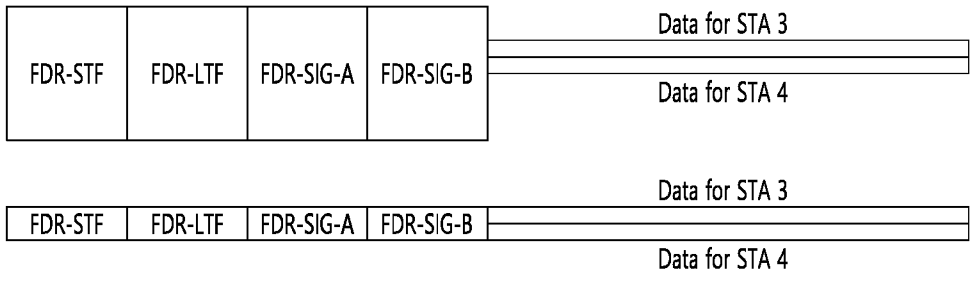
FIG. 56 illustrates further yet another example of an OFDMA-based FDR MU PPDU.

FIG. 56 illustrates further yet another example of an OFDMA-based FDR MU PPDU.

Referring to FIG. 56, L-preamble may be additionally removed from the FDR MU PPDU, and FDR-SIG-A and FDR-SIG-B may be located after FDR-LTF. In this case, information on the location of the second RU to be allocated for DL transmission and information on transmission time have to be carried in the trigger frame. The FDR-SIG-A may carry information such as one carried in the HE-SIG-A of the HE MU PPDU, and the FDR-SIG-B may carry information such as one carried in the HE-SIG-B of the HE MU PPDU. In this case, an STA receiving DL transmission has to perform timing and frequency recovery by using FDR-STF, FDR-LTF, and pilot. Therefore, at the time of DL transmission, it is necessary to perform the DL transmission after an AP corrects the fields to some degree. Alternatively, a correction value used for receiving a trigger frame may be used for reception of the FDR MU PPDU.

Figure 57:
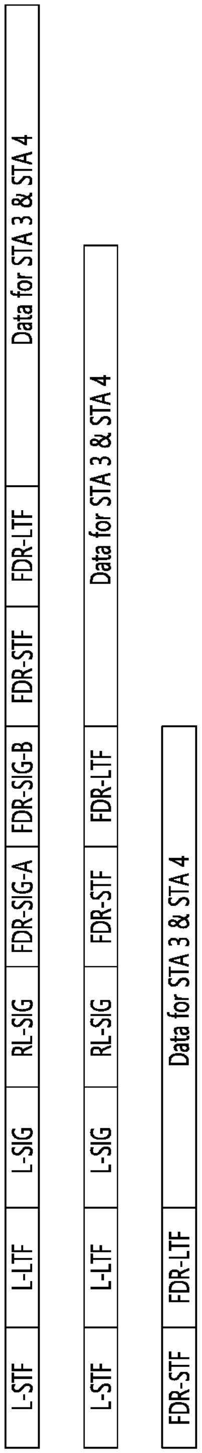
FIGS. 57 and 58 illustrate further still another example of an OFDMA-based FDR MU PPDU.
Figure 58:
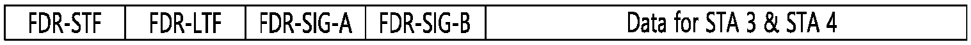

FIGS. 57 and 58 illustrate further still another example of an OFDMA-based FDR MU PPDU.

In many cases of the embodiment, it is also possible to perform MU MIMO transmission by allocating several STAs rather than one STA simultaneously to the second RU or each of the RUs split from the second RU. FIGS. 57 and 58 illustrate the example.

Figure 59:
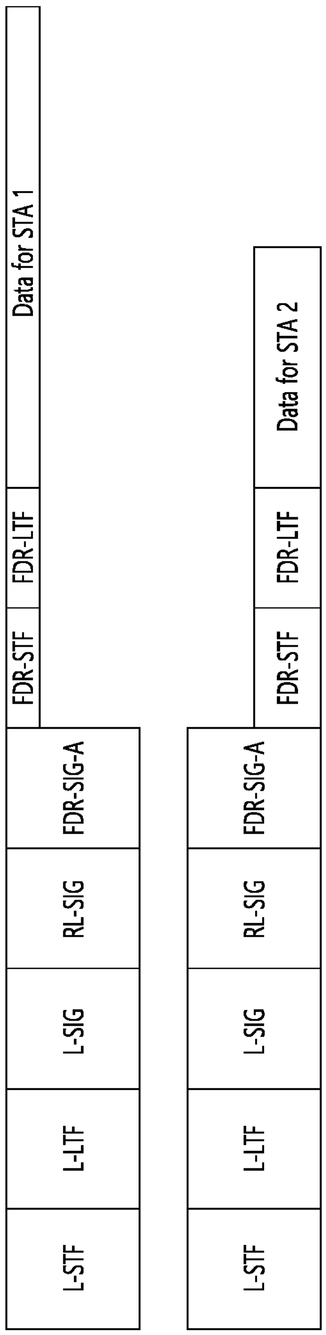
FIG. 59 illustrates an example of an OFDMA-based FDR TB PPDU.

FIG. 59 illustrates an example of an OFDMA-based FDR TB PPDU.

In addition to the case of the embodiment above, when transmission of an FDR TB PPDU is performed as shown in FIG. 59, the FDR MU PPDU for STA3 and STA4 as described above may be transmitted after the FDR-SIG-A of the FDR TB PPDU by using the second RU, and the FDR MU PPDU may be transmitted to specific STAs after STA2 data of the FDR TB PPDU is transmitted by using the third RU.

Transmission of an FDR MU PPDU may be started when an RU is empty, or the transmission may be started after a predetermined time period for the convenience of implementing transmission and reception. The predetermined time period may be SIFS or DIFS. Transmission of the FDR MU PPDU may be designed not to exceed the maximum of the duration informed by using the Rate field and the Length field of the L-SIG of the FDR TB PPDU.

The ID of an STA that receives DL transmission in the trigger frame may be indicated by defining a new field called FDR RA (a different name may be given to the new field), and the new field may amount to 6 octets like the RA field. (The new field may have a different size.) Also, information on RU allocation for each STA used for DL transmission, for which an FDR user info field is defined, information on transmission time, and information on MCS, DCM, coding, and so on may also be transmitted in advance. The size may amount to 5 or more octets as in the case of the user info field. (The size may be different from the aforementioned value.) Or, when the ID of an STA to receive DL transmission or user information is not carried in the trigger frame, namely, when only the location of an RU to be used for DL transmission and transmission time are carried, an FDR common info field may be defined to inform of the specific situation.

The FDR TB PPDU proposed above may be called a primary FDR TB PPDU, and the FDR MU PPDU and the FDR SU PPDU may be called a secondary FDR MU PPDU and a secondary FDR SU PPDU. In other words, FIGS. 48 to 59 illustrate an PPDU used for an FDR operation through which UL transmission is performed prior to DL transmission.

In what follows, referring to FIGS. 60 to 64, the embodiment above will be described in a temporal order of the operation.

Figure 60:
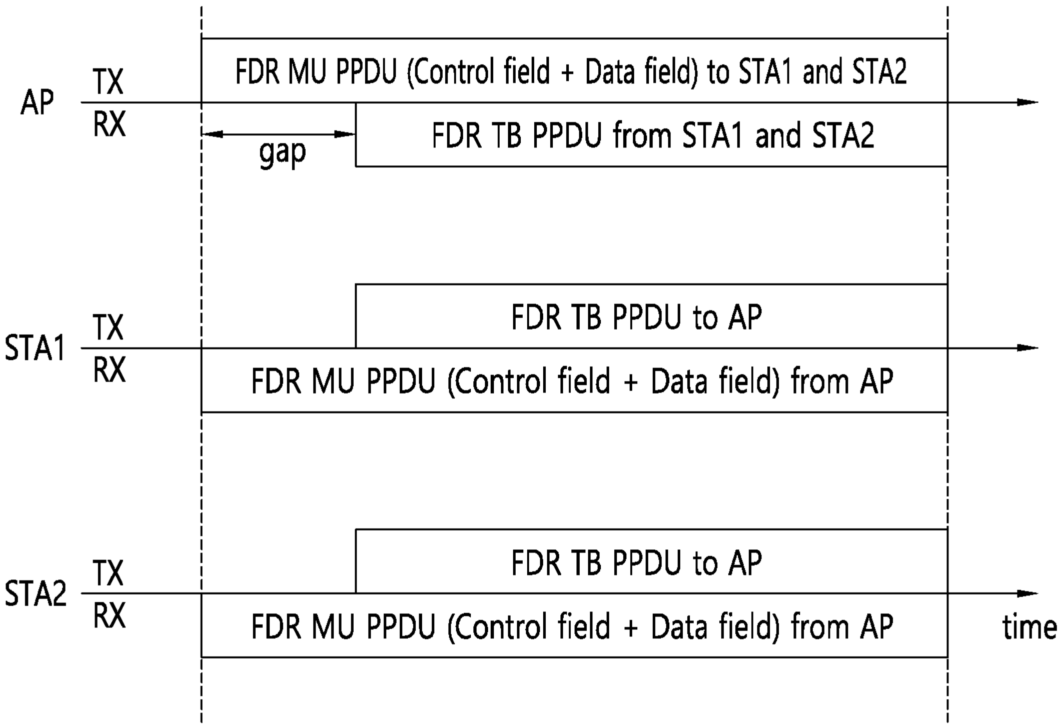
FIG. 60 illustrates a procedure according to which DL primary transmission and UL secondary transmission are performed based on symmetric FDR according to the present embodiment.

FIG. 60 illustrates a procedure according to which DL primary transmission and UL secondary transmission are performed based on symmetric FDR according to the present embodiment.

FIG. 60 illustrates symmetric FDR in which transmission and reception based on FDR occurs only in an AP, STA1, and STA2. Also, FIG. 60 illustrates an embodiment in which FDR-based DL transmission is performed prior to UL transmission.

Referring to FIG. 60, an AP may generate FDR indication information on that FDR may be performed and transmit an FDR MU PPDU to STA1 and STA2 by including FDR indication information therein. The FDR MU PPDU may be generated by using the HE MU PPDU without modification.

Since FIG. 60 illustrates a procedure operating based on symmetric FDR, STA1 and STA2 may receive both the control field and the data field of the FDR MU PPDU. STA1 and STA2 transmit an FDR TB PPDU to an AP after a time period of gap from since the FDR MU PPDU is received. The FDR TB PPDU may be generated by using the HE TB PPDU without modification. In other words, the FDR MU PPDU and the FDR TB PPDU are transmitted and received based on the FDR. However, STA1 and STA2 each transmit an FDR TB PPDU by splitting an RU allocated for UL transmission in half. In other words, STA1 transmits an FDR TB PPDU through a first half of the RU allocated for UL transmission, and STA2 transmits an FDR TB PPDU through the other half of the RU allocated for UL transmission. At this time, the legacy preamble and the signal field may be omitted from the FDR TB PPDU.

After receiving and decoding the control field of the FDR MU PPDU, the STA1 and the STA2 require an amount of time before generating the FDR TB PPDU. Therefore, the STA1 and the STA2 may transmit the FDR TB PPDU to the AP after a time period as long as the gap from the first time point at which the FDR MU PPDU is received. The time period of gap may be, for example, SIFS or DIFS. Also, the FDR MU PPDU transmitted by the AP and the FDR TB PPDU transmitted by the STA1 and the STA2 are all transmitted to RUs different from each other to reduce the interference due to FDR.

Detailed descriptions of the FDR MU PPDU and the FDR TB PPDU will be given with reference to FIG. 64.

Figure 61:
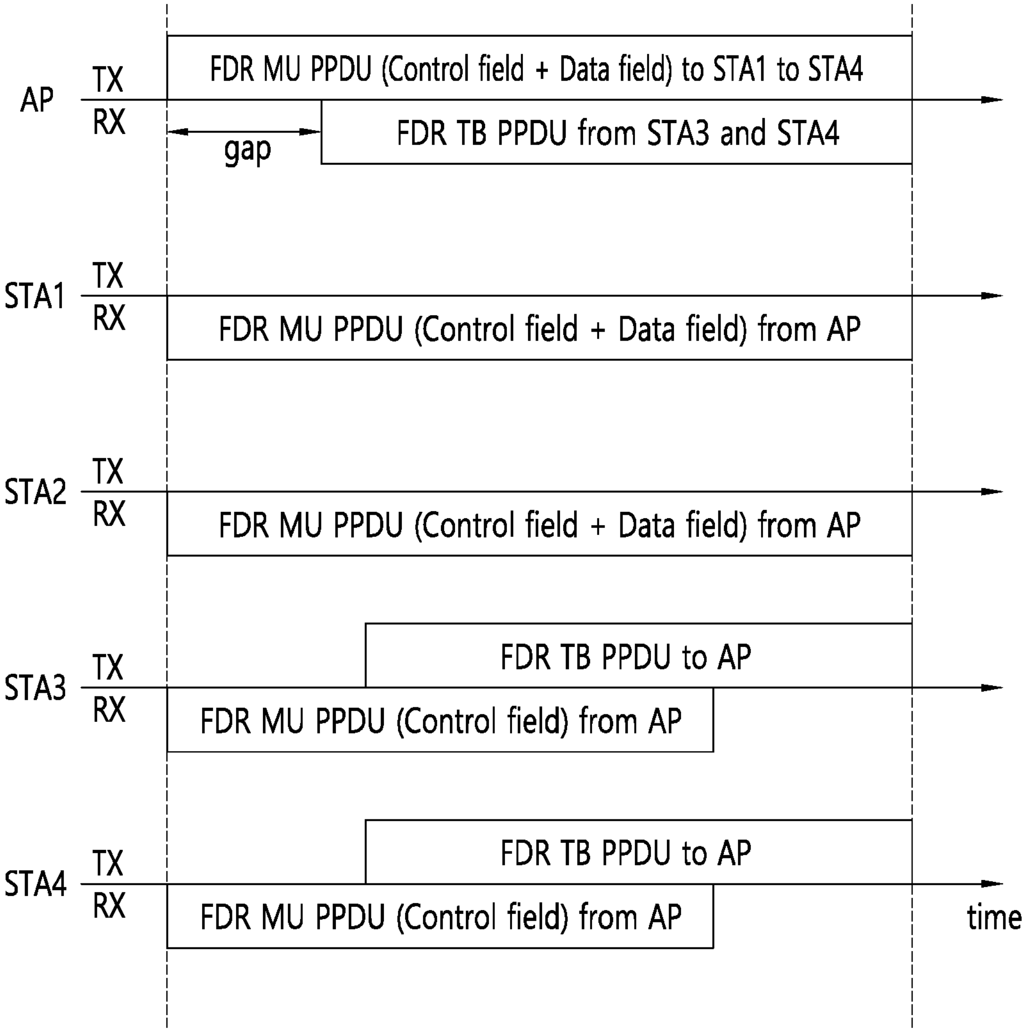
FIG. 61 illustrates a procedure according to which DL primary transmission and UL secondary transmission are performed based on asymmetric FDR according to the present embodiment.

FIG. 61 illustrates a procedure according to which DL primary transmission and UL secondary transmission are performed based on asymmetric FDR according to the present embodiment.

FIG. 61 illustrates asymmetric FDR in which FDR-based DL transmission occurs between an AP, STA1, and STA2; and FDR-based UL transmission occurs between the AP, STA3, and STA4. Also, FIG. 61 illustrates an embodiment in which FDR-based DL transmission is performed prior to UL transmission.

Referring to FIG. 61, an AP may generate FDR indication information on that the AP is capable of performing FDR operation and may transmit an FDR MU PPDU to STA1 to STA4 by including the FDR indication information therein. The FDR MU PPDU may be generated by using the HE MU PPDU without modification.

Since FIG. 61 illustrates a procedure operating based on asymmetric FDR, STA3 and STA4 may receive only the control field of the FDR MU PPDU, and the (DL) data fields for the STA3 and the STA4 are not allocated nor received. The STA3 and the STA4 transmit an FDR TB PPDU to the AP after a time period of gap from since the FDR MU PPDU is received. The FDR TB PPDU may be generated by using the HE TB PPDU without modification. At this time, the AP transmits a DL data field included in the FDR MU PPDU to the STA1 and the STA2. In other words, the FDR MU PPDU transmitted to the STA1 and the STA2 and the FDR TB PPDU transmitted by the STA3 and the STA4 are transmitted and received based on the FDR. However, STA3 and STA4 each transmit an FDR TB PPDU by splitting an RU allocated for UL transmission in half. In other words, STA3 transmits an FDR TB PPDU through a first half of the RU allocated for UL transmission, and STA4 transmits an FDR TB PPDU through the other half of the RU allocated for UL transmission. At this time, the legacy preamble and the signal field may be omitted from the FDR TB PPDU.

After receiving and decoding the control field of the FDR MU PPDU, the STA3 and the STA4 require an amount of time before generating the FDR TB PPDU. Therefore, the STA3 and the STA4 may transmit the FDR TB PPDU to the AP after a time period as long as the gap from the first time point at which the FDR MU PPDU is received. The time period of gap may be, for example, SIFS or DIFS. Also, the FDR MU PPDU transmitted by the AP and the FDR TB PPDU transmitted by the STA3 and the STA4 are all transmitted to RUs different from each other to reduce the interference due to FDR.

Detailed descriptions of the FDR MU PPDU and the FDR TB PPDU will be given with reference to FIG. 64.

Figure 62:
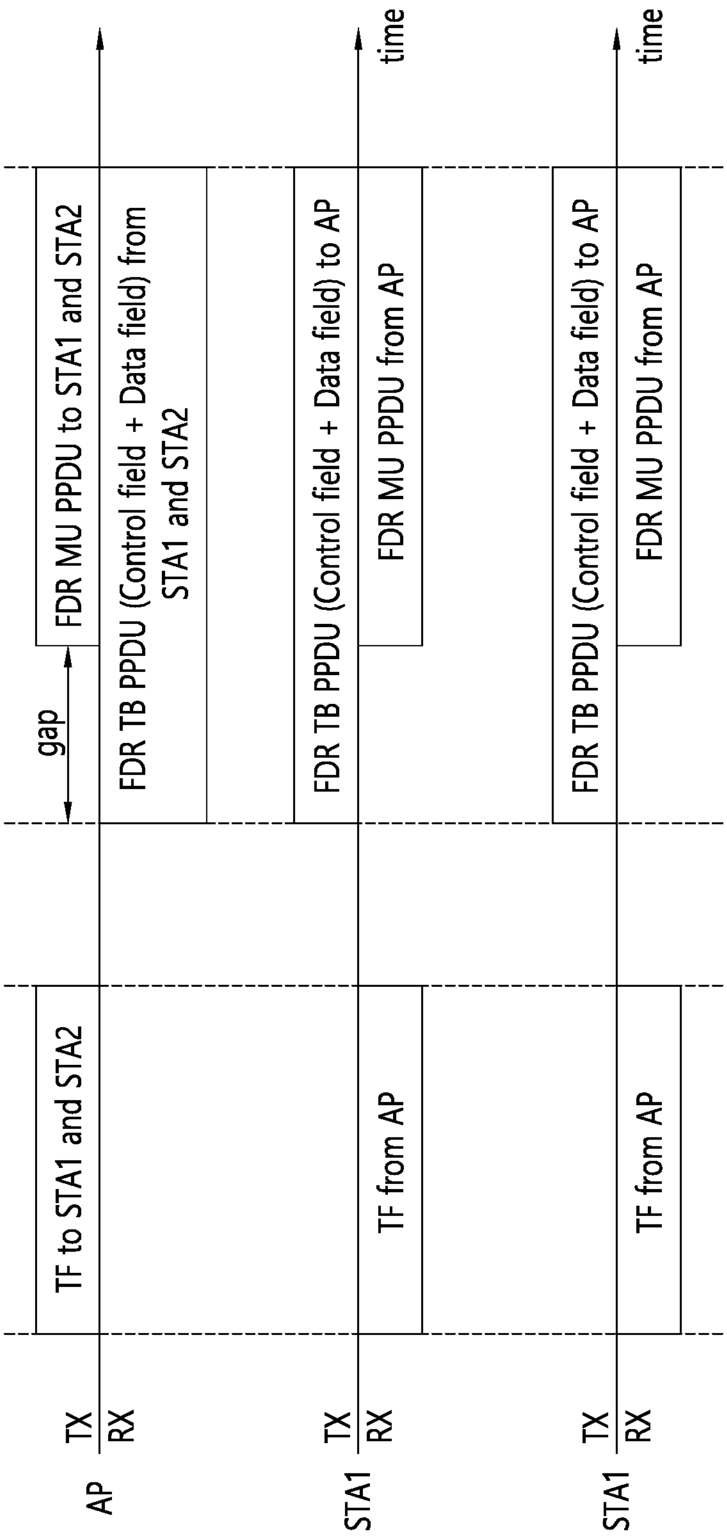
FIG. 62 illustrates a procedure according to which UL primary transmission and DL secondary transmission are performed based on symmetric FDR according to the present embodiment.

FIG. 62 illustrates a procedure according to which UL primary transmission and DL secondary transmission are performed based on symmetric FDR according to the present embodiment.

FIG. 62 illustrates symmetric FDR in which transmission and reception based on FDR occurs only in an AP, STA1, and STA2. Also, FIG. 62 illustrates an embodiment in which FDR-based DL transmission is performed prior to UL transmission.

Referring to FIG. 62, an AP may generate FDR indication information on that FDR may be performed and first transmit a trigger frame by including the FDR indication information therein.

STA1 may transmit an FDR TB PPDU to the AP based on the trigger frame. The FDR TB PPDU may be generated by using the HE TB PPDU without modification. Also, the FDR TB PPDU includes both a control field and a data field.

The AP transmits an FDR MU PPDU to STA1 and STA2 after a time period as long as the gap from the time at which the FDR TB PPDU is received. The FDR MU PPDU may be generated by using the HE MU PPDU without modification. In other words, the FDR TB PPDU and the FDR MU PPDU are transmitted and received based on the FDR. However, STA1 and STA2 each transmit an FDR MU PPDU by splitting an RU allocated for DL transmission in half. In other words, the AP transmits an FDR MU PPDU to STA1 through a first half of the RU allocated for DL transmission, and the AP transmits an FDR MU PPDU to STA2 through the other half of the RU allocated for DL transmission. At this time, the legacy preamble and the signal field may be omitted from the FDR MU PPDU.

After receiving and decoding the control field of the FDR TB PPDU, the AP requires an amount of time before generating the FDR MU PPDU. Therefore, the AP may transmit the FDR MU PPDU to the STA1 and the STA2 after a time period as long as the gap from the first time point at which the FDR TB PPDU is received. The time period of gap may be, for example, SIFS or DIFS. Also, the FDR MU PPDU transmitted to the STA1 and the STA2 and the FDR TB PPDUs transmitted by the STA1 and the STA2 are all transmitted to RUs different from each other to reduce the interference due to FDR.

Detailed descriptions of the FDR TB PPDU and the FDR MU PPDU will be given with reference to FIG. 65.

Figure 63:
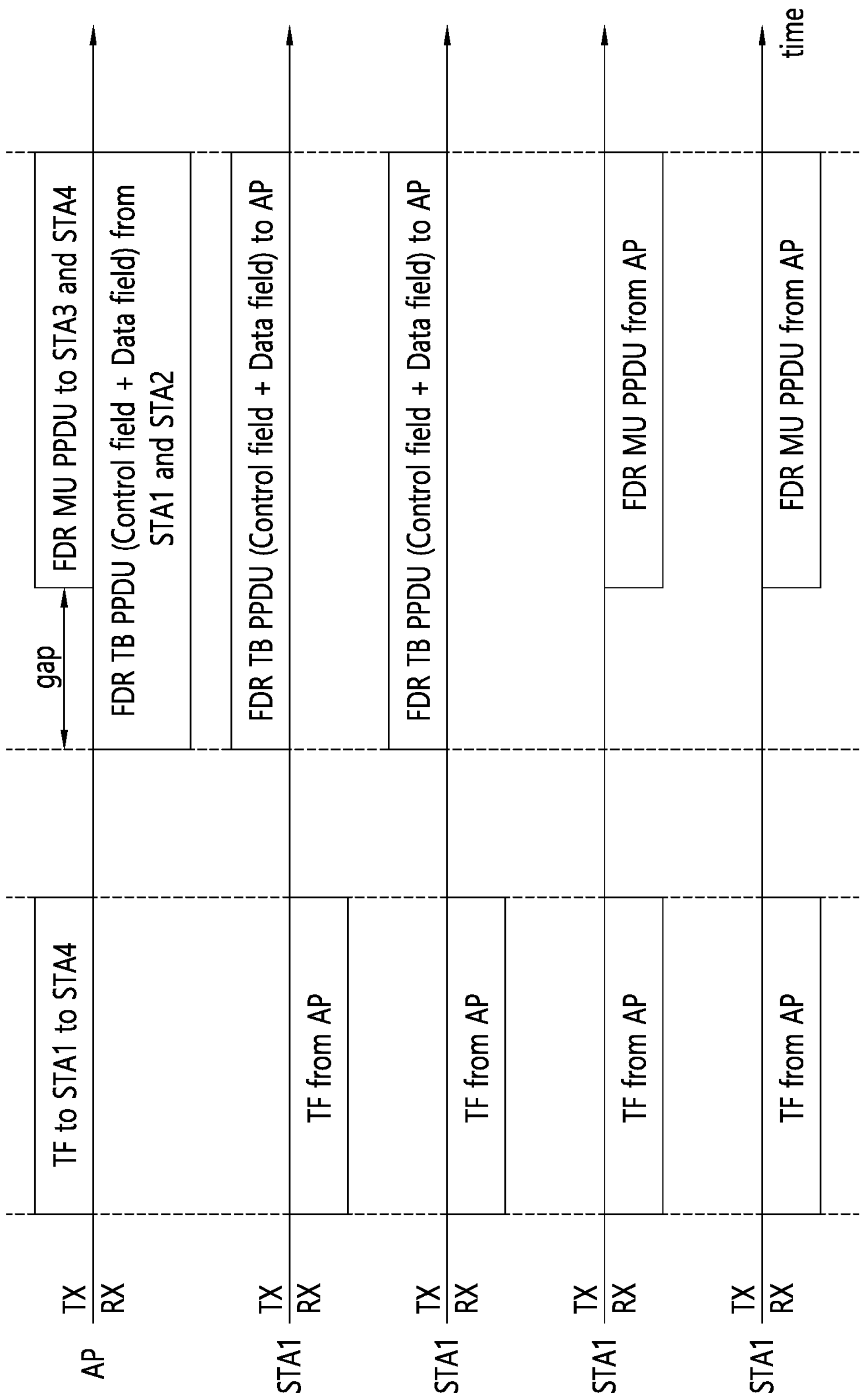
FIG. 63 illustrates a procedure according to which UL primary transmission and DL secondary transmission are performed based on asymmetric FDR according to the present embodiment.

FIG. 63 illustrates a procedure according to which UL primary transmission and DL secondary transmission are performed based on asymmetric FDR according to the present embodiment.

FIG. 63 illustrates asymmetric FDR in which FDR-based DL transmission occurs between an AP, STA1, and STA2, and FDR-based UL transmission occurs between the AP, STA3, and STA4. Also, FIG. 63 illustrates an embodiment in which FDR-based DL transmission is performed prior to UL transmission.

Referring to FIG. 63, an AP may generate FDR indication information on that the AP is capable of performing FDR operation and may first transmit a trigger frame to STA1 to STA4 by including the FDR indication information therein.

STA1 and STA2 may transmit an FDR TB PPDU to the AP based on the trigger frame. The FDR TB PPDU may be generated by using the HE TB PPDU without modification. Also, the FDR TB PPDU includes both a control field and a data field.

The AP transmits an FDR MU PPDU to STA3 and STA4 after a time period as long as the gap from the time at which the FDR TB PPDU is received. The FDR MU PPDU may be generated by using the HE MU PPDU without modification. At this time, STA1 and STA2 transmit the UL data field included in the FDR TB PPDU to the AP. In other words, the FDR TB PPDU transmitted by the STA1 and the STA2 and the FDR MU PPDU transmitted to the STA3 and the STA4 by the AP are transmitted and received based on the FDR.

After receiving and decoding the control field of the FDR TB PPDU, the AP requires an amount of time before generating the FDR MU PPDU. Therefore, the AP may transmit the FDR MU PPDU to the STA3 and the STA4 after a time period as long as the gap from the first time point at which the FDR TB PPDU is received. The time period of gap may be, for example, SIFS or DIFS. Also, the FDR MU PPDU transmitted to the STA3 and the STA4 and the FDR TB PPDUs transmitted by the STA1 and the STA2 are all transmitted to RUs different from each other to reduce the interference due to FDR.

Detailed descriptions of the FDR TB PPDU and the FDR MU PPDU will be given with reference to FIG. 65.

Figure 64:
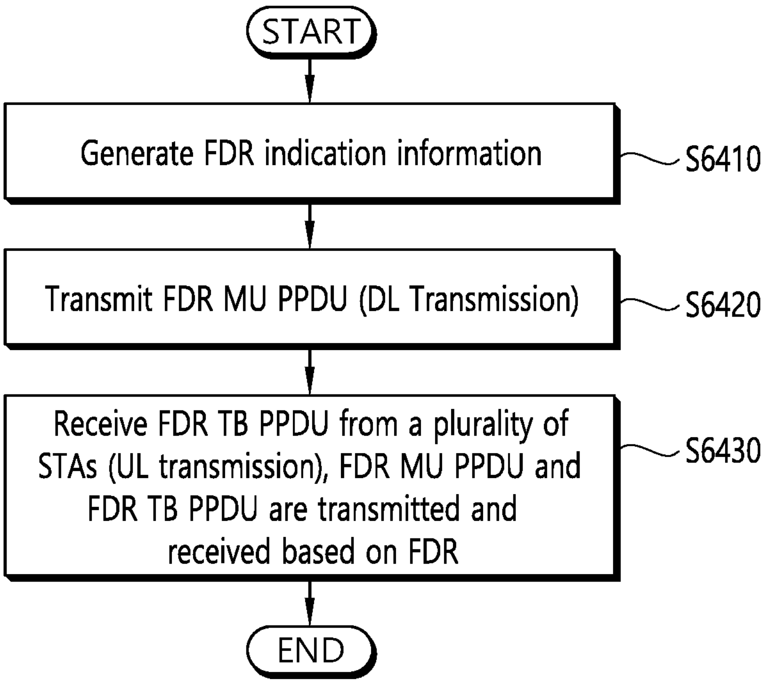
FIG. 64 is a flow diagram illustrating a procedure according to which DL primary transmission and UL secondary transmission are performed based on FDR in an AP according to the present embodiment.

FIG. 64 is a flow diagram illustrating a procedure according to which DL primary transmission and UL secondary transmission are performed based on FDR in an AP according to the present embodiment.

The example of FIG. 64 may be performed in a network environment in which the next-generation WLAN system is supported. The next-generation WLAN system is a WLAN system that improves the 802.11ax system and may satisfy backward compatibility with the 802.11ax system.

To clarify the terms, HE MU PPDU, HE TB PPDU, HE SU PPDU, HE-SIG-A field, HE-SIG-B field, HE-STF field, and HE-LTF field may all correspond to the PPDUs and the fields defined in the 802.11ax system. FDR MU PPDU, FDR TB PPDU, FDR-SIG-A field (first signal field), FDR-SIG-B field (second signal field), FDR-STF field, and FDR-LTF field may correspond to the PPDUs and the fields defined for performing FDR in the next-generation WLAN system. FDR-SIG-C field (third signal field) may be a signal field newly defined for performing FDR in the next-generation WLAN system. However, it should be noted that PPDUs and fields defined for performing FDR may be generated directly by using the HE PPDUs and the HE fields to satisfy backward compatibility with the 802.11ax system. The trigger frame is a (MAC) frame defined in the 802.11ax system, for which a field may be added or an existing field may be modified to perform FDR.

The example of FIG. 64 may be performed in a transmitter, and the transmitter may correspond to an AP. The receiver of FIG. 64 may correspond to a (non-AP STA) STA having an FDR capability. Also, the example of FIG. 64 may include both a symmetric FDR operation and an asymmetric FDR operation.

In the S6410 step, an access point (AP) generates FDR indication information on that the AP is capable of the FDR.

In the S6420 step, the AP transmits a downlink (DL) PPDU including the FDR indication information to a first station (STA) and a second STA. The DL PPDU may be generated by using a High Efficiency Multi-User PPDU (HE MU PPDU). In other words, the DL PPDU may be an FDR MU PPDU generated by reusing the HE MU PPDU.

In the S6430 step, the AP receives a first uplink (UL) PPDU from the first STA and receives a second UL PPDU from the second STA. The first UL PPDU and the second UL PPDU may be generated by using a High Efficiency Trigger-Based PPDU (HE TB PPDU). In other words, the first UL PPDU and the second UL PPDU may be FDR TB PPDUs generated by reusing the HE TB PPDU. At this time, the DL PPDU, the first UL PPDU, and the second UL PPDU are transmitted and received based on the FDR.

In relation to DL primary transmission, the DL PPDU may include a legacy signal field, a first signal field, a second signal field, and a DL data field. The legacy signal field may be associated with the Legacy-Signal (L-SIG) field or the Repeated Legacy-Signal (RL-SIG) field included in the HE MU PPDU. The first signal field may be associated with the HE-SIG-A field included in the HE MU PPDU. Since the first signal field is defined for performing an FDR operation, the first signal field may be referred to as an FDR-SIG-A field. The second signal field may be associated with the HE-SIG-B field included in the HE MU PPDU. Since the second signal field is defined to perform an FDR operation, the second signal field may be referred to as an FDR-SIG-B field. The DL data field may be associated with the data received by an STA through an RU configured during MU DL transmission.

The second signal field includes allocation information on a first RU to which the DL data field is allocated. The allocation information on the first RU may be an RU Allocation field 1120.

When the DL PPDU further includes a third signal field, the third signal field includes allocation information on a second RU to which the first UL PPDU and the second UL PPDU are allocated; information on the identifier of an STA to transmit the first UL PPDU and the second UL PPDU; and information on the transmission time of the first UL PPDU and the second UL PPDU. This case describes an embodiment in which the DL PPDU reuses a field of the HE MU PPDU and generates a PPDU by additionally inserting a third signal field. Since the third signal field is newly defined to perform an FDR operation, the third signal field may be referred to as an FDR-SIG-C field.

At this time, the second RU may be an RU excluding the first RU from the whole band. In other words, the present embodiment proposes a method in which a DL PPDU is transmitted through a specific RU and a UL PPDU is received through another RU other than the specific RU. Also, the present embodiment proposes a method in which two STAs divide the different RUs in half and each transmit a UL PPDU, thereby performing FDR together with the DL PPDU.

More specifically, the DL data field may be transmitted through the first RU. The first UL PPDU and the second UL PPDU may be received through the second RU based on the third signal field. At this time, the first UL PPDU is received from the first STA through half of the second RU. The second UL PPDU is received from the second STA through the other half of the second RU. The minimum size of the half of the second RU and the other half of the second RU may be 26 RUs. Therefore, the minimum size of the second RU may be 52 RUs.

The identifier of an STA to transmit the first UL PPDU and the second UL PPDU may include identifiers of the first STA and the second STA. The DL PPDU may be transmitted before the first UL PPDU and the second UL PPDU (DL primary transmission and UL secondary transmission). The DL PPDU, the first UL PPDU, and the second UL PPDU may be transmitted and received simultaneously after the transmission time of the first UL PPDU and the second UL PPDU. Also, the transmission time points of the first UL PPDU and the second UL PPDU may be the same.

The information on the identifier of an STA to transmit the first UL PPDU and the second UL PPDU may be set by an 11-bit STA Identifier (ID), a 9-bit Partial Association ID (PAID), or a 12-bit Association ID (AID). In other words, a specific STA for transmitting the first UL PPDU and the second UL PPDU may be indicated by using one of the three methods.

The allocation information on the second RU may be set by a bitmap, each bit of which corresponds to 26 RUs. In other words, 26 RUs are set as the minimum unit; when each of 26 RUs transmits a first or second UL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

The information on the transmission time of the first UL PPDU and the second UL PPDU may include the duration spanning from the third signal field to the time at which the first UL PPDU and the second UL PPDU are transmitted or the duration spanning from the legacy signal field to the time at which the first UL PPDU and the second UL PPDU are transmitted. In particular, the transmission time points of the first UL PPDU and the second UL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

When the DL PPDU does not include the third signal field, the second signal field may further include allocation information on the second RU to which the first UL PPDU and the second UL PPDU are allocated, the identifier of an STA to transmit the first UL PPDU and the second UL PPDU, and transmission time of the first UL PPDU and the second UL PPDU. In this case, the PPDU is generated by reusing only the fields of the HE MU PPDU without the third signal field's being additionally inserted to the DL PPDU. Accordingly, the information related to transmission of the first UL PPDU and the second UL PPDU may be included in the second signal field.

The allocation information on the second RU may be included in a common field of the second signal field. The common field of the second signal field may further include indicator information on whether the first or the second UL PPDU is transmitted through an RU allocated based on the allocation information on the first RU. In other words, the indicator information related to the first or the second UL PPDU transmission may be additionally included in the common field of the second signal field.

The FDR indication information may be included in the legacy signal field, the first signal field, or the second signal field.

In relation to UL secondary transmission, the first UL PPDU and the second UL PPDU may include only a High Efficiency-Short Training Field (HE-STF), a High Efficiency-Long Training Field (HE-LTF), and a UL data field belonging to the HE TB PPDU. In other words, the first or the second UL PPDU may be configured to reuse the HE TB PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR.

Also, when the second RU is 20 MHz or 40 MHz, the first UL PPDU and the second UL PPDU may be generated by using a High Efficiency Single User PPDU (HE SU PPDU). Since the total bandwidth is used for UL transmission, transmission may be performed by using the HE SU PPDU. For example, when the second RU is 40 MHz, the first UL PPDU may be transmitted through a primary 20 MHz band, and the second UL PPDU may be transmitted through a secondary 20 MHz band.

The first UL PPDU and the second UL PPDU may include only the HE-STF, the HE-LTF, and the UL data field belonging to the HE SU PPDU. In other words, the first UL PPDU and the second UL PPDU may be configured to reuse the HE SU PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR. Also, the first UL PPDU and the second UL PPDU may be completely separated from each other (completely divided into half of the second RU and the other half of the second RU), thereby reducing the interference effect due to MU FDR transmission.

Figure 65:
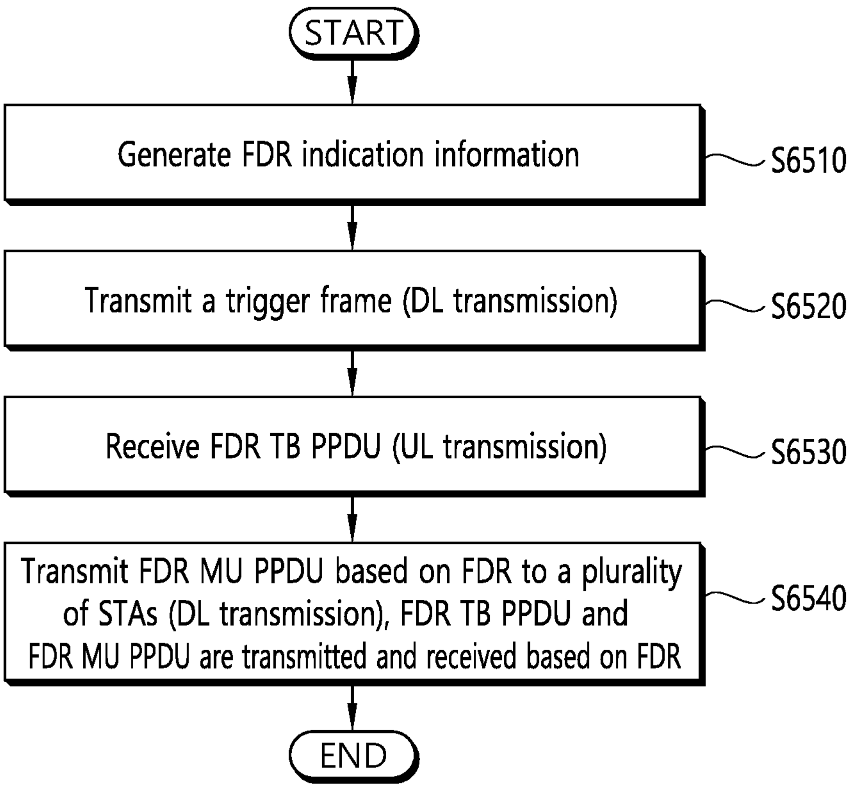
FIG. 65 is a flow diagram illustrating a procedure according to which UL primary transmission and DL secondary transmission are performed based on FDR in an AP according to the present embodiment.

FIG. 65 is a flow diagram illustrating a procedure according to which UL primary transmission and DL secondary transmission are performed based on FDR in an AP according to the present embodiment.

The example of FIG. 65 may be performed in a network environment in which the next-generation WLAN system is supported. The next-generation WLAN system is a WLAN system that improves the 802.11ax system and may satisfy backward compatibility with the 802.11ax system.

To clarify the terms, HE MU PPDU, HE TB PPDU, HE SU PPDU, HE-SIG-A field, HE-SIG-B field, HE-STF field, and HE-LTF field may all correspond to the PPDUs and the fields defined in the 802.11ax system. FDR MU PPDU, FDR TB PPDU, FDR-SIG-A field (first signal field), FDR-SIG-B field (second signal field), FDR-STF field, and FDR-LTF field may correspond to the PPDUs and the fields defined for performing FDR in the next-generation WLAN system. FDR-SIG-C field (third signal field) may be a signal field newly defined for performing FDR in the next-generation WLAN system. However, it should be noted that PPDUs and fields defined for performing FDR may be generated directly by using the HE PPDUs and the HE fields to satisfy backward compatibility with the 802.11ax system. The trigger frame is a (MAC) frame defined in the 802.11ax system, for which a field may be added or an existing field may be modified to perform FDR.

The example of FIG. 65 may be performed in a transmitter, and the transmitter may correspond to an AP. The receiver of FIG. 65 may correspond to a (non-AP STA) STA having an FDR capability. Also, the example of FIG. 65 may include both a symmetric FDR operation and an asymmetric FDR operation.

In the S6510 step, an access point (AP) generates FDR indication information on that the AP is capable of the FDR.

In the S6520 step, the AP transmits a trigger frame to a plurality of STAs including a first station (STA) and a second STA. The FDR indication information may be included in the trigger frame (or common info field of the trigger frame).

In the S6530 step, the AP may receive a trigger-based PPDU (UL PPDU) from an STA capable of performing UL transmission. The STA capable of the UL transmission may include the first STA and the second STA. The trigger-based PPDU may be generated by using a High Efficiency Trigger-Based PPDU (HE TB PPDU). In other words, the trigger-based PPDU may be an FDR TB PPDU generated by reusing the HE TB PPDU. The FDR indication information may be included in the trigger-based PPDU.

In the S6540 step, the AP transmits a first DL PPDU to the first STA and transmits a second DL PPDU to the second STA. The first DL PPDU and the second DL PPDU may be generated by using a High Efficiency Multi User PPDU (HE MU PPDU). In other words, the first DL PPDU and the second DL PPDU may be an FDR MU PPDU generated by reusing the HE MU PPDU. At this time, the trigger-based PPDU (UL PPDU), the first DL PPDU, and the second DL PPDU are transmitted and received based on the FDR.

Related to UL primary transmission, the trigger frame may allocate a resource for UL MU transmission (which is assumed to be a first RU). By doing so, an STA capable of the UL transmission may transmit a trigger-based PPDU to the AP.

In other words, the trigger-based PPDU may include a legacy signal field, a first signal field, and a UL data field.

The legacy signal field may be associated with the Legacy-Signal (L-SIG) field or the Repeated Legacy-Signal (RL-SIG) field included in the HE TB PPDU. The first signal field may be associated with the HE-SIG-A field included in the HE TB PPDU. Since the first signal field is defined for performing an FDR operation, the first signal field may be referred to as an FDR-SIG-A field. The UL data field may be associated with the data transmitted by an STA through an RU configured through UL MU transmission.

The trigger frame includes allocation information on a first RU to which the UL data field is allocated. The allocation information on the first RU may be a common info field 950.

Also, the trigger frame may further include indication information for transmission of a DL PPDU. In other words, the trigger frame includes allocation information on a second RU to which the first DL PPDU and the second DL PPDU are allocated, information on the identifier of an STA to transmit the first DL PPDU and the second DL PPDU, and information on the transmission time of the first DL PPDU and the second DL PPDU.

At this time, the second RU may be an RU excluding the first RU from the whole band. In other words, the present embodiment proposes a method for performing FDR, in which a UL PPDU is received first through a specific RU based on the trigger frame and a DL PPDU is transmitted through another RU other than the specific RU. Also, the present embodiment proposes a method for performing FDR, in which an AP divides the different RUs in half and transmits a UL PPDU to each of two STAs, thereby performing FDR together with the UL PPDU.

More specifically, the UL data field may be transmitted through the first RU. The trigger-based PPDU may be received through the first RU based on the trigger frame. The first DL PPDU and the second DL PPDU may be received through the second RU based on the third signal field. At this time, the first DL PPDU is transmitted to the first STA through half of the second RU. The second DL PPDU is transmitted to the second STA through the other half of the second RU. The minimum size of the half of the second RU and the other half of the second RU may be 26 RUs. Therefore, the minimum size of the second RU may be 52 RUs.

The identifier of an STA to receive the first DL PPDU and the second DL PPDU may include identifiers of the first STA and the second STA. The UL PPDU may be transmitted before the first DL PPDU and the second DL PPDU (UL primary transmission and DL secondary transmission). The UL PPDU and the DL PPDU may be transmitted and received simultaneously after the transmission time of the DL PPDU. Also, the transmission time points of the first DL PPDU and the second DL PPDU may be the same.

The information on the identifier of an STA to receive the first DL PPDU and the second DL PPDU may be included in an FDR-RA field that newly defines the RA field of the trigger frame. The FDR-RA field may have a size of 6 octets the same as that of the RA field of the existing trigger frame and indicate a specific STA to receive the first DL PPDU and the second DL PPDU.

The allocation information on the second RU and the information on the transmission time of the first DL PPDU and the second DL PPDU may be included in an FDR user info field that newly defines the user info field of the trigger frame. The FDR user info field may have a size of more than 5 octets the same as that of the user info field of the existing trigger frame.

In the same way, the allocation information on the second RU may be set by a bitmap, each bit of which corresponds to 26 RUs. In other words, 26 RUs are set as the minimum unit; when each of 26 RUs transmits a first or second DL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

Also, the transmission time points of the first DL PPDU and the second DL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

Also, the allocation information on the second RU may be included in a common info field of the trigger frame. The common info field of the trigger frame may further include indicator information on whether the first DL PPDU and the DL PPDU are transmitted through an RU allocated based on the allocation information on the first RU. In other words, the indicator information related to transmission of the first DL PPDU and the second DL PPDU may be additionally included in the common info field of the trigger frame.

In relation to DL secondary transmission, the first DL PPDU and the second DL PPDU may include only a High Efficiency-Short Training Field (HE-STF), a High Efficiency-Long Training Field (HE-LTF), and a DL data field belonging to the HE MU PPDU. In other words, the first or the second DL PPDU may be configured to reuse the HE MU PPDU but omit (exclude) the legacy preamble and the FDR-SIG-A. As a result, the first DL PPDU and the second DL PPDU may be completely separated from a UL PPDU (FDR TB PPDU) in the frequency domain (completely divided into a first RU and a second RU), thereby reducing the interference effect due to FDR.

Also, when the second RU is 20 MHz or 40 MHz, the first DL PPDU and the second DL PPDU may be generated by using a High Efficiency Single User PPDU (HE SU PPDU). Since the total bandwidth is used for DL transmission, transmission may be performed by using the HE SU PPDU. For example, when the second RU is 40 MHz, the first DL PPDU may be transmitted through a primary 20 MHz band, and the second DL PPDU may be transmitted through a secondary 20 MHz band.

The first DL PPDU and the second DL PPDU may include only the HE-STF, the HE-LTF, and the DL data field belonging to the HE SU PPDU. In other words, the first DL PPDU and the second DL PPDU may be configured to reuse the HE SU PPDU but omit (exclude) the legacy preamble and the FDR-SIG-A. As a result, the first DL PPDU and the second DL PPDU may be completely separated from a UL PPDU (FDR TB PPDU) in the frequency domain (completely divided into a first RU and a second RU), thereby reducing the interference effect due to FDR. Also, the first DL PPDU and the second DL PPDU may be completely separated from each other (completely divided into half of the second RU and the other half of the second RU), thereby reducing the interference effect due to MU FDR transmission.

Figure 66:
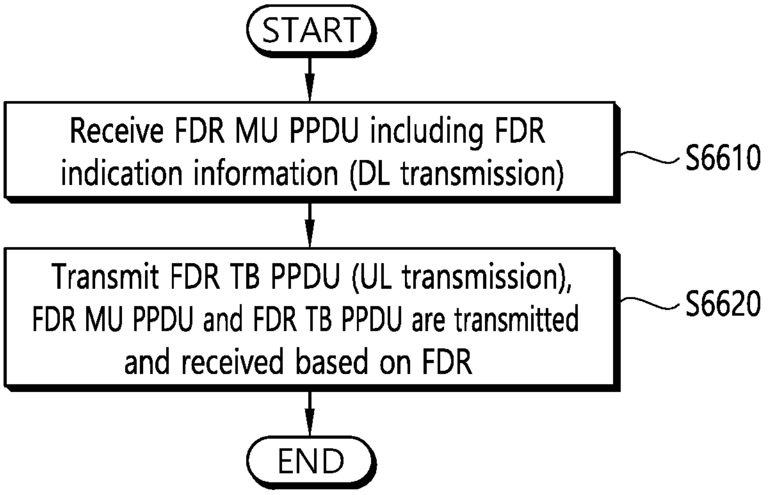
FIG. 66 is a flow diagram illustrating a procedure according to which DL primary transmission and UL secondary transmission are performed based on FDR in an STA according to the present embodiment.

FIG. 66 is a flow diagram illustrating a procedure according to which DL primary transmission and UL secondary transmission are performed based on FDR in an STA according to the present embodiment.

The example of FIG. 66 may be performed in a network environment in which the next-generation WLAN system is supported. The next-generation WLAN system is a WLAN system that improves the 802.11ax system and may satisfy backward compatibility with the 802.11ax system.

To clarify the terms, HE MU PPDU, HE TB PPDU, HE SU PPDU, HE-SIG-A field, HE-SIG-B field, HE-STF field, and HE-LTF field may all correspond to the PPDUs and the fields defined in the 802.11ax system. FDR MU PPDU, FDR TB PPDU, FDR-SIG-A field (first signal field), FDR-SIG-B field (second signal field), FDR-STF field, and FDR-LTF field may correspond to the PPDUs and the fields defined for performing FDR in the next-generation WLAN system. FDR-SIG-C field (third signal field) may be a signal field newly defined for performing FDR in the next-generation WLAN system. However, it should be noted that PPDUs and fields defined for performing FDR may be generated directly by using the HE PPDUs and the HE fields to satisfy backward compatibility with the 802.11ax system. The trigger frame is a (MAC) frame defined in the 802.11ax system, for which a field may be added or an existing field may be modified to perform FDR.

The example of FIG. 66 may be performed in a receiver, and the receiver may correspond to a (non-AP STA) STA having an FDR capability. Also, the example of FIG. 66 may include both a symmetric FDR operation and an asymmetric FDR operation.

In the S6610 step, a first STA and a second STA receive, from an AP, a DL PPDU including FDR indication information on that FDR may be performed. The DL PPDU may be generated by using a High Efficiency Multi User PPDU (HE MU PPDU). In other words, the DL PPDU may be an FDR MU PPDU generated by reusing the HE MU PPDU.

In the S6620 step, the first STA transmits a first UL PPDU to the AP, and the second STA transmits a second UL PPDU to the AP. The first UL PPDU and the second UL PPDU may be generated by using a High Efficiency Trigger-Based PPDU (HE TB PPDU). In other words, the first UL PPDU and the second UL PPDU may be an FDR TB PPDU generated by reusing the HE TB PPDU. At this time, the DL PPDU, the first UL PPDU, and the second UL PPDU are transmitted and received based on the FDR.

In relation to DL primary transmission, the DL PPDU may include a legacy signal field, a first signal field, a second signal field, and a DL data field. The legacy signal field may be associated with the Legacy-Signal (L-SIG) field or the Repeated Legacy-Signal (RL-SIG) field included in the HE MU PPDU. The first signal field may be associated with the HE-SIG-A field included in the HE MU PPDU. Since the first signal field is defined for performing an FDR operation, the first signal field may be referred to as an FDR-SIG-A field. The second signal field may be associated with the HE-SIG-B field included in the HE MU PPDU. Since the second signal field is defined to perform an FDR operation, the second signal field may be referred to as an FDR-SIG-B field. The DL data field may be associated with the data received by an STA through an RU configured during MU DL transmission.

The second signal field includes allocation information on a first RU to which the DL data field is allocated. The allocation information on the first RU may be an RU Allocation field 1120.

When the DL PPDU further includes a third signal field, the third signal field includes allocation information on a second RU to which the first UL PPDU and the second UL PPDU are allocated, information on the identifier of an STA to transmit the first UL PPDU and the second UL PPDU, and information on the transmission time of the first UL PPDU and the second UL PPDU. This case describes an embodiment in which the DL PPDU reuses a field of the HE MU PPDU and generates a PPDU by additionally inserting a third signal field. Since the third signal field is newly defined to perform an FDR operation, the third signal field may be referred to as an FDR-SIG-C field.

At this time, the second RU may be an RU excluding the first RU from the whole band. In other words, the present embodiment proposes a method in which a DL PPDU is transmitted through a specific RU and a UL PPDU is received through another RU other than the specific RU. Also, the present embodiment proposes a method in which two STAs divide the different RUs in half and transmit the respective UL PPDUs to perform FDR with the DL PPDU.

More specifically, the DL data field may be transmitted through the first RU. The first UL PPDU and the second UL PPDU may be received through the second RU based on the third signal field. At this time, the first UL PPDU is received from the first STA through half of the second RU. The second UL PPDU is received from the second STA through the other half of the second RU. The minimum size of the half of the second RU and the other half of the second RU may be 26 RUs. Therefore, the minimum size of the second RU may be 52 RUs.

The identifier of an STA to transmit the first UL PPDU and the second UL PPDU may include identifiers of the first and second STAs. The DL PPDU may be transmitted before the first UL PPDU and the second UL PPDU (DL primary transmission and UL secondary transmission). The DL PPDU, the first UL PPDU, and the second UL PPDU may be transmitted and received simultaneously after the transmission time of the first UL PPDU and the second UL PPDU. Also, the transmission time points of the first UL PPDU and the second UL PPDU may be the same with each other.

The information on the identifier of an STA to transmit the first UL PPDU and the second UL PPDU may be set by an 11-bit STA Identifier (ID), a 9-bit Partial Association ID (PAID), or a 12-bit Association ID (AID). In other words, a specific STA for transmitting the first UL PPDU and the second UL PPDU may be indicated by using one of the three methods.

The allocation information on the second RU may be set by a bitmap, each bit of which corresponds to 26 RUs. In other words, 26 RUs are set as the minimum unit; when each of 26 RUs transmits a first or second UL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

The information on the transmission time of the first UL PPDU and the second UL PPDU may include the duration spanning from the third signal field to the time at which the first UL PPDU and the second UL PPDU are transmitted or the duration spanning from the legacy signal field to the time at which the first UL PPDU and the second UL PPDU are transmitted. In particular, the transmission time points of the first UL PPDU and the second UL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

When the DL PPDU does not include the third signal field, the second signal field may further include allocation information on the second RU to which the first UL PPDU and the second UL PPDU are allocated, the identifier of an STA to transmit the first UL PPDU and the second UL PPDU, and transmission time of the first UL PPDU and the second UL PPDU. In this case, the PPDU is generated by reusing only the fields of the HE MU PPDU without the third signal field's being additionally inserted to the DL PPDU. Accordingly, the information related to transmission of the first UL PPDU and the second UL PPDU may be included in the second signal field.

The allocation information on the second RU may be included in a common field of the second signal field. The common field of the second signal field may further include indicator information on whether the first or the second UL PPDU is transmitted through an RU allocated based on the allocation information on the first RU. In other words, the indicator information related to the first or the second UL PPDU transmission may be additionally included in the common field of the second signal field.

The FDR indication information may be included in the legacy signal field, the first signal field, or the second signal field.

In relation to UL secondary transmission, the first UL PPDU and the second UL PPDU may include only a High Efficiency-Short Training Field (HE-STF), a High Efficiency-Long Training Field (HE-LTF), and a UL data field belonging to the HE TB PPDU. In other words, the first or the second UL PPDU may be configured to reuse the HE TB PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR.

Also, when the second RU is 20 MHz or 40 MHz, the first UL PPDU and the second UL PPDU may be generated by using a High Efficiency Single User PPDU (HE SU PPDU). Since the total bandwidth is used for UL transmission, transmission may be performed by using the HE SU PPDU. For example, when the second RU is 40 MHz, the first UL PPDU may be transmitted through a primary 20 MHz band, and the second UL PPDU may be transmitted through a secondary 20 MHz band.

The first UL PPDU and the second UL PPDU may include only the HE-STF, the HE-LTF, and the UL data field belonging to the HE SU PPDU. In other words, the first UL PPDU and the second UL PPDU may be configured to reuse the HE SU PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR. Also, the first UL PPDU and the second UL PPDU may be completely separated from each other (completely divided into half of the second RU and the other half of the second RU), thereby reducing the interference effect due to MU FDR transmission.

Figure 67:
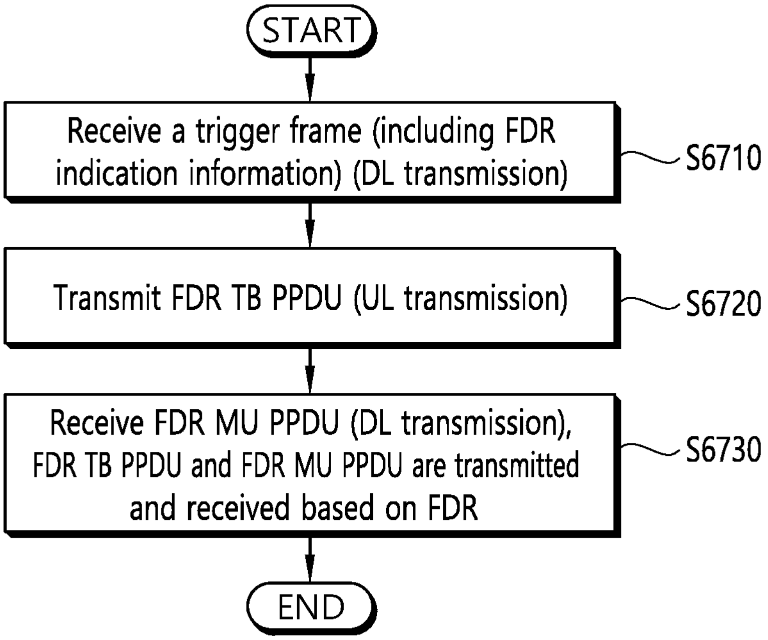
FIG. 67 is a flow diagram illustrating a procedure according to which UL primary transmission and DL secondary transmission are performed based on FDR in an STA according to the present embodiment.

FIG. 67 is a flow diagram illustrating a procedure according to which UL primary transmission and DL secondary transmission are performed based on FDR in an STA according to the present embodiment.

The example of FIG. 67 may be performed in a network environment in which the next-generation WLAN system is supported. The next-generation WLAN system is a WLAN system that improves the 802.11ax system and may satisfy backward compatibility with the 802.11ax system.

To clarify the terms, HE MU PPDU, HE TB PPDU, HE SU PPDU, HE-SIG-A field, HE-SIG-B field, HE-STF field, and HE-LTF field may all correspond to the PPDUs and the fields defined in the 802.11ax system. FDR MU PPDU, FDR TB PPDU, FDR-SIG-A field (first signal field), FDR-SIG-B field (second signal field), FDR-STF field, and FDR-LTF field may correspond to the PPDUs and the fields defined for performing FDR in the next-generation WLAN system. FDR-SIG-C field (third signal field) may be a signal field newly defined for performing FDR in the next-generation WLAN system. However, it should be noted that PPDUs and fields defined for performing FDR may be generated directly by using the HE PPDUs and the HE fields to satisfy backward compatibility with the 802.11ax system. The trigger frame is a (MAC) frame defined in the 802.11ax system, for which a field may be added or an existing field may be modified to perform FDR.

The example of FIG. 67 may be performed in a receiver, and the receiver may correspond to a (non-AP STA) STA having an FDR capability. Also, the example of FIG. 67 may include both a symmetric FDR operation and an asymmetric FDR operation.

In the S6710 step, a first STA and a second STA receive, from an AP, a trigger frame including FDR indication information on that FDR may be performed. The FDR indication information may be included in a common info field of the trigger frame.

In the S6720 step, the first STA and the second STA may transmit a trigger-based PPDU (UL PPDU). The trigger-based PPDU may be generated by using a High Efficiency Trigger-Based PPDU (HE TB PPDU). In other words, the trigger-based PPDU may be an FDR TB PPDU generated by reusing the HE TB PPDU. The FDR indication information may be included in the trigger-based PPDU.

In the S6730 step, the first STA receives a first DL PPDU from the AP, and the second STA receives a second DL PPDU from the AP. The first DL PPDU and the second DL PPDU may be generated by using a High Efficiency Multi User PPDU (HE MU PPDU). In other words, the first DL PPDU and the second DL PPDU may be an FDR MU PPDU generated by reusing the HE MU PPDU. At this time, the trigger-based PPDU (UL PPDU), the first DL PPDU, and the second DL PPDU are transmitted and received based on the FDR.

Related to UL primary transmission, the trigger frame may allocate a resource for UL MU transmission (which is assumed to be a first RU). By doing so, an STA capable of the UL transmission may transmit a trigger-based PPDU to the AP.

In other words, the trigger-based PPDU may include a legacy signal field, a first signal field, and a UL data field. The legacy signal field may be associated with the Legacy-Signal (L-SIG) field or the Repeated Legacy-Signal (RL-SIG) field included in the HE TB PPDU. The first signal field may be associated with the HE-SIG-A field included in the HE TB PPDU. Since the first signal field is defined for performing an FDR operation, the first signal field may be referred to as an FDR-SIG-A field. The UL data field may be associated with the data transmitted by an STA through an RU configured through UL MU transmission.

The trigger frame includes allocation information on a first RU to which the UL data field is allocated. The allocation information on the first RU may be a common info field 950.

Also, the trigger frame may further include indication information for transmission of a DL PPDU. In other words, the trigger frame includes allocation information on a second RU to which the first DL PPDU and the second DL PPDU are allocated, information on the identifier of an STA to transmit the first DL PPDU and the second DL PPDU, and information on the transmission time of the first DL PPDU and the second DL PPDU.

At this time, the second RU may be an RU excluding the first RU from the whole band. In other words, the present embodiment proposes a method for performing FDR, in which a UL PPDU is received first through a specific RU based on the trigger frame and a DL PPDU is transmitted through another RU other than the specific RU. Also, the present embodiment proposes a method for performing FDR, in which an AP divides the different RUs in half and transmits a UL PPDU to each of two STAs, thereby performing FDR together with the UL PPDU.

More specifically, the UL data field may be transmitted through the first RU. The trigger-based PPDU may be received through the first RU based on the trigger frame. The first DL PPDU and the second DL PPDU may be received through the second RU based on the third signal field. At this time, the first DL PPDU is transmitted to the first STA through half of the second RU. The second DL PPDU is transmitted to the second STA through the other half of the second RU. The minimum size of the half of the second RU and the other half of the second RU may be 26 RUs. Therefore, the minimum size of the second RU may be 52 RUs.

The identifier of an STA to receive the first DL PPDU and the second DL PPDU may include identifiers of the first STA and the second STA. The UL PPDU may be transmitted before the first DL PPDU and the second DL PPDU (UL primary transmission and DL secondary transmission). The UL PPDU and the DL PPDU may be transmitted and received simultaneously after the transmission time of the DL PPDU. Also, the transmission time points of the first DL PPDU and the second DL PPDU may be the same.

The information on the identifier of an STA to receive the first DL PPDU and the second DL PPDU may be included in an FDR-RA field that newly defines the RA field of the trigger frame. The FDR-RA field may have a size of 6 octets the same as that of the RA field of the existing trigger frame and indicate a specific STA to receive the first DL PPDU and the second DL PPDU.

The allocation information on the second RU and the information on the transmission time of the first DL PPDU and the second DL PPDU may be included in an FDR user info field that newly defines the user info field of the trigger frame. The FDR user info field may have a size of more than 5 octets the same as that of the user info field of the existing trigger frame.

In the same way, the allocation information on the second RU may be set by a bitmap, each bit of which corresponds to 26 RUs. In other words, 26 RUs are set as the minimum unit; when each of 26 RUs transmits a first or second DL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

Also, the transmission time points of the first DL PPDU and the second DL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

Also, the allocation information on the second RU may be included in a common info field of the trigger frame. The common info field of the trigger frame may further include indicator information on whether the first DL PPDU and the DL PPDU are transmitted through an RU allocated based on the allocation information on the first RU. In other words, the indicator information related to transmission of the first DL PPDU and the second DL PPDU may be additionally included in the common info field of the trigger frame.

In relation to DL secondary transmission, the first DL PPDU and the second DL PPDU may include only a High Efficiency-Short Training Field (HE-STF), a High Efficiency-Long Training Field (HE-LTF), and a DL data field belonging to the HE MU PPDU. In other words, the first or the second DL PPDU may be configured to reuse the HE MU PPDU but omit (exclude) the legacy preamble and the FDR-SIG-A. As a result, the first DL PPDU and the second DL PPDU may be completely separated from a UL PPDU (FDR TB PPDU) in the frequency domain (completely divided into a first RU and a second RU), thereby reducing the interference effect due to FDR.

Also, when the second RU is 20 MHz or 40 MHz, the first DL PPDU and the second DL PPDU may be generated by using a High Efficiency Single User PPDU (HE SU PPDU). Since the total bandwidth is used for DL transmission, transmission may be performed by using the HE SU PPDU. For example, when the second RU is 40 MHz, the first DL PPDU may be transmitted through a primary 20 MHz band, and the second DL PPDU may be transmitted through a secondary 20 MHz band.

The first DL PPDU and the second DL PPDU may include only the HE-STF, the HE-LTF, and the DL data field belonging to the HE SU PPDU. In other words, the first DL PPDU and the second DL PPDU may be configured to reuse the HE SU PPDU but omit (exclude) the legacy preamble and the FDR-SIG-A. As a result, the first DL PPDU and the second DL PPDU may be completely separated from a UL PPDU (FDR TB PPDU) in the frequency domain (completely divided into a first RU and a second RU), thereby reducing the interference effect due to FDR. Also, the first DL PPDU and the second DL PPDU may be completely separated from each other (completely divided into half of the second RU and the other half of the second RU), thereby reducing the interference effect due to MU FDR transmission.

3. Device Configuration

Figure 68:
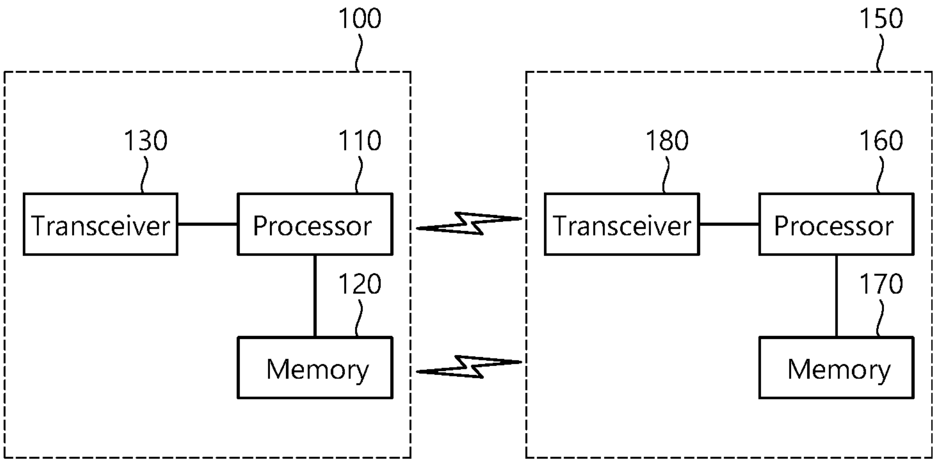
FIG. 68 illustrates a device implementing the method described above.

FIG. 68 illustrates a device implementing the method described above.

A wireless device (100) of FIG. 68 may correspond to a transmitter, which transmits a signal that is described in the description presented above, and a wireless device (150) of FIG. 68 may correspond to a receiver, which receives a signal that is described in the description presented above.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

Specifically, the processor 110 of a transmitter performs the following operation. The processor 110 of the transmitter generates FDR indication information on that the FDR may be performed and transmits a DL PPDU including the FDR indication information to a first station (STA) and a second STA. Also, the processor 110 of the transmitter receives a first UL PPDU from the first STA and receives a second UL PPDU from the second STA. At this time, the DL PPDU, the first UL PPDU, and the second UL PPDU are transmitted and received based on the FDR.

Specifically, the processor 160 of a receiver performs the following operation. The receiver may include a first STA and a second STA. The processor 160 of the receiver receives a DL PPDU including FDR indication information on that the FDR may be performed, transmits a first UL PPDU to the AP, and transmits a second UL PPDU to the AP. At this time, the DL PPDU, the first UL PPDU, and the second UL PPDU are transmitted and received based on the FDR.

In the following, described are details of the method for transmitting an PPDU based on the FDR.

In relation to DL primary transmission, the DL PPDU may include a legacy signal field, a first signal field, a second signal field, and a DL data field. The legacy signal field may be associated with the Legacy-Signal (L-SIG) field or the Repeated Legacy-Signal (RL-SIG) field included in the HE MU PPDU. The first signal field may be associated with the HE-SIG-A field included in the HE MU PPDU. Since the first signal field is defined for performing an FDR operation, the first signal field may be referred to as an FDR-SIG-A field. The second signal field may be associated with the HE-SIG-B included in the HE MU PPDU. Since the second signal field is defined to perform an FDR operation, the second signal field may be referred to as an FDR-SIG-B field. The DL data field may be associated with the data received by an STA through an RU configured during MU DL transmission.

The second signal field includes allocation information on a first RU to which the DL data field is allocated. The allocation information on the first RU may be an RU Allocation field 1120.

When the DL PPDU further includes a third signal field, the third signal field includes allocation information on a second RU to which the first UL PPDU and the second UL PPDU are allocated; information on the identifier of an STA to transmit the first UL PPDU and the second UL PPDU; and information on the transmission time of the first UL PPDU and the second UL PPDU. This case describes an embodiment in which the DL PPDU reuses a field of the HE MU PPDU and generates a PPDU by additionally inserting a third signal field. Since the third signal field is newly defined to perform an FDR operation, the third signal field may be referred to as an FDR-SIG-C field.

At this time, the second RU may be an RU excluding the first RU from the whole band. In other words, the present embodiment proposes a method in which a DL PPDU is transmitted through a specific RU and a UL PPDU is received through another RU other than the specific RU. Also, the present embodiment proposes a method in which two STAs divide the different RUs in half and each transmit a UL PPDU, thereby performing FDR together with the DL PPDU.

More specifically, the DL data field may be transmitted through the first RU. The first UL PPDU and the second UL PPDU may be received through the second RU based on the third signal field. At this time, the first UL PPDU is received from the first STA through half of the second RU. The second UL PPDU is received from the second STA through the other half of the second RU. The minimum size of the half of the second RU and the other half of the second RU may be 26 RUs. Therefore, the minimum size of the second RU may be 52 RUs.

The identifier of an STA to transmit the first UL PPDU and the second UL PPDU may include identifiers of the first STA and the second STA. The DL PPDU may be transmitted before the first UL PPDU and the second UL PPDU (DL primary transmission and UL secondary transmission). The DL PPDU, the first UL PPDU, and the second UL PPDU may be transmitted and received simultaneously after the transmission time of the first UL PPDU and the second UL PPDU. Also, the transmission time points of the first UL PPDU and the second UL PPDU may be the same.

The information on the identifier of an STA to transmit the first UL PPDU and the second UL PPDU may be set by an 11-bit STA Identifier (ID), a 9-bit Partial Association ID (PAID), or a 12-bit Association ID (AID). In other words, a specific STA for transmitting the first UL PPDU and the second UL PPDU may be indicated by using one of the three methods.

The allocation information on the second RU may be set by a bitmap, each bit of which corresponds to 26 RUs. In other words, 26 RUs are set as the minimum unit; when each of 26 RUs transmits a first or second UL PPDU, the corresponding bit may be set to 1, otherwise it may be set to 0. Accordingly, if the total bandwidth is 20 MHz (comprising 9 26 RUs), the bitmap may be set by 9 bits. If the total bandwidth is 40 MHz (comprising 18 26 RUs), the bitmap may be set by 18 bits. If the total bandwidth is 80 MHz (comprising 37 26 RUs), the bitmap may be set by 37 bits. If the total bandwidth is 160 MHz (comprising 74 26 RUs), the bit map may be set by 74 bits.

The information on the transmission time of the first UL PPDU and the second UL PPDU may include the duration spanning from the third signal field to the time at which the first UL PPDU and the second UL PPDU are transmitted or the duration spanning from the legacy signal field to the time at which the first UL PPDU and the second UL PPDU are transmitted. In particular, the transmission time points of the first UL PPDU and the second UL PPDU may be represented by adopting the Rate field and the Length field of the L-SIG without modification or by adopting a method the same as one using the 7-bit TXOP field of the HE-SIG-A field or by using a symbol-based method that uses predetermined bits and inserts a specific number of symbols to each of the predetermined bits.

When the DL PPDU does not include the third signal field, the second signal field may further include allocation information on the second RU to which the first UL PPDU and the second UL PPDU are allocated, the identifier of an STA to transmit the first UL PPDU and the second UL PPDU, and transmission time of the first UL PPDU and the second UL PPDU. In this case, the PPDU is generated by reusing only the fields of the HE MU PPDU without the third signal field's being additionally inserted to the DL PPDU. Accordingly, the information related to transmission of the first UL PPDU and the second UL PPDU may be included in the second signal field.

The allocation information on the second RU may be included in a common field of the second signal field. The common field of the second signal field may further include indicator information on whether the first or the second UL PPDU is transmitted through an RU allocated based on the allocation information on the first RU. In other words, the indicator information related to the first or the second UL PPDU transmission may be additionally included in the common field of the second signal field.

The FDR indication information may be included in the legacy signal field, the first signal field, or the second signal field.

In relation to UL secondary transmission, the first UL PPDU and the second UL PPDU may include only a High Efficiency-Short Training Field (HE-STF), a High Efficiency-Long Training Field (HE-LTF), and a UL data field belonging to the HE TB PPDU. In other words, the first or the second UL PPDU may be configured to reuse the HE TB PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR.

Also, when the second RU is 20 MHz or 40 MHz, the first UL PPDU and the second UL PPDU may be generated by using a High Efficiency Single User PPDU (HE SU PPDU). Since the total bandwidth is used for UL transmission, transmission may be performed by using the HE SU PPDU. For example, when the second RU is 40 MHz, the first UL PPDU may be transmitted through a primary 20 MHz band, and the second UL PPDU may be transmitted through a secondary 20 MHz band.

The first UL PPDU and the second UL PPDU may include only the HE-STF, the HE-LTF, and the UL data field belonging to the HE SU PPDU. In other words, the first UL PPDU and the second UL PPDU may be configured to reuse the HE SU PPDU but omit (exclude) the legacy preamble and the FDR-SIG-A. As a result, the first UL PPDU and the second UL PPDU may be completely separated from a DL PPDU (FDR MU PPDU) in the frequency domain (completely divided into a first RU and a second RU), thereby reducing the interference effect due to FDR. Also, the first UL PPDU and the second UL PPDU may be completely separated from each other (completely divided into half of the second RU and the other half of the second RU), thereby reducing the interference effect due to MU FDR transmission.

The invention claimed is:

1. A method for transmitting and receiving a Physical layer Protocol Data Unit (PPDU) based on Full-Duplex Radio (FDR) in a wireless LAN system, the method comprising:
- generating, by an access point (AP), FDR indication information on that the AP is capable of performing the FDR;
- transmitting, by the AP, a downlink (DL) PPDU including the FDR indication information to a first station (STA) and a second STA; and
- receiving, by the AP, a first uplink (UL) PPDU from the first STA and a second UL PPDU from the second STA,
- wherein the DL PPDU includes a legacy signal field, a first signal field, a second signal field, and a DL data field;
- the second signal field includes allocation information on a first resource unit (RU) to which the DL data field is allocated;
- when the DL PPDU further includes a third signal field, the third signal field includes allocation information on a second RU to which the first UL PPDU and the second UL PPDU are allocated, information on an identifier of an STA to transmit the first UL PPDU and the second UL PPDU, and information on transmission time of the first UL PPDU and the second UL PPDU;
- the second RU is an RU excluding the first RU from a first band;
- the DL PPDU, the first UL PPDU, and the second UL PPDU are transmitted and received based on the FDR;
- the first UL PPDU is received from the first STA through half of the second RU; and
- the second UL PPDU is received from the second STA through the other half of the second RU.

2. The method of claim 1, wherein the DL data field is transmitted through the first RU;
- the first UL PPDU and the second UL PPDU are received through the second RU based on the third signal field;
- the identifier of an STA to transmit the first UL PPDU and the second UL PPDU includes identifiers of the first STA and the second STA;
- the DL PPDU is transmitted before the first UL PPDU and the second UL PPDU; and
- the DL data field, the first UL PPDU, and the second UL PPDU are transmitted and received simultaneously.

3. The method of claim 1, wherein information on the identifier of an STA to transmit the first UL PPDU and the second UL PPDU is set by an 11-bit STA Identifier (ID), a 9-bit Partial Association ID (PAID), or a 12-bit Association ID (AID).

4. The method of claim 1, wherein the allocation information on the second RU is set by a bitmap, each bit of which corresponds to 26 RUs,
- if the first band is 20 MHz, the bitmap is set by 9 bits,
- if the first band is 40 MHz, the bitmap is set by 18 bits,
- if the first band is 80 MHz, the bitmap is set by 37 bits, and
- if the first band is 160 MHz, the bit map is set by 74 bits.

5. The method of claim 1, wherein information on transmission time of the first UL PPDU and the second UL PPDU includes duration spanning from the third signal field to the time at which the first UL PPDU and the second UL PPDU are transmitted or duration spanning from the legacy signal field to the time at which the first UL PPDU and the second UL PPDU are transmitted.

6. The method of claim 1, wherein, when the DL PPDU does not include a third signal field, the second signal field further includes allocation information on the second RU to which the first UL PPDU and the second UL PPDU are allocated, the identifier of an STA to transmit the first UL PPDU and the second UL PPDU, and transmission time of the first UL PPDU and the second UL PPDU.

7. The method of claim 6, wherein allocation information on the second RU is included in a common field of the second signal field, and the common field of the second signal field further includes indicator information on whether the first UL PPDU and the second UL PPDU are transmitted through an RU allocated based on allocation information on the first RU.

8. The method of claim 1, wherein the FDR indication information is included in the legacy signal field, the first signal field, or the second signal field.

9. The method of claim 1, wherein the DL PPDU is generated by using a High Efficiency Multi User PPDU (HE MU PPDU), the legacy signal field is associated with a Legacy-Signal (L-SIG) field or a Repeated Legacy-Signal (RL-SIG) field included in the HE MU PPDU, the first signal field is associated with an HE-SIG-A field included in the HE MU PPDU, the second signal field is associated with an HE-SIG-B field included in the HE MU PPDU, the first UL PPDU and the second UL PPDU are generated by using a High Efficiency Trigger-Based PPDU (HE TB PPDU), and the first UL PPDU and the second UL PPDU include only a High Efficiency-Short Training Field (HE-STF) field, a High Efficiency-Long Training Field (HE-LTF) field, and a UL data field included in the HE TB PPDU.

10. The method of claim 1, wherein the second RU is 20 MHz or 40 MHz, the first UL PPDU and the second UL PPDU are generated by using a High Efficiency Single User PPDU (HE SU PPDU), and the first UL PPDU and the second UL PPDU include only an HE-STF field, an HE-LTF field, and a UL data field included in the HE SU PPDU.

11. The method of claim 1, wherein minimum size of half of the second RU and the other half of the second RU is 26 RUs.

12. An access point (AP) transmitting and receiving a Physical layer Protocol Data Unit (PPDU) based on Full-Duplex Radio (FDR) in a wireless LAN system, the AP comprising:

a transceiver transmitting or receiving a radio signal; and a processor controlling the transceiver, wherein the processor is configured to generate FDR indication information on that the AP is capable of performing the FDR;

transmit a downlink (DL) PPDU including the FDR indication information to a first station (STA) and a second STA; and receive a first uplink (UL) PPDU from the first STA and a second UL PPDU from the second STA, wherein the DL PPDU includes a legacy signal field, a first signal field, a second signal field, and a DL data field;

the second signal field includes allocation information on a first resource unit (RU) to which the DL data field is allocated;

when the DL PPDU further includes a third signal field, the third signal field includes allocation information on a second RU to which the first UL PPDU and the second UL PPDU are allocated, information on an identifier of an STA to transmit the first UL PPDU and the second UL PPDU, and information on transmission time of the first UL PPDU and the second UL PPDU;

the second RU is an RU excluding the first RU from a first band;

the DL PPDU, the first UL PPDU, and the second UL PPDU are transmitted and received based on the FDR;

the first UL PPDU is received from the first STA through half of the second RU; and the second UL PPDU is received from the second STA through the other half of the second RU.

13. The AP of claim 12, wherein the DL data field is transmitted through the first RU;

the first UL PPDU and the second UL PPDU are received through the second RU based on the third signal field;

the identifier of an STA to transmit the first UL PPDU and the second UL PPDU includes identifiers of the first STA and the second STA;

the DL PPDU is transmitted before the first UL PPDU and the second UL PPDU; and the DL data field, the first UL PPDU, and the second UL PPDU are transmitted and received simultaneously.

14. The AP of claim 12, wherein information on the identifier of an STA to transmit the first UL PPDU and the second UL PPDU is set by an 11-bit STA Identifier (ID), a 9-bit Partial Association ID (PAID), or a 12-bit Association ID (AID).

15. The AP of claim 12, wherein the allocation information on the second RU is set by a bitmap, each bit of which corresponds to 26 RUs, if the first band is 20 MHz, the bitmap is set by 9 bits, if the first band is 40 MHz, the bitmap is set by 18 bits, if the first band is 80 MHz, the bitmap is set by 37 bits, and if the first band is 160 MHz, the bit map is set by 74 bits.

16. The AP of claim 12, wherein information on transmission time of the first UL PPDU and the second UL PPDU includes duration spanning from the third signal field to the time at which the first UL PPDU and the second UL PPDU are transmitted or duration spanning from the legacy signal field to the time at which the first UL PPDU and the second UL PPDU are transmitted.

17. The AP of claim 12, wherein, when the DL PPDU does not include a third signal field, the second signal field further includes allocation information on the second RU to which the first UL PPDU and the second UL PPDU are allocated, the identifier of an STA to transmit the first UL PPDU and the second UL PPDU, and transmission time of the first UL PPDU and the second UL PPDU.

18. The AP of claim 17, wherein allocation information on the second RU is included in a common field of the second signal field, and the common field of the second signal field further includes indicator information on whether the first UL PPDU and the second UL PPDU are transmitted through an RU allocated based on allocation information on the first RU.

19. The AP of claim 12, wherein the FDR indication information is included in the legacy signal field, the first signal field, or the second signal field.

20. The AP of claim 12, wherein the DL PPDU is generated by using a High Efficiency Multi User PPDU (HE MU PPDU), the legacy signal field is associated with a Legacy-Signal (L-SIG) field or a Repeated Legacy-Signal (RL-SIG) field included in the HE MU PPDU, the first signal field is associated with an HE-SIG-A field included in the HE MU PPDU, the second signal field is associated with an HE-SIG-B field included in the HE MU PPDU, the first UL PPDU and the second UL PPDU are generated by using a High Efficiency Trigger-Based PPDU (HE TB PPDU), and the first UL PPDU and the second UL PPDU include only a High Efficiency-Short Training Field (HE-STF) field, a High Efficiency-Long Training Field (HE-LTF) field, and a UL data field included in the HE TB PPDU.

* * * * *